(12) United States Patent
Hackert et al.

(10) Patent No.: US 11,773,004 B2
(45) Date of Patent: Oct. 3, 2023

(54) LASER CUTTING AND PROCESSING OF DISPLAY GLASS COMPOSITIONS

(71) Applicant: Corning Incorporated, Corning, NY (US)

(72) Inventors: Thomas Hackert, Germering (DE); Xinghua Li, Horseheads, NY (US); Sasha Marjanovic, Painted Post, NY (US); Moussa N'Gom, Ann Arbor, MI (US); David Andrew Pastel, Horseheads, NY (US); Garrett Andrew Piech, Corning, NY (US); Daniel Schnitzler, Bedburg (DE); Robert Stephen Wagner, Corning, NY (US); James Joseph Watkins, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/560,390

(22) PCT Filed: Mar. 23, 2016

(86) PCT No.: PCT/US2016/023738
§ 371 (c)(1),
(2) Date: Sep. 21, 2017

(87) PCT Pub. No.: WO2016/154284
PCT Pub. Date: Sep. 29, 2016

(65) Prior Publication Data
US 2018/0057390 A1    Mar. 1, 2018

Related U.S. Application Data

(60) Provisional application No. 62/137,443, filed on Mar. 24, 2015.

(51) Int. Cl.
*C03B 33/02* (2006.01)
*B23K 26/364* (2014.01)
(Continued)

(52) U.S. Cl.
CPC ........ *C03B 33/0222* (2013.01); *B23K 26/364* (2015.10); *B23K 26/53* (2015.10);
(Continued)

(58) Field of Classification Search
CPC . C03B 33/0222; C03B 33/0215; B23K 26/53; B23K 26/40
See application file for complete search history.

(56) References Cited

U.S. PATENT DOCUMENTS 1,529,243 A    3/1925  Drake et al.
1,626,396 A    4/1927  Drake
(Continued)

FOREIGN PATENT DOCUMENTS

CN    1259924 A    7/2000
CN    2388062 Y    7/2000
(Continued)

OTHER PUBLICATIONS

McGloin et al. "Bessel beams: diffraction in a new light" Contemporary Physics, vol. 46 No. 1 (2005) pp. 15-28.
(Continued)

*Primary Examiner* — Queenie S Dehghan
(74) *Attorney, Agent, or Firm* — Yiqun Zhao

(57) ABSTRACT

The present invention relates to a laser cutting technology for cutting and separating thin substrates of transparent materials, for example to cutting of display glass compositions mainly used for production of Thin Film Transistors (TFT) devices. The described laser process can be used to make straight cuts, for example at a speed of >0.25 m/sec, to cut sharp radii outer corners (<1 mm), and to create
(Continued)

arbitrary curved shapes including forming interior holes and slots. A method of laser processing an alkaline earth boro-aluminosilicate glass composite workpiece includes focusing a pulsed laser beam into a focal line. The pulsed laser produces pulse bursts with 5-20 pulses per pulse burst and pulse burst energy of 300-600 micro Joules per burst. The focal line is directed into the glass composite workpiece, generating induced absorption within the material. The workpiece and the laser beam are translated relative to each other to form a plurality of defect lines along a contour, with adjacent defect lines have a spacing of 5-15 microns.

14 Claims, 24 Drawing Sheets

(51) Int. Cl.
  *C03C 3/093* (2006.01)
  *B23K 26/53* (2014.01)
  *B23K 103/00* (2006.01)
(52) U.S. Cl.
  CPC .......... *C03B 33/0215* (2013.01); *C03C 3/093* (2013.01); *B23K 2103/54* (2018.08); *Y02P 40/57* (2015.11)

(56) References Cited

U.S. PATENT DOCUMENTS

| | | |
|---|---|---|
| 1,790,397 A | 1/1931 | Woods et al. |
| 2,682,134 A | 6/1954 | Stookey |
| 2,749,794 A | 6/1956 | O'Leary |
| 2,754,956 A | 7/1956 | Sommer |
| 3,647,410 A | 3/1972 | Heaton et al. |
| 3,673,900 A | 7/1972 | Jendrisak et al. |
| 3,695,497 A | 10/1972 | Dear |
| 3,695,498 A | 10/1972 | Dear |
| 3,729,302 A | 4/1973 | Heaton |
| 3,775,084 A | 11/1973 | Heaton |
| 3,947,093 A | 3/1976 | Goshima et al. |
| 4,076,159 A | 2/1978 | Farragher |
| 4,226,607 A | 10/1980 | Domken |
| 4,441,008 A | 4/1984 | Chan |
| 4,546,231 A | 10/1985 | Gresser et al. |
| 4,618,056 A | 10/1986 | Cutshall |
| 4,623,776 A | 11/1986 | Buchroeder et al. |
| 4,642,439 A | 2/1987 | Miller et al. |
| 4,646,308 A | 2/1987 | Kafka et al. |
| 4,764,930 A | 8/1988 | Bille et al. |
| 4,891,054 A | 1/1990 | Bricker et al. |
| 4,907,586 A | 3/1990 | Bille et al. |
| 4,918,751 A | 4/1990 | Pessot et al. |
| 4,929,065 A | 5/1990 | Hagerty et al. |
| 4,951,457 A | 8/1990 | Deal |
| 4,997,250 A | 3/1991 | Ortiz, Jr. |
| 5,035,918 A | 7/1991 | Vyas |
| 5,040,182 A | 8/1991 | Spinelli et al. |
| 5,104,210 A | 4/1992 | Tokas |
| 5,104,523 A | 4/1992 | Masaharu et al. |
| 5,108,857 A | 4/1992 | Kitayama et al. |
| 5,112,722 A | 5/1992 | Tsujino et al. |
| 5,114,834 A | 5/1992 | Nachshon |
| 5,221,034 A | 6/1993 | Bando |
| 5,256,853 A | 10/1993 | McIntyre |
| 5,265,107 A | 11/1993 | Delfyett |
| 5,326,956 A | 7/1994 | Lunney |
| 5,400,350 A | 3/1995 | Galvanauskas et al. |
| 5,410,567 A | 4/1995 | Brundage et al. |
| 5,418,803 A | 5/1995 | Zhiglinsky et al. |
| 5,434,875 A | 7/1995 | Rieger et al. |
| 5,436,925 A | 7/1995 | Lin et al. |
| 5,475,197 A | 12/1995 | Wrobel et al. |
| 5,521,352 A | 5/1996 | Lawson |
| 5,541,774 A | 7/1996 | Blankenbecler |
| 5,553,093 A | 9/1996 | Ramaswamy et al. |
| 5,574,597 A | 11/1996 | Kataoka et al. |
| 5,578,229 A | 11/1996 | Barnekov et al. |
| 5,586,138 A | 12/1996 | Yokayama |
| 5,656,186 A | 8/1997 | Mourou et al. |
| 5,676,866 A | 10/1997 | In Den Baumen et al. |
| 5,684,642 A | 11/1997 | Zumoto et al. |
| 5,696,782 A | 12/1997 | Harter et al. |
| 5,715,346 A | 2/1998 | Liu |
| 5,736,061 A | 4/1998 | Fukada et al. |
| 5,736,709 A | 4/1998 | Neiheisel |
| 5,776,220 A | 7/1998 | Allaire et al. |
| 5,781,684 A | 7/1998 | Liu |
| 5,796,112 A | 8/1998 | Ichie |
| 5,854,490 A | 12/1998 | Ooaeh et al. |
| 5,854,751 A | 12/1998 | Di et al. |
| 5,878,866 A | 3/1999 | Lisec |
| 5,968,441 A | 10/1999 | Seki |
| 6,003,418 A | 12/1999 | Bezama et al. |
| 6,016,223 A | 1/2000 | Suzuki et al. |
| 6,016,324 A | 1/2000 | Rieger et al. |
| 6,033,583 A | 3/2000 | Musket et al. |
| 6,038,055 A | 3/2000 | Hansch et al. |
| 6,055,829 A | 5/2000 | Witzmann et al. |
| 6,078,599 A | 6/2000 | Everage et al. |
| 6,137,632 A | 10/2000 | Bernacki |
| 6,156,030 A | 12/2000 | Neev |
| 6,160,835 A | 12/2000 | Kwon |
| 6,185,051 B1 | 2/2001 | Chen et al. |
| 6,186,384 B1 | 2/2001 | Sawada |
| 6,191,880 B1 | 2/2001 | Schuster |
| 6,210,401 B1 | 4/2001 | Lai |
| 6,256,328 B1 | 7/2001 | Delfyett et al. |
| 6,259,058 B1 | 7/2001 | Hoekstra |
| 6,259,151 B1 | 7/2001 | Morrison |
| 6,259,512 B1 | 7/2001 | Mizouchi |
| 6,272,156 B1 | 8/2001 | Reed et al. |
| 6,301,932 B1 | 10/2001 | Allen et al. |
| 6,308,055 B1 | 10/2001 | Welland et al. |
| 6,322,958 B1 | 11/2001 | Hayashi |
| 6,339,208 B1 | 1/2002 | Rockstroh et al. |
| 6,373,565 B1 | 4/2002 | Kafka et al. |
| 6,381,391 B1 | 4/2002 | Islam et al. |
| 6,396,856 B1 | 5/2002 | Sucha et al. |
| 6,407,360 B1 | 6/2002 | Choo et al. |
| 6,438,996 B1 | 8/2002 | Cuvelier |
| 6,445,491 B2 | 9/2002 | Sucha et al. |
| 6,449,301 B1 | 9/2002 | Wu et al. |
| 6,461,223 B1 | 10/2002 | Bando |
| 6,484,052 B1 | 11/2002 | Visuri et al. |
| 6,489,589 B1 | 12/2002 | Alexander |
| 6,501,576 B1 | 12/2002 | Seacombe |
| 6,501,578 B1 | 12/2002 | Bernstein et al. |
| 6,520,057 B1 | 2/2003 | Steadman |
| 6,552,301 B2 | 4/2003 | Herman et al. |
| 6,573,026 B1 | 6/2003 | Aitken et al. |
| 6,592,703 B1 | 7/2003 | Habeck |
| 6,614,720 B1 | 9/2003 | Ogata et al. |
| 6,635,849 B1 | 10/2003 | Okawa et al. |
| 6,635,850 B2 | 10/2003 | Amako et al. |
| 6,720,519 B2 | 4/2004 | Liu et al. |
| 6,729,151 B1 | 5/2004 | Thompson |
| 6,729,161 B1 | 5/2004 | Miura et al. |
| 6,737,345 B1 | 5/2004 | Lin et al. |
| 6,744,009 B1 | 6/2004 | Xuan et al. |
| 6,787,732 B1 | 9/2004 | Xuan et al. |
| 6,791,935 B2 | 9/2004 | Hatano et al. |
| 6,800,237 B1 | 10/2004 | Yamamoto et al. |
| 6,800,831 B1 | 10/2004 | Hoetzel |
| 6,856,379 B2 | 2/2005 | Schuster |
| 6,885,502 B2 | 4/2005 | Schuster |
| 6,958,094 B2 | 10/2005 | Ohmi et al. |
| 6,992,026 B2 | 1/2006 | Fukuyo et al. |
| 7,009,138 B2 | 3/2006 | Amako et al. |
| 7,061,583 B2 | 6/2006 | Mulkens et al. |
| 7,102,118 B2 | 9/2006 | Acker et al. |
| 7,196,841 B2 | 3/2007 | Melzer et al. |
| 7,259,354 B2 | 8/2007 | Pailthorp et al. |
| 7,353,829 B1 | 4/2008 | Wachter et al. |

(56) References Cited

U.S. PATENT DOCUMENTS

| | | | |
|---|---|---|---|
| 7,402,773 | B2 | 7/2008 | Nomaru |
| 7,408,616 | B2 | 8/2008 | Gruner et al. |
| 7,408,622 | B2 | 8/2008 | Fiolka et al. |
| 7,511,886 | B2 | 3/2009 | Schultz et al. |
| 7,535,634 | B1 | 5/2009 | Savchenkov et al. |
| 7,633,033 | B2 | 12/2009 | Thomas et al. |
| 7,642,483 | B2 | 1/2010 | You et al. |
| 7,649,153 | B2 | 1/2010 | Haight et al. |
| 7,726,532 | B2 | 6/2010 | Gonoe |
| 7,794,904 | B2 | 9/2010 | Brueck |
| 7,800,734 | B2 | 9/2010 | Komatsuda |
| 7,901,967 | B2 | 3/2011 | Komura et al. |
| 7,920,337 | B2 | 4/2011 | Perchak |
| 7,978,408 | B2 | 7/2011 | Sawabe et al. |
| 8,035,803 | B2 | 10/2011 | Fiolka |
| 8,035,882 | B2 | 10/2011 | Fanton et al. |
| 8,035,901 | B2 | 10/2011 | Abramov et al. |
| 8,068,279 | B2 | 11/2011 | Schuster et al. |
| 8,104,385 | B2 | 1/2012 | Hayashi et al. |
| 8,118,971 | B2 | 2/2012 | Hori et al. |
| 8,123,515 | B2 | 2/2012 | Schleelein |
| 8,132,427 | B2 | 3/2012 | Brown et al. |
| 8,144,308 | B2 | 3/2012 | Muramatsu |
| 8,158,514 | B2 | 4/2012 | Krueger et al. |
| 8,164,818 | B2 | 4/2012 | Collins et al. |
| 8,168,514 | B2 | 5/2012 | Garner et al. |
| 8,194,170 | B2 | 6/2012 | Golub et al. |
| 8,211,259 | B2 | 7/2012 | Sato et al. |
| 8,237,918 | B2 | 8/2012 | Totzeck et al. |
| 8,245,539 | B2 | 8/2012 | Lu et al. |
| 8,245,540 | B2 | 8/2012 | Abramov et al. |
| 8,248,600 | B2 | 8/2012 | Matousek et al. |
| 8,259,393 | B2 | 9/2012 | Fiolka et al. |
| 8,269,138 | B2 | 9/2012 | Garner et al. |
| 8,279,524 | B2 | 10/2012 | Fiolka et al. |
| 8,283,595 | B2 | 10/2012 | Fukuyo et al. |
| 8,283,695 | B2 | 10/2012 | Salcedo et al. |
| 8,292,141 | B2 | 10/2012 | Cox et al. |
| 8,296,066 | B2 | 10/2012 | Zhao et al. |
| 8,327,666 | B2 | 12/2012 | Harvey et al. |
| 8,339,578 | B2 | 12/2012 | Omura |
| 8,341,976 | B2 | 1/2013 | Dejneka et al. |
| 8,347,551 | B2 | 1/2013 | Van Der Drift |
| 8,347,651 | B2 | 1/2013 | Abramov et al. |
| 8,358,868 | B2 | 1/2013 | Iketani |
| 8,358,888 | B2 | 1/2013 | Ramachandran |
| 8,379,188 | B2 | 2/2013 | Mueller et al. |
| 8,444,905 | B2 | 5/2013 | Li et al. |
| 8,444,906 | B2 | 5/2013 | Lee et al. |
| 8,448,471 | B2 | 5/2013 | Kumatani et al. |
| 8,475,507 | B2 | 7/2013 | Dewey et al. |
| 8,482,717 | B2 | 7/2013 | Fiolka et al. |
| 8,491,983 | B2 | 7/2013 | Ono et al. |
| 8,518,280 | B2 | 8/2013 | Hsu et al. |
| 8,549,881 | B2 | 10/2013 | Brown et al. |
| 8,584,354 | B2 | 11/2013 | Cornejo et al. |
| 8,584,490 | B2 | 11/2013 | Garner et al. |
| 8,592,716 | B2 | 11/2013 | Abramov et al. |
| 8,604,380 | B2 | 12/2013 | Howerton et al. |
| 8,607,590 | B2 | 12/2013 | Glaesemann et al. |
| 8,616,024 | B2 | 12/2013 | Cornejo et al. |
| 8,635,857 | B2 | 1/2014 | Crosbie |
| 8,635,887 | B2 | 1/2014 | Black et al. |
| 8,680,489 | B2 | 3/2014 | Martinez et al. |
| 8,685,838 | B2 | 4/2014 | Fukuyo et al. |
| 8,697,228 | B2 | 4/2014 | Carre |
| 8,720,228 | B2 | 5/2014 | Li |
| 8,826,696 | B2 | 9/2014 | Brown et al. |
| 8,842,358 | B2 | 9/2014 | Bareman et al. |
| 8,847,112 | B2 | 9/2014 | Panarello et al. |
| 8,852,698 | B2 | 10/2014 | Fukumitsu |
| 8,887,529 | B2 | 11/2014 | Lu et al. |
| 8,916,798 | B2 | 12/2014 | Pluss |
| 8,943,855 | B2 | 2/2015 | Gomez et al. |
| 8,951,889 | B2 | 2/2015 | Ryu et al. |
| 8,971,053 | B2 | 3/2015 | Kariya et al. |
| 9,028,613 | B2 | 5/2015 | Kim et al. |
| 9,052,605 | B2 | 6/2015 | Van et al. |
| 9,086,509 | B2 | 7/2015 | Knutson |
| 9,138,913 | B2 | 9/2015 | Arai et al. |
| 9,170,500 | B2 | 10/2015 | Van et al. |
| 9,227,868 | B2 | 1/2016 | Matsumoto et al. |
| 9,290,407 | B2 | 3/2016 | Barefoot et al. |
| 9,296,066 | B2 | 3/2016 | Hosseini et al. |
| 9,324,791 | B2 | 4/2016 | Tamemoto |
| 9,327,381 | B2 | 5/2016 | Lee et al. |
| 9,341,912 | B2 | 5/2016 | Shrivastava et al. |
| 9,346,706 | B2 | 5/2016 | Bazemore et al. |
| 9,446,590 | B2 | 9/2016 | Chen et al. |
| 9,481,598 | B2 | 11/2016 | Bergh |
| 9,499,343 | B2 | 11/2016 | Cornelissen et al. |
| 9,517,929 | B2 | 12/2016 | Hosseini |
| 9,517,963 | B2 | 12/2016 | Marjanovic et al. |
| 9,701,581 | B2 | 7/2017 | Kangastupa et al. |
| 9,703,167 | B2 | 7/2017 | Parker et al. |
| 9,815,730 | B2 | 11/2017 | Marjanovic et al. |
| 9,850,160 | B2 | 12/2017 | Marjanovic et al. |
| 9,873,628 | B1 | 1/2018 | Haloui |
| 9,878,304 | B2 | 1/2018 | Kotake et al. |
| 10,190,363 | B2 | 1/2019 | Behmke et al. |
| 10,611,667 | B2 | 4/2020 | Bookbinder et al. |
| 10,730,783 | B2 | 8/2020 | Akarapu et al. |
| 2001/0019404 | A1 | 9/2001 | Schuster et al. |
| 2001/0027842 | A1 | 10/2001 | Curcio et al. |
| 2002/0006765 | A1 | 1/2002 | Michel et al. |
| 2002/0046997 | A1 | 4/2002 | Nam et al. |
| 2002/0082466 | A1 | 6/2002 | Han |
| 2002/0097486 | A1 | 7/2002 | Yamaguchi et al. |
| 2002/0097488 | A1 | 7/2002 | Hay et al. |
| 2002/0110639 | A1 | 8/2002 | Bruns |
| 2002/0126380 | A1 | 9/2002 | Schuster |
| 2002/0139786 | A1 | 10/2002 | Amako et al. |
| 2002/0170898 | A1 | 11/2002 | Ehrmann et al. |
| 2003/0006221 | A1 | 1/2003 | Hong et al. |
| 2003/0007772 | A1 | 1/2003 | Borrelli et al. |
| 2003/0007773 | A1 | 1/2003 | Kondo et al. |
| 2003/0038225 | A1 | 2/2003 | Mulder et al. |
| 2003/0070706 | A1 | 4/2003 | Fujioka |
| 2003/0227663 | A1 | 12/2003 | Agrawal et al. |
| 2004/0051982 | A1 | 3/2004 | Perchak |
| 2004/0108467 | A1 | 6/2004 | Eurlings et al. |
| 2004/0144231 | A1 | 7/2004 | Hanada |
| 2004/0221615 | A1 | 11/2004 | Postupack et al. |
| 2004/0221615 | A1 | 11/2004 | Postupack et al. |
| 2005/0024743 | A1 | 2/2005 | Camy-Peyret |
| 2005/0098458 | A1 | 5/2005 | Gruetzmacher et al. |
| 2005/0098548 | A1 | 5/2005 | Kobayashi et al. |
| 2005/0115938 | A1 | 6/2005 | Sawaki et al. |
| 2005/0116938 | A1 | 6/2005 | Ito et al. |
| 2005/0205778 | A1 | 9/2005 | Kitai et al. |
| 2005/0209898 | A1 | 9/2005 | Asai et al. |
| 2005/0231651 | A1 | 10/2005 | Myers et al. |
| 2005/0274702 | A1 | 12/2005 | Deshi |
| 2005/0277270 | A1 | 12/2005 | Yoshikawa et al. |
| 2006/0011593 | A1 | 1/2006 | Fukuyo |
| 2006/0021385 | A1 | 2/2006 | Cimo et al. |
| 2006/0028706 | A1 | 2/2006 | Totzeck et al. |
| 2006/0028728 | A1 | 2/2006 | Li |
| 2006/0039057 | A1 | 2/2006 | Han et al. |
| 2006/0050261 | A1 | 3/2006 | Brotsack |
| 2006/0109874 | A1 | 5/2006 | Shiozaki et al. |
| 2006/0118529 | A1 | 6/2006 | Aoki et al. |
| 2006/0127679 | A1 | 6/2006 | Gulati et al. |
| 2006/0146384 | A1 | 7/2006 | Schultz et al. |
| 2006/0151450 | A1 | 7/2006 | You et al. |
| 2006/0170617 | A1 | 8/2006 | Latypov et al. |
| 2006/0213883 | A1 | 9/2006 | Eberhardt et al. |
| 2006/0227440 | A1 | 10/2006 | Glukstad |
| 2006/0266744 | A1 | 11/2006 | Nomaru |
| 2006/0289410 | A1 | 12/2006 | Morita et al. |
| 2006/0291835 | A1 | 12/2006 | Nozaki et al. |
| 2007/0021548 | A1 | 1/2007 | Hattori et al. |
| 2007/0030471 | A1 | 2/2007 | Troost et al. |
| 2007/0044606 | A1 | 3/2007 | Kang et al. |

(56) References Cited

U.S. PATENT DOCUMENTS

| | | |
|---|---|---|
| 2007/0045253 A1 | 3/2007 | Jordens et al. |
| 2007/0051706 A1 | 3/2007 | Bovatsek et al. |
| 2007/0053632 A1 | 3/2007 | Popp |
| 2007/0068648 A1 | 3/2007 | Hu et al. |
| 2007/0090180 A1 | 4/2007 | Griffis et al. |
| 2007/0091977 A1 | 4/2007 | Sohn et al. |
| 2007/0111119 A1 | 5/2007 | Hu et al. |
| 2007/0111390 A1 | 5/2007 | Komura et al. |
| 2007/0111480 A1 | 5/2007 | Maruyama et al. |
| 2007/0119831 A1 | 5/2007 | Kandt |
| 2007/0132977 A1 | 6/2007 | Komatsuda |
| 2007/0138151 A1 | 6/2007 | Tanaka et al. |
| 2007/0177116 A1 | 8/2007 | Amako |
| 2007/0202619 A1 | 8/2007 | Tamura et al. |
| 2007/0209029 A1 | 9/2007 | Ivonin et al. |
| 2007/0228616 A1 | 10/2007 | Bang |
| 2007/0298529 A1 | 12/2007 | Maeda et al. |
| 2008/0000884 A1 | 1/2008 | Sugiura et al. |
| 2008/0050584 A1 | 2/2008 | Noguchi et al. |
| 2008/0079940 A1 | 4/2008 | Sezerman et al. |
| 2008/0087629 A1 | 4/2008 | Shimomura et al. |
| 2008/0099444 A1 | 5/2008 | Misawa et al. |
| 2008/0158529 A1 | 7/2008 | Hansen |
| 2008/0165925 A1 | 7/2008 | Singer et al. |
| 2008/0190981 A1 | 8/2008 | Okajima et al. |
| 2008/0239268 A1 | 10/2008 | Mulder et al. |
| 2008/0309902 A1 | 12/2008 | Rosenbluth |
| 2008/0310465 A1 | 12/2008 | Achtenhagen |
| 2008/0314879 A1 | 12/2008 | Bruland et al. |
| 2008/0318028 A1 | 12/2008 | Winstanley et al. |
| 2009/0013724 A1 | 1/2009 | Koyo et al. |
| 2009/0032510 A1 | 2/2009 | Ando et al. |
| 2009/0033902 A1 | 2/2009 | Mulder et al. |
| 2009/0050661 A1 | 2/2009 | Na et al. |
| 2009/0091731 A1 | 4/2009 | Ossmann et al. |
| 2009/0104721 A1 | 4/2009 | Hirakata et al. |
| 2009/0157341 A1 | 6/2009 | Cheung |
| 2009/0170286 A1 | 7/2009 | Tsukamoto et al. |
| 2009/0176034 A1 | 7/2009 | Ruuttu |
| 2009/0183764 A1 | 7/2009 | Meyer |
| 2009/0184849 A1 | 7/2009 | Nasiri et al. |
| 2009/0188543 A1 | 7/2009 | Bann |
| 2009/0199694 A1 | 8/2009 | Uh et al. |
| 2009/0212033 A1 | 8/2009 | Beck et al. |
| 2009/0242528 A1 | 10/2009 | Howerton et al. |
| 2009/0250446 A1 | 10/2009 | Sakamoto |
| 2009/0272149 A1 | 11/2009 | Abramov et al. |
| 2009/0286091 A1* | 11/2009 | Danielson ............... C03C 3/095 501/64 |
| 2009/0294419 A1 | 12/2009 | Abramov et al. |
| 2009/0294422 A1 | 12/2009 | Lubatschowski et al. |
| 2009/0323160 A1 | 12/2009 | Egerton et al. |
| 2009/0323162 A1 | 12/2009 | Fanton et al. |
| 2009/0324899 A1 | 12/2009 | Feinstein et al. |
| 2009/0324903 A1 | 12/2009 | Rumsby |
| 2010/0020304 A1 | 1/2010 | Soer et al. |
| 2010/0024865 A1 | 2/2010 | Shah et al. |
| 2010/0025387 A1 | 2/2010 | Arai et al. |
| 2010/0029460 A1 | 2/2010 | Shojiya |
| 2010/0032087 A1 | 2/2010 | Takahashi |
| 2010/0038349 A1 | 2/2010 | Ke et al. |
| 2010/0046761 A1 | 2/2010 | Henn et al. |
| 2010/0086741 A1 | 4/2010 | Bovatsek et al. |
| 2010/0089631 A1 | 4/2010 | Sakaguchi et al. |
| 2010/0089682 A1 | 4/2010 | Martini et al. |
| 2010/0089882 A1 | 4/2010 | Tamura |
| 2010/0102042 A1 | 4/2010 | Garner et al. |
| 2010/0129603 A1 | 5/2010 | Buck et al. |
| 2010/0145620 A1 | 6/2010 | Georgi et al. |
| 2010/0147813 A1 | 6/2010 | Lei et al. |
| 2010/0197116 A1 | 8/2010 | Shah |
| 2010/0206008 A1 | 8/2010 | Harvey et al. |
| 2010/0252538 A1 | 10/2010 | Zeygerman |
| 2010/0252540 A1 | 10/2010 | Lei et al. |
| 2010/0252959 A1 | 10/2010 | Lei et al. |
| 2010/0276505 A1 | 11/2010 | Smith |
| 2010/0279067 A1 | 11/2010 | Sabia et al. |
| 2010/0287991 A1 | 11/2010 | Brown et al. |
| 2010/0291353 A1 | 11/2010 | Dejneka et al. |
| 2010/0320179 A1 | 12/2010 | Morita et al. |
| 2010/0326138 A1 | 12/2010 | Kumatani et al. |
| 2010/0332087 A1 | 12/2010 | Claffee et al. |
| 2011/0017716 A1 | 1/2011 | Rumsby |
| 2011/0023298 A1 | 2/2011 | Chujo et al. |
| 2011/0037149 A1 | 2/2011 | Fukuyo et al. |
| 2011/0049764 A1 | 3/2011 | Lee et al. |
| 2011/0049765 A1 | 3/2011 | Lei et al. |
| 2011/0088324 A1 | 4/2011 | Wessel |
| 2011/0094267 A1 | 4/2011 | Aniolek et al. |
| 2011/0100401 A1 | 5/2011 | Fiorentini |
| 2011/0111179 A1 | 5/2011 | Blick et al. |
| 2011/0127244 A1* | 6/2011 | Li ........................ C03B 33/091 219/121.69 |
| 2011/0127697 A1 | 6/2011 | Milne |
| 2011/0132581 A1 | 6/2011 | Moss |
| 2011/0132881 A1 | 6/2011 | Liu |
| 2011/0136303 A1 | 6/2011 | Lee |
| 2011/0139760 A1 | 6/2011 | Shah et al. |
| 2011/0143470 A1 | 6/2011 | Lee |
| 2011/0177325 A1 | 7/2011 | Tomamoto et al. |
| 2011/0183116 A1 | 7/2011 | Hung et al. |
| 2011/0191024 A1 | 8/2011 | Deluca |
| 2011/0210105 A1 | 9/2011 | Romashko et al. |
| 2011/0238308 A1 | 9/2011 | Miller et al. |
| 2011/0240476 A1 | 10/2011 | Wang et al. |
| 2011/0240611 A1 | 10/2011 | Sandstrom et al. |
| 2011/0240617 A1 | 10/2011 | Cheon et al. |
| 2011/0277507 A1 | 11/2011 | Lu et al. |
| 2011/0300691 A1 | 12/2011 | Sakamoto et al. |
| 2011/0318555 A1 | 12/2011 | Bookbinder et al. |
| 2012/0017642 A1 | 1/2012 | Teranishi et al. |
| 2012/0026573 A1 | 2/2012 | Collins et al. |
| 2012/0047951 A1 | 3/2012 | Dannoux et al. |
| 2012/0047956 A1 | 3/2012 | Li |
| 2012/0047957 A1* | 3/2012 | Dannoux ............... C03B 33/091 65/112 |
| 2012/0048604 A1 | 3/2012 | Cornejo et al. |
| 2012/0061440 A1 | 3/2012 | Roell |
| 2012/0064306 A1 | 3/2012 | Kang et al. |
| 2012/0067858 A1 | 3/2012 | Kangastupa et al. |
| 2012/0103018 A1 | 5/2012 | Lu et al. |
| 2012/0106117 A1 | 5/2012 | Sundaram et al. |
| 2012/0111310 A1 | 5/2012 | Ryu et al. |
| 2012/0125588 A1 | 5/2012 | Nam et al. |
| 2012/0131961 A1 | 5/2012 | Dannoux et al. |
| 2012/0131962 A1 | 5/2012 | Mitsugi et al. |
| 2012/0135195 A1 | 5/2012 | Glaesemann et al. |
| 2012/0135607 A1 | 5/2012 | Shimoi et al. |
| 2012/0135608 A1 | 5/2012 | Shimoi et al. |
| 2012/0145331 A1 | 6/2012 | Gomez et al. |
| 2012/0147449 A1 | 6/2012 | Bhatnagar et al. |
| 2012/0196071 A1 | 8/2012 | Cornejo et al. |
| 2012/0196454 A1 | 8/2012 | Shah et al. |
| 2012/0205356 A1 | 8/2012 | Pluss |
| 2012/0211923 A1 | 8/2012 | Garner et al. |
| 2012/0214004 A1 | 8/2012 | Hashimoto et al. |
| 2012/0216570 A1 | 8/2012 | Abramov et al. |
| 2012/0229787 A1 | 9/2012 | Van et al. |
| 2012/0234049 A1 | 9/2012 | Bolton |
| 2012/0234807 A1 | 9/2012 | Sercel et al. |
| 2012/0237731 A1 | 9/2012 | Boegli et al. |
| 2012/0255935 A1 | 10/2012 | Kakui et al. |
| 2012/0262689 A1 | 10/2012 | Van et al. |
| 2012/0293784 A1 | 11/2012 | Xalter et al. |
| 2012/0297568 A1 | 11/2012 | Spezzani |
| 2012/0299219 A1 | 11/2012 | Shimoi et al. |
| 2012/0302139 A1 | 11/2012 | Darcangelo et al. |
| 2012/0320458 A1 | 12/2012 | Knutson |
| 2012/0324950 A1 | 12/2012 | Dale et al. |
| 2013/0019637 A1 | 1/2013 | Sol et al. |
| 2013/0031879 A1 | 2/2013 | Yoshikane et al. |
| 2013/0034688 A1 | 2/2013 | Koike et al. |
| 2013/0044371 A1 | 2/2013 | Rupp et al. |
| 2013/0047671 A1 | 2/2013 | Kohli |

(56) References Cited

U.S. PATENT DOCUMENTS

| | | |
|---|---|---|
| 2013/0056450 A1 | 3/2013 | Lissotschenko et al. |
| 2013/0061636 A1 | 3/2013 | Imai et al. |
| 2013/0068736 A1 | 3/2013 | Mielke et al. |
| 2013/0075480 A1 | 3/2013 | Yokogi et al. |
| 2013/0078891 A1 | 3/2013 | Lee et al. |
| 2013/0091897 A1 | 4/2013 | Fujii et al. |
| 2013/0122264 A1 | 5/2013 | Fujii et al. |
| 2013/0126573 A1* | 5/2013 | Hosseini ............ B23K 26/0604 225/2 |
| 2013/0126751 A1 | 5/2013 | Mizoguchi et al. |
| 2013/0129947 A1 | 5/2013 | Harvey et al. |
| 2013/0133367 A1 | 5/2013 | Abramov et al. |
| 2013/0216573 A1 | 5/2013 | Hosseini et al. |
| 2013/0139708 A1 | 6/2013 | Hotta |
| 2013/0143416 A1 | 6/2013 | Norval |
| 2013/0149434 A1 | 6/2013 | Oh et al. |
| 2013/0149494 A1 | 6/2013 | Koike et al. |
| 2013/0167590 A1 | 7/2013 | Teranishi et al. |
| 2013/0171425 A1 | 7/2013 | Wang et al. |
| 2013/0174607 A1 | 7/2013 | Wootton et al. |
| 2013/0174610 A1 | 7/2013 | Teranishi et al. |
| 2013/0177033 A1 | 7/2013 | Muro et al. |
| 2013/0180285 A1 | 7/2013 | Kariya |
| 2013/0180665 A2 | 7/2013 | Gomez et al. |
| 2013/0189806 A1 | 7/2013 | Hoshino |
| 2013/0192305 A1 | 8/2013 | Black et al. |
| 2013/0209731 A1 | 8/2013 | Nattermann et al. |
| 2013/0210245 A1 | 8/2013 | Jackl |
| 2013/0220982 A1 | 8/2013 | Thomas et al. |
| 2013/0221053 A1 | 8/2013 | Zhang |
| 2013/0222877 A1 | 8/2013 | Greer et al. |
| 2013/0224439 A1 | 8/2013 | Zhang et al. |
| 2013/0228918 A1 | 9/2013 | Chen et al. |
| 2013/0247615 A1 | 9/2013 | Boek et al. |
| 2013/0248504 A1 | 9/2013 | Kusuda |
| 2013/0266757 A1 | 10/2013 | Giron et al. |
| 2013/0270240 A1 | 10/2013 | Kondo |
| 2013/0280495 A1 | 10/2013 | Matsumoto |
| 2013/0288010 A1 | 10/2013 | Akarapu et al. |
| 2013/0291598 A1 | 11/2013 | Saito et al. |
| 2013/0312460 A1 | 11/2013 | Kunishi et al. |
| 2013/0323469 A1 | 12/2013 | Abramov et al. |
| 2013/0334185 A1 | 12/2013 | Nomaru |
| 2013/0340480 A1 | 12/2013 | Nattermann et al. |
| 2013/0344684 A1 | 12/2013 | Bowden |
| 2014/0023087 A1 | 1/2014 | Czompo |
| 2014/0027951 A1 | 1/2014 | Srinivas et al. |
| 2014/0034730 A1 | 2/2014 | Lee |
| 2014/0042202 A1 | 2/2014 | Lee |
| 2014/0047957 A1 | 2/2014 | Wu |
| 2014/0076869 A1 | 3/2014 | Lee et al. |
| 2014/0083986 A1 | 3/2014 | Zhang et al. |
| 2014/0102146 A1 | 4/2014 | Saito et al. |
| 2014/0110040 A1 | 4/2014 | Cok |
| 2014/0113797 A1 | 4/2014 | Yamada et al. |
| 2014/0133119 A1 | 5/2014 | Kariya et al. |
| 2014/0141192 A1 | 5/2014 | Fernando et al. |
| 2014/0141217 A1 | 5/2014 | Gulati et al. |
| 2014/0147623 A1 | 5/2014 | Shorey et al. |
| 2014/0147624 A1 | 5/2014 | Streltsov et al. |
| 2014/0165652 A1 | 6/2014 | Saito |
| 2014/0174131 A1 | 6/2014 | Saito et al. |
| 2014/0182125 A1 | 7/2014 | Rozbicki et al. |
| 2014/0199519 A1 | 7/2014 | Schillinger et al. |
| 2014/0216108 A1 | 8/2014 | Wiegel et al. |
| 2014/0238962 A1 | 8/2014 | Nawrodt et al. |
| 2014/0239034 A1 | 8/2014 | Cleary et al. |
| 2014/0239552 A1 | 8/2014 | Srinivas et al. |
| 2014/0290310 A1 | 10/2014 | Green |
| 2014/0291122 A1 | 10/2014 | Bando |
| 2014/0320947 A1 | 10/2014 | Egerton et al. |
| 2014/0333929 A1 | 11/2014 | Sung et al. |
| 2014/0339207 A1 | 11/2014 | Sugiyama et al. |
| 2014/0340730 A1 | 11/2014 | Bergh et al. |
| 2014/0352400 A1 | 12/2014 | Barrilado et al. |
| 2014/0361463 A1 | 12/2014 | Desimone et al. |
| 2015/0014891 A1 | 1/2015 | Amatucci et al. |
| 2015/0034612 A1 | 2/2015 | Hosseini et al. |
| 2015/0038313 A1 | 2/2015 | Hosseini |
| 2015/0044445 A1 | 2/2015 | Garner et al. |
| 2015/0059986 A1 | 3/2015 | Komatsu et al. |
| 2015/0060402 A1 | 3/2015 | Burkett et al. |
| 2015/0075221 A1 | 3/2015 | Kawaguchi et al. |
| 2015/0075222 A1 | 3/2015 | Mader |
| 2015/0110442 A1 | 4/2015 | Zimmel et al. |
| 2015/0118522 A1 | 4/2015 | Hosseini |
| 2015/0121960 A1 | 5/2015 | Hosseini |
| 2015/0122656 A1 | 5/2015 | Hosseini |
| 2015/0136743 A1 | 5/2015 | Hosseini |
| 2015/0140241 A1 | 5/2015 | Hosseini |
| 2015/0140735 A1 | 5/2015 | Hosseini |
| 2015/0151380 A1 | 6/2015 | Hosseini |
| 2015/0158120 A1 | 6/2015 | Courvoisier et al. |
| 2015/0165396 A1 | 6/2015 | Mattson et al. |
| 2015/0165548 A1 | 6/2015 | Marjanovic et al. |
| 2015/0165560 A1 | 6/2015 | Hackert et al. |
| 2015/0165561 A1 | 6/2015 | Le et al. |
| 2015/0165562 A1 | 6/2015 | Marjanovic et al. |
| 2015/0165563 A1 | 6/2015 | Manley et al. |
| 2015/0166391 A1* | 6/2015 | Marjanovic ........ B23K 26/0624 428/192 |
| 2015/0166393 A1 | 6/2015 | Marjanovic et al. |
| 2015/0166394 A1 | 6/2015 | Marjanovic et al. |
| 2015/0166395 A1 | 6/2015 | Marjanovic et al. |
| 2015/0166396 A1 | 6/2015 | Marjanovic et al. |
| 2015/0166397 A1 | 6/2015 | Marjanovic et al. |
| 2015/0183679 A1 | 7/2015 | Saito |
| 2015/0209922 A1 | 7/2015 | Yoshikawa |
| 2015/0232369 A1* | 8/2015 | Marjanovic ........ B23K 26/0622 428/192 |
| 2015/0299018 A1 | 10/2015 | Bhuyan et al. |
| 2015/0311058 A1 | 10/2015 | Antsiferov et al. |
| 2015/0350991 A1 | 12/2015 | Sayadi et al. |
| 2015/0352671 A1 | 12/2015 | Darzi |
| 2015/0360991 A1 | 12/2015 | Grundmueller et al. |
| 2015/0362817 A1 | 12/2015 | Patterson et al. |
| 2015/0362818 A1 | 12/2015 | Greer |
| 2015/0367442 A1 | 12/2015 | Bovatsek et al. |
| 2016/0008927 A1 | 1/2016 | Grundmueller et al. |
| 2016/0009066 A1 | 1/2016 | Nieber et al. |
| 2016/0009585 A1 | 1/2016 | Bookbinder et al. |
| 2016/0016257 A1 | 1/2016 | Hosseini |
| 2016/0023922 A1 | 1/2016 | Addiego et al. |
| 2016/0031737 A1 | 2/2016 | Hoppe et al. |
| 2016/0031745 A1 | 2/2016 | Ortner et al. |
| 2016/0039044 A1 | 2/2016 | Kawaguchi |
| 2016/0059359 A1 | 3/2016 | Krueger et al. |
| 2016/0060156 A1 | 3/2016 | Krueger et al. |
| 2016/0097960 A1 | 4/2016 | Dixit et al. |
| 2016/0138328 A1 | 5/2016 | Behmke et al. |
| 2016/0152516 A1 | 6/2016 | Bazemore et al. |
| 2016/0154284 A1 | 6/2016 | Sano |
| 2016/0168396 A1 | 6/2016 | Letocart et al. |
| 2016/0279895 A1 | 9/2016 | Marjanovic et al. |
| 2016/0280580 A1 | 9/2016 | Bohme |
| 2016/0282521 A1 | 9/2016 | Uchiyama et al. |
| 2016/0290791 A1 | 10/2016 | Buono et al. |
| 2016/0311717 A1 | 10/2016 | Nieber et al. |
| 2016/0368100 A1 | 12/2016 | Marjanovic et al. |
| 2017/0002601 A1 | 1/2017 | Bergh et al. |
| 2017/0008791 A1 | 1/2017 | Kim et al. |
| 2017/0052381 A1 | 2/2017 | Huang et al. |
| 2017/0120374 A1 | 5/2017 | Hendricks et al. |
| 2017/0169847 A1 | 6/2017 | Tamaki |
| 2017/0183168 A1 | 6/2017 | Jia |
| 2017/0197868 A1 | 7/2017 | Gupta et al. |
| 2017/0225996 A1 | 8/2017 | Bookbinder et al. |
| 2017/0252859 A1 | 9/2017 | Kumkar et al. |
| 2017/0355634 A1 | 12/2017 | Thierry |
| 2017/0368638 A1 | 12/2017 | Tayebati et al. |
| 2018/0029919 A1 | 2/2018 | Schnitzler et al. |
| 2018/0029920 A1 | 2/2018 | Marjanovic et al. |
| 2018/0062342 A1 | 3/2018 | Comstock et al. |
| 2018/0093914 A1 | 4/2018 | Akarapu et al. |

(56) References Cited

U.S. PATENT DOCUMENTS

| | | | |
|---|---|---|---|
| 2018/0118602 A1 | 5/2018 | Hackert et al. |
| 2018/0133837 A1 | 5/2018 | Greenberg et al. |
| 2018/0134606 A1 | 5/2018 | Wagner et al. |
| 2018/0186677 A1 | 7/2018 | Ito et al. |
| 2018/0186678 A1 | 7/2018 | Boeker et al. |
| 2018/0297887 A1 | 10/2018 | Spier et al. |

FOREIGN PATENT DOCUMENTS

| | | |
|---|---|---|
| CN | 1473087 A | 2/2004 |
| CN | 1517313 A | 8/2004 |
| CN | 1573364 A | 2/2005 |
| CN | 1619778 A | 5/2005 |
| CN | 1735568 A | 2/2006 |
| CN | 1736651 A | 2/2006 |
| CN | 1283409 C | 11/2006 |
| CN | 1890074 A | 1/2007 |
| CN | 1920632 A | 2/2007 |
| CN | 1930097 A | 3/2007 |
| CN | 101031383 A | 9/2007 |
| CN | 101043936 A | 9/2007 |
| CN | 101048255 A | 10/2007 |
| CN | 101386466 A | 3/2009 |
| CN | 101502914 A | 8/2009 |
| CN | 101595554 A | 12/2009 |
| CN | 101610870 A | 12/2009 |
| CN | 201357287 Y | 12/2009 |
| CN | 101622722 A | 1/2010 |
| CN | 101637849 A | 2/2010 |
| CN | 201471092 U | 5/2010 |
| CN | 101821071 A | 9/2010 |
| CN | 101862907 A | 10/2010 |
| CN | 101965242 A | 2/2011 |
| CN | 101980982 A | 2/2011 |
| CN | 102046545 A | 5/2011 |
| CN | 102060437 A | 5/2011 |
| CN | 102066034 A | 5/2011 |
| CN | 102105256 A | 6/2011 |
| CN | 102233485 A | 11/2011 |
| CN | 102248302 A | 11/2011 |
| CN | 102272355 A | 12/2011 |
| CN | 102326232 A | 1/2012 |
| CN | 102343631 A | 2/2012 |
| CN | 102356049 A | 2/2012 |
| CN | 102356050 A | 2/2012 |
| CN | 102574246 A | 7/2012 |
| CN | 102596830 A | 7/2012 |
| CN | 102642092 A | 8/2012 |
| CN | 102649199 A | 8/2012 |
| CN | 102672355 A | 9/2012 |
| CN | 102674709 A | 9/2012 |
| CN | 102741012 A | 10/2012 |
| CN | 102898014 A | 1/2013 |
| CN | 102916081 A | 2/2013 |
| CN | 102923939 A | 2/2013 |
| CN | 102962583 A | 3/2013 |
| CN | 103013374 A | 4/2013 |
| CN | 103079747 A | 5/2013 |
| CN | 103086591 A | 5/2013 |
| CN | 103143841 A | 6/2013 |
| CN | 103159401 A | 6/2013 |
| CN | 203021443 U | 6/2013 |
| CN | 103237771 A | 8/2013 |
| CN | 103273195 A | 9/2013 |
| CN | 103316990 A | 9/2013 |
| CN | 103329035 A | 9/2013 |
| CN | 103339559 A | 10/2013 |
| CN | 103359947 A | 10/2013 |
| CN | 103359948 A | 10/2013 |
| CN | 103531414 A | 1/2014 |
| CN | 10346027 A | 4/2014 |
| CN | 203509350 U | 4/2014 |
| CN | 103817434 A | 5/2014 |
| CN | 103831539 A | 6/2014 |
| CN | 104108870 A | 10/2014 |
| CN | 104344202 A | 2/2015 |
| CN | 204211638 U | 3/2015 |
| CN | 104690428 A | 6/2015 |
| CN | 105081564 A | 11/2015 |
| CN | 105164581 A | 12/2015 |
| CN | 105209218 A | 12/2015 |
| CN | 105246850 A | 1/2016 |
| CN | 103224117 B | 2/2016 |
| CN | 105392593 A | 3/2016 |
| CN | 105517969 A | 4/2016 |
| CN | 205328860 U | 6/2016 |
| CN | 106007349 A | 10/2016 |
| CN | 106029293 A | 10/2016 |
| CN | 106102980 A | 11/2016 |
| DE | 2231330 | 1/1974 |
| DE | 10322376 A1 | 12/2004 |
| DE | 102006042280 A1 | 6/2007 |
| DE | 10200635555 A1 | 1/2008 |
| DE | 102011000768 A1 | 8/2012 |
| DE | 102012010635 A1 | 11/2013 |
| DE | 102012110971 A1 | 5/2014 |
| DE | 102013103370 A1 | 10/2014 |
| DE | 102013223637 | 5/2015 |
| DE | 102014213775 A1 | 1/2016 |
| DE | 102014116958 A1 | 5/2016 |
| DE | 102016102768 A1 | 8/2017 |
| EA | 004167 B1 | 2/2004 |
| EP | 0270897 A1 | 6/1988 |
| EP | 0609978 A1 | 8/1994 |
| EP | 0656241 A1 | 6/1995 |
| EP | 0938946 A1 | 9/1999 |
| EP | 0949541 A2 | 10/1999 |
| EP | 1043110 A2 | 10/2000 |
| EP | 1306196 A1 | 5/2003 |
| EP | 1159104 B1 | 8/2004 |
| EP | 1609559 A1 | 12/2005 |
| EP | 1990125 A1 | 11/2008 |
| EP | 2105239 A1 | 9/2009 |
| EP | 2133170 A1 | 12/2009 |
| EP | 2202545 A1 | 6/2010 |
| EP | 2258512 A1 | 12/2010 |
| EP | 2398746 A1 | 12/2011 |
| EP | 2574983 A1 | 4/2013 |
| EP | 2754524 A1 | 7/2014 |
| EP | 2781296 A1 | 9/2014 |
| EP | 2783784 A2 | 10/2014 |
| EP | 2859984 A2 | 4/2015 |
| EP | 2965853 A1 | 1/2016 |
| EP | 3311947 A1 | 4/2018 |
| FR | 298294 A1 | 10/2013 |
| GB | 1242172 | 8/1971 |
| GB | 2481190 A | 12/2011 |
| JP | 53-018756 A | 2/1978 |
| JP | 61-027212 A | 2/1986 |
| JP | 61-074794 A | 4/1986 |
| JP | 62-046930 A | 2/1987 |
| JP | 63-192561 A | 8/1988 |
| JP | 64-077001 A | 3/1989 |
| JP | 01-179770 A | 7/1989 |
| JP | 1179770 A | 7/1989 |
| JP | 05-274085 A | 10/1993 |
| JP | 05-300544 A | 11/1993 |
| JP | 06-082720 A | 3/1994 |
| JP | 06-318756 A | 11/1994 |
| JP | 6318756 A | 11/1994 |
| JP | 08-184581 A | 7/1996 |
| JP | 09-109243 A | 4/1997 |
| JP | 09106243 A | 4/1997 |
| JP | 11-197498 A | 7/1999 |
| JP | 11269683 A | 10/1999 |
| JP | 11-330597 A | 11/1999 |
| JP | 11-347861 A | 12/1999 |
| JP | 11347758 A | 12/1999 |
| JP | 2000-225485 A | 8/2000 |
| JP | 2000-327349 A | 11/2000 |
| JP | 2001-130921 A | 5/2001 |
| JP | 2001138083 A | 5/2001 |
| JP | 2001-179473 A | 7/2001 |
| JP | 2002-045985 A | 2/2002 |

(56) References Cited

FOREIGN PATENT DOCUMENTS

| | | |
|---|---|---|
| JP | 2002-205181 A | 7/2002 |
| JP | 2002-210730 A | 7/2002 |
| JP | 2002228818 A | 8/2002 |
| JP | 2002-321081 A | 11/2002 |
| JP | 2003-025085 A | 1/2003 |
| JP | 2003-088985 A | 3/2003 |
| JP | 2003062756 A | 3/2003 |
| JP | 2003114400 A | 4/2003 |
| JP | 2003154517 A | 5/2003 |
| JP | 2003-181668 A | 7/2003 |
| JP | 2003238178 A | 8/2003 |
| JP | 3445250 B2 | 9/2003 |
| JP | 2003-340579 A | 12/2003 |
| JP | 2004-182530 A | 7/2004 |
| JP | 2004209675 A | 7/2004 |
| JP | 2004-348137 A | 12/2004 |
| JP | 2005-000952 A | 1/2005 |
| JP | 2005104819 A | 4/2005 |
| JP | 2005-135964 A | 5/2005 |
| JP | 2005-179154 A | 7/2005 |
| JP | 2005-219960 A | 8/2005 |
| JP | 2005205440 A | 8/2005 |
| JP | 2005-263623 A | 9/2005 |
| JP | 2005288503 A | 10/2005 |
| JP | 2006-108478 A | 4/2006 |
| JP | 3775250 B2 | 5/2006 |
| JP | 3775410 B2 | 5/2006 |
| JP | 2006130691 A | 5/2006 |
| JP | 2006-150385 A | 6/2006 |
| JP | 2006-182009 A | 7/2006 |
| JP | 2006-240948 A | 9/2006 |
| JP | 3823108 B2 | 9/2006 |
| JP | 2006248885 A | 9/2006 |
| JP | 2006-327711 A | 12/2006 |
| JP | 2007021548 A | 2/2007 |
| JP | 2007-079514 A | 3/2007 |
| JP | 2007-196277 A | 8/2007 |
| JP | 2007253203 A | 10/2007 |
| JP | 2008-018547 A | 1/2008 |
| JP | 2008-132616 A | 6/2008 |
| JP | 2008-168327 A | 7/2008 |
| JP | 2008-522950 A | 7/2008 |
| JP | 2008-266046 A | 11/2008 |
| JP | 2008-288577 A | 11/2008 |
| JP | 2009056482 A | 3/2009 |
| JP | 2009-082958 A | 4/2009 |
| JP | 2009-084089 A | 4/2009 |
| JP | 2009-126779 A | 6/2009 |
| JP | 2009-142886 A | 7/2009 |
| JP | 2009-178725 A | 8/2009 |
| JP | 2009172633 A | 8/2009 |
| JP | 2009-255114 A | 11/2009 |
| JP | 2009-269057 A | 11/2009 |
| JP | 2010017990 A | 1/2010 |
| JP | 2010-042424 A | 2/2010 |
| JP | 4418282 B2 | 2/2010 |
| JP | 2010046761 A | 3/2010 |
| JP | 04592855 B2 | 12/2010 |
| JP | 2011-011212 A | 1/2011 |
| JP | 2011-037707 A | 2/2011 |
| JP | 2011049398 A | 3/2011 |
| JP | 2011-512259 A | 4/2011 |
| JP | 04672689 B2 | 4/2011 |
| JP | 2011-517299 A | 6/2011 |
| JP | 2011-517622 A | 6/2011 |
| JP | 2011-138083 A | 7/2011 |
| JP | 2011-147943 A | 8/2011 |
| JP | 2011-240291 A | 12/2011 |
| JP | 04880820 B2 | 2/2012 |
| JP | 2012024782 A | 2/2012 |
| JP | 2012031018 A | 2/2012 |
| JP | 2012-517957 A | 8/2012 |
| JP | 2012159749 A | 8/2012 |
| JP | 2012187618 A | 10/2012 |
| JP | 2012-232894 A | 11/2012 |
| JP | 2012-528772 A | 11/2012 |
| JP | 2013007842 A | 1/2013 |
| JP | 2013031879 A | 2/2013 |
| JP | 2013043808 A | 3/2013 |
| JP | 2013-063863 A | 4/2013 |
| JP | 2013075802 A | 4/2013 |
| JP | 2013091578 A | 5/2013 |
| JP | 2013-121908 A | 6/2013 |
| JP | 2013-521131 A | 6/2013 |
| JP | 2013-136075 A | 7/2013 |
| JP | 2013-144613 A | 7/2013 |
| JP | 2013-528492 A | 7/2013 |
| JP | 2013-150990 A | 8/2013 |
| JP | 2013-168445 A | 8/2013 |
| JP | 05274085 B2 | 8/2013 |
| JP | 05300544 B2 | 9/2013 |
| JP | 2013187247 A | 9/2013 |
| JP | 2013203630 A | 10/2013 |
| JP | 2013203631 A | 10/2013 |
| JP | 2013223886 A | 11/2013 |
| JP | 2013-245153 A | 12/2013 |
| JP | 2014-001102 A | 1/2014 |
| JP | 2014-037006 A | 2/2014 |
| JP | 2014-104484 A | 6/2014 |
| JP | 2014-117707 A | 6/2014 |
| JP | 2014-156289 A | 8/2014 |
| JP | 2015-030040 A | 2/2015 |
| JP | 2015-076115 A | 4/2015 |
| JP | 2015-091606 A | 5/2015 |
| JP | 2015-129076 A | 7/2015 |
| JP | 2015-519722 A | 7/2015 |
| JP | 2015-543336 | 2/2016 |
| JP | 2016-021077 A | 2/2016 |
| JP | 2016-513024 A | 5/2016 |
| JP | 2016-515085 A | 5/2016 |
| JP | 6061193 B2 | 1/2017 |
| KR | 10-2000-0071829 A | 11/2000 |
| KR | 10-2002-0031573 A | 5/2002 |
| KR | 2009057161 A | 6/2009 |
| KR | 10-2009-0107417 A | 10/2009 |
| KR | 2010-0120297 A | 11/2010 |
| KR | 10-2011-0001948 A | 1/2011 |
| KR | 1020621 B1 | 3/2011 |
| KR | 10-2011-0120862 A | 11/2011 |
| KR | 2011-0121637 A | 11/2011 |
| KR | 10-2012-0000073 A | 1/2012 |
| KR | 2012015366 A | 2/2012 |
| KR | 10-1120471 B1 | 3/2012 |
| KR | 2012074508 A | 7/2012 |
| KR | 2012-0102675 A | 9/2012 |
| KR | 2013031380 A | 3/2013 |
| KR | 10-1259349 B1 | 4/2013 |
| KR | 1269474 B1 | 5/2013 |
| KR | 10-2013-0075651 A | 7/2013 |
| KR | 2013-0079395 A | 7/2013 |
| KR | 10-2013-0111269 A | 10/2013 |
| KR | 2013124646 A | 11/2013 |
| KR | 10-2013-0135873 A | 12/2013 |
| KR | 10-2013-0140561 A | 12/2013 |
| KR | 1344368 B1 | 12/2013 |
| KR | 2014022980 A | 2/2014 |
| KR | 2014022981 A | 2/2014 |
| KR | 1020140064220 A | 5/2014 |
| KR | 10-2014-0112652 A | 9/2014 |
| KR | 10-2015-0009153 A | 1/2015 |
| KR | 2015-0016176 A | 2/2015 |
| NL | 2017998 | 6/2018 |
| TW | 480550 | 3/2002 |
| TW | 201041027 A | 11/2010 |
| TW | 201107253 A | 3/2011 |
| TW | 201139025 A | 11/2011 |
| TW | I362370 B | 4/2012 |
| TW | 201226345 A | 7/2012 |
| TW | 201311592 A | 3/2013 |
| TW | 201331136 A | 8/2013 |
| TW | 201339111 A | 10/2013 |
| TW | 201433550 A | 9/2014 |
| TW | 201436968 A | 10/2014 |
| TW | I468354 B | 1/2015 |

(56) References Cited

FOREIGN PATENT DOCUMENTS

| | | |
|---|---|---|
| TW | I520804 B | 2/2016 |
| TW | 201612615 A | 4/2016 |
| WO | 98/21154 A1 | 5/1998 |
| WO | 1999029243 A1 | 6/1999 |
| WO | 1999063900 A1 | 12/1999 |
| WO | 02/39063 A1 | 5/2002 |
| WO | 2003/007370 A1 | 1/2003 |
| WO | 2004110693 A1 | 12/2004 |
| WO | 2006/017583 A2 | 2/2006 |
| WO | 2006073098 A1 | 7/2006 |
| WO | 2007094160 A1 | 8/2007 |
| WO | 2007/108589 A1 | 9/2007 |
| WO | 2007/119740 A1 | 10/2007 |
| WO | 2008/012186 A1 | 1/2008 |
| WO | 2008049389 A1 | 5/2008 |
| WO | 2008080182 A1 | 7/2008 |
| WO | 2008/102848 A1 | 8/2008 |
| WO | 2008/108332 A1 | 9/2008 |
| WO | 2008/126742 A1 | 10/2008 |
| WO | 2008128612 A1 | 10/2008 |
| WO | 2009/012913 A1 | 1/2009 |
| WO | 2009/114372 A2 | 9/2009 |
| WO | 2009114375 A2 | 9/2009 |
| WO | 2009/119694 A1 | 10/2009 |
| WO | 2010035736 A1 | 4/2010 |
| WO | 2010/096359 A1 | 8/2010 |
| WO | 2010/111609 A2 | 9/2010 |
| WO | 2010/129459 A2 | 11/2010 |
| WO | 2011/025908 A1 | 3/2011 |
| WO | 2011056781 A1 | 5/2011 |
| WO | 2012006736 A2 | 1/2012 |
| WO | 2012/075072 A2 | 6/2012 |
| WO | 2012166753 A2 | 6/2012 |
| WO | 2012108052 A1 | 8/2012 |
| WO | 2013/016157 A1 | 1/2013 |
| WO | 2013022148 A1 | 2/2013 |
| WO | 2013043173 A1 | 3/2013 |
| WO | 2013/084877 A1 | 6/2013 |
| WO | 2013/084879 A1 | 6/2013 |
| WO | 2013138802 A1 | 9/2013 |
| WO | 2013150990 A1 | 10/2013 |
| WO | 2013153195 A1 | 10/2013 |
| WO | 2014/010490 A1 | 1/2014 |
| WO | 2014/012125 A1 | 1/2014 |
| WO | 2014/028022 A1 | 2/2014 |
| WO | 2014/058663 A1 | 4/2014 |
| WO | 2014/075995 A2 | 5/2014 |
| WO | 2014064492 A1 | 5/2014 |
| WO | 2014079478 A1 | 5/2014 |
| WO | 2014079570 A1 | 5/2014 |
| WO | 2014/085663 A1 | 6/2014 |
| WO | 2014/111385 A1 | 7/2014 |
| WO | 2014/111794 A1 | 7/2014 |
| WO | 2014/121261 A1 | 8/2014 |
| WO | 2014/132493 A1 | 9/2014 |
| WO | 2014/161534 A2 | 10/2014 |
| WO | 2014/161535 A2 | 10/2014 |
| WO | 2015/077113 A1 | 5/2015 |
| WO | 2015/094898 A2 | 6/2015 |
| WO | 2015/095088 A1 | 6/2015 |
| WO | 2015/095090 A1 | 6/2015 |
| WO | 2015/095146 A1 | 6/2015 |
| WO | 2015/095151 A2 | 6/2015 |
| WO | 2015/100056 A1 | 7/2015 |
| WO | 2015/114032 A1 | 8/2015 |
| WO | 2015/128833 A1 | 9/2015 |
| WO | 2015/132008 A1 | 9/2015 |
| WO | 2015127583 A1 | 9/2015 |
| WO | 2016/007843 A1 | 1/2016 |
| WO | 2016/010991 A1 | 1/2016 |
| WO | 2016005455 A1 | 1/2016 |
| WO | 2016010954 A2 | 1/2016 |
| WO | 2016/079275 A1 | 5/2016 |
| WO | 2016/089799 A1 | 6/2016 |
| WO | 2016/100954 A1 | 6/2016 |
| WO | 2016154284 A1 | 9/2016 |
| WO | 2017/009149 A1 | 1/2017 |
| WO | 2017/079570 A2 | 5/2017 |
| WO | 2017/091529 A1 | 6/2017 |
| WO | 2017/093393 A1 | 6/2017 |

OTHER PUBLICATIONS

Merola et al. "Characterization of Bessel beams generated by polymeric microaxicons" Meas. Sci. Technol. 23 (2012) 10 pgs.

Mirkhalaf, M. et al., Overcoming the brittleness of glass through bio-inspiration and micro-achitecture, Nature Communications, 5:3166/ncomm4166(2014).

Perry et al., "Ultrashort-pulse laser machining of dielectric materials"; Journal of Applied Physics, vol. 85, No. 9, May 1, 1999, American Institute of Physics, pp. 6803-6810.

Perry et al., "Ultrashort-pulse laser machining"; UCRL-ID-132159, Sep. 1998, pp. 1-38.

Perry et al., "Ultrashort-pulse laser machining"; UCRL-JC-132159 Rev 1., Jan. 22, 1999, pp. 1-24.

Polynkin et al., "Extended filamentation with temporally chirped femtosecond Bessel-Gauss beams in air"; Optics Express, vol. 17, No. 2, Jan. 19, 2009, OSA, pp. 575-584.

Romero et al. "Theory of optimal beam splitting by phase gratings. II. Square and hexagonal gratings" J. Opt. Soc. Am. A/vol. 24 No. 8 (2007) pp. 2296-2312.

Salleo A et al., Machining of transparent materials using IR and UV nanosecond laser pulses, Appl. Physics A 71, 601-608, 2000.

Serafetinides et al., "Polymer ablation by ultra-short pulsed lasers" Proceedings of SPIE vol. 3885 (2000) http://proceedings.spiedigitallibrary.org/.

Serafetinides et al., "Ultra-short pulsed laser ablation of polymers"; Applied Surface Science 180 (2001) 42-56.

Shah et al. "Micromachining with a high repetition rate femtosecond fiber laser", Journal of Laser Micro/Nanoengineering vol. 3 No. 3 (2008) pp. 157-162.

Shealy et al. "Geometric optics-based design of laser beam shapers",Opt. Eng. 42(11), 3123-3138 (2003). doi:10.1117/1.1617311.

Stoian et al. "Spatial and temporal laser pulse design for material processing on ultrafast scales" Applied Physics A (2014) 114, p. 119-127.

Sundaram et al., "Inducing and probing non-thermal transitions in semiconductors using femtosecond laser pulses" Nature Miracles, vol. 1, Dec. 2002, Nature Publishing Group (2002), pp. 217-224.

Thiele, "Relation between catalytic activity and size of particle" Industrial and Egineering Chemistry, vol. 31 No. 7, pp. 916-920.

Toytman et al. "Optical breakdown in transparent media with adjustable axial length and location", Optics Express vol. 18 No. 24, 24688-24698 (2010).

Vanagas et al., "Glass cutting by femtosecond pulsed irradiation"; J. Micro/Nanolith. MEMS MOEMS. 3(2), 358-363 (Apr. 1,2004); doi: 10.1117/1.1668274.

Varel et al., "Micromachining of quartz with ultrashort laser pulses"; Applied Physics A 65, 367-373, Springer-Verlag (1997).

Velpula et al.. "Ultrafast imaging of free carriers: controlled excitation with chirped ultrafast taser Bessel beams", Proc. Of SPIE vol. 8967 896711-1 (2014).

Wang et al, "Investigation on CO2 laser irradiation inducing glass strip peeling for microchannel formation", BIOMICROFLUIDICS 6, 012820 (2012).

Wu et al. "Optimal orientation of the cutting head for enhancing smoothness movement in three-dimensional laser cutting" (2013) Zhongguo Jiguang/Chinese Journal of Lasers, 40 (1), art. No. 0103005.

Xu et al. "Optimization of 3D laser cutting head orientation based on the minimum energy consumption" (2014) International Journal of Advanced Manufacturing Technology, 74 (9-12), pp. 1283-1291.

Yan et al. "Fiber structure to convert a Gaussian beam to higher-order optical orbital angular momentum modes" Optics Letters vol. 37 No. 16 (2012) pp. 3294-3296.

(56) References Cited

OTHER PUBLICATIONS

Yoshino et al., "Micromachining with a high repetition rate femtosecond fiber laser"; JLMN—Journal of Laser Micro/Nanoengineering vol. 3, No. 3 (2008), pp. 157-162.
Zeng et al. "Characteristic analysis of a refractive axicon system for optical trepanning"; Optical Engineering 45(9), 094302 (Sep. 2006), pp. 094302-1-094302-10.
Zhang et al., "Design of diffractive-phase axicon illuminated by a Gaussian-profile beam"; Acta Physica Sinica (overseas edition), vol. 5, No. 5 (May 1996) Chin. Phys. Soc., 1004-423X/96/05050354-11, pp. 354-364.
Kerr. "Filamentary tracks formed in transparent optical glass by laser beam self-focusing. II. Theoretical Analysis" Physical Review A. 4(3) 1971, pp. 1196-1218.
"What is the difference between Ra and RMS?"; Harrison Electropolishing LP; (http://www.harrisonep.com/electropolishingra.html), Accessed Aug. 8, 2016.
"EagleEtch" Product Brochure, EuropeTec USA Inc., pp. 1-8, Aug. 1, 2014.
"PHAROS High-power femtosecond laser system" product brochure; Light Conversion, Vilnius, LT; Apr. 18, 2011, pp. 1-2.
"TruMicro 5000" Product Manual, Trumpf Laser GmbH + Co. KG, pp. 1-4, Aug. 2011.
Abakians et al."Evaporative Cutting of a Semitransparent Body With a Moving CW Laser", J. Heat Transfer 110(4a), 924-930 (Nov. 1, 1988) (7 pages) doi:10.1115/1.3250594.
Abramov et al., "Laser separation of chemically strengthened glass"; Physics Procedia 5 (2010) 285-290, Elsevier.; doi: 10.1016/j.phpro.2010.08.054.
Ahmed et al. "Display glass cutting by femtosecond laser induced single shot periodic void array" Applied Physics A: Materials Science and Proccessing vol. 93 No. 1 (2008) pp. 189-192.
Arimoto et al., "Imaging properties of axicon in a scanning optical system"; Applied Optics, Nov. 1, 1992, vol. 31, No. 31, pp. 6653-6657.
Bagchi et al. "Fast ion beams from intense, femtosecond laser irradiated nanostructured surfaces" Applied Physics B 88 (2007) p. 167-173.
Bhuyan et al. "Laser micro- and nanostructuring using femtosecond Bessel beams", Eur. Phys. J. Special Topics 199 (2011) p. 101-110.
Bhuyan et al. "Single shot high aspect ratio bulk nanostructuring of fused silica using chirp-controlled ultrafast laser Bessel beams" Applied Physics Letters 104 (2014) 021107.
Bhuyan et al. "Ultrafast Bessel beams for high aspect ratio taper free micromachining of glass" Proc. Of SPIE vol. 772 77281V-1.
Bhuyan et al., "Femtosecond non-diffracting Bessel beams and controlled nanoscale ablation" by IEEE (2011).
Bhuyan et al., "High aspect ratio nanochannel machining using single shot femtosecond Bessel beams"; Applied Physics Letters 97, 081102 (2010); doi: 10.1063/1.3479419.
Bhuyan et al., "High aspect ratio taper-free microchannel fabrication using femtosecond Bessel beams"; Optics Express (2010) vol. 18, No. 2, pp. 566-574.
Case Design Guidelines for Apple Devices Release R5 (https://web.archive.org/web/20131006050442/https://developer.apple.com/resources/cases/Case-Design-Guidelines.pdf; archived on Oct. 6, 2013).
Chiao et al. 9. "Self-trapping of optical beams," Phys. Rev. Lett, vol. 13, No. 15, p. 479 (1964).
Corning Inc., "Corning® 1737 AM LCD Glass Substrates Material Information", issued Aug. 2002.
Corning Inc., "Coming® Eagle2000 TM AMLCD Glass Substrates Material Information", issued Apr. 2005.
Couairon et al. "Femtosecond filamentation in transparent media" Physics Reports 441 (2007) pp. 47-189.
Courvoisier et al. "Applications of femtosecond Bessel beams to laser ablation" Applied Physics A (2013) 112, p. 29-34.
Courvoisier et al. "Surface nanoprocessing with non-diffracting femtosecond Bessel beams" Optics Letters vol. 34 No. 20, (2009) p. 3163-3165.
Cubeddu et al., "A compact time-resolved reflectance system for dual-wavelength multichannel assessment of tissue absorption and scattering"; Part of the SPIE Conference on Optical Tomography and Spectroscopy of Tissue III, San Jose, CA (Jan. 1999), SPIE vol. 3597, 0277-786X/99, pp. 450-455.
CUBEDDU et al., "Compact tissue oximeter based on dual-wavelength multichannel time-resolved reflectance" Applied Optics, vol. 38, No. 16. Jun. 1, 1999, pp. 3670-3680.
Ding et al., "High-resolution optical coherence tomography over a large depth range with an axicon lens"; Optic Letters, vol. 27, No. 4, pp. 243-245, Feb. 15, 2002, Optical Society of America.
Dong et al. "On-axis irradiance distribution of axicons illuminated by spherical wave", Optics & Laser Technology 39 K2007) 1258-1261.
Duocastella et al. "Bessel and annular beams for material processing", Laser Photonics Rev. 6, 607-621, 2012.
Durnin. "Exact solutions for nondiffracting beams I. The scaler theory" J. Opt Soc. Am. A. 4(4) pp. 651-654.
Eaton et al. "Heat accumulation effects in femtosecond laser written waveguides with variable repetition rates", Opt. Exp. 5280, vol. 14, No. 23, Jun. 2006.
Gattass et al. "Micromachining of bulk glass with bursts of femtosecond laser pulses at variable repetition rates" Opt. Exp. 5280, vol. 14, No. 23, Jun. 2006.
Girkin et al., "Macroscopic multiphoton biomedical imaging using semiconductor saturable Bragg reflector modelocked Lasers";'Part of the SPIE Conference on Commercial and Biomedical Applications of Ultrafast Lasers, San Jose, CA (Jan. 1999), SPIE vol. 3616, 0277-786X/99, pp. 92-98.
Glezer et al., "Ultrafast-laser driven micro-explosions in transparent materials"; Applied Physics Letters, vol. 71 K1997), pp. 882-884.
Golub, I., "Fresnel axicon"; Optic Letters, vol. 31, No. 12, Jun. 15, 2006, Optical Society of America, pp. 1890-1892.
Gori et al. "Analytical derivation of the optimum triplicator" Optics Communications 157 (1998) pp. 13-16.
Herman et al., "Laser micromachining of 'transparent' fused silica with 1-ps pulses and pulse trains"; Part of the SPIE Conference on Commercial and Biomedical Applications of Ultrafast Lasers, San Jose, CA (Jan. 1999), SPIE vol. 3616, 0277-786X/99, pp. 148-155.
Honda et al. "A Novel Polymer Film that Controls Light Transmission", Progress in Pacific Polymer Science 3, 159-169 (1994).
http://www.gtat.com/Collateral/Documents/English-US/Sapphire/12-21-12_GT_TouchScreen_V3_web.pdf.
Hu et al. "5-axis laser cutting interference detection and correction based on STL model" (2009) Zhongguo Jiguang/Chinese Journal of Lasers, 36 (12), pp. 3313-3317.
Huang et al., "Laser etching of glass substrates by 1064 nm laser irradiation", Applied Physics, Oct. 2008, vol. 93, Issue 1, pp. 159-162.
Juodkazis S et al. Laser induced microexplosion confined in the bulk of a sapphire crystal: evidence of multimegabar pressures., Phys. Rev. Lett. 96, 166101, 2006.
Karlsson et al. "The technology of chemical glass strengthening—a review" Glass Technol: Eur. J. Glass Sci. Technol. A (2010) 51 (2) pp. 41-54.
Kosareva et al., "Formation of extended plasma channels in a condensed medium upon axicon focusing of a femtosecond laser pulse"; Quantum Electronics 35 (11) 1013-1014 (2005), Kvantovaya Elektronika and Turpion Ltd.; doi: 10.1070/QE2005v035n11ABEH013031.
Kruger et al., "Femtosecond-pulse visible laser processing of transparent materials"; Applied Surface Science 96-98 (1996) 430-438.
Kruger et al., "Laser micromachining of barium aluminium borosilicate glass with pluse durations between 20 fs and 3 ps"; Applied Surface Science 127-129 (1998) 892-898.
Kruger et al., "Structuring of dielectric and metallic materials with ultrashort laser pulses between 20 fs and 3 ps"; SPIE vol. 2991, 0277-786X/97, pp. 40-47.
Lapczyna et al., "Ultra high repetition rate (133 MHz) laser ablation of aluminum with 1.2-ps pulses"; Applied Physic A 69 [Suppl.], S883-S886, Springer-Verlag (1999); doi: 10.1007/s003399900300.

(56) References Cited

OTHER PUBLICATIONS

Levy et al. "Design, fabrication, and characterization of circular Dammann gratings based on grayscale lithography," Opt. Lett vol. 35, No. 6, p. 880-882 (2010).
Liu X et al. "laser ablation and micromachining with ultrashort laser pulses", IEEE J. Quantum Electronics, 22, 1706-1716, 1997.
Maeda et al. "Optical performance of angle-dependent light-control glass", Proc. SPIE 1536, Optical Materials Technology for Energy Efficiency and Solar Energy Conversion X, 138 (Dec. 1, 1991).
Mbise et al. "Angular selective window coatings: theory and experiments" J. Phys. D: Appl. Phys. 30 2103 (1997).
"Aviation Manufacturing Technology"; Beijing Aviation Manufacturing Engineering Research Institute Aviation Industry Press; (2013) p. 147.
Amended claims 1,2 Amended Claims (Nov. 21, 2018) GMvp4 p. 1.
Case Design Guidelines for Apple Devices; Sep. 13, 2013; pp. 1-58; Apple Inc.
Claim 1—published on Nov. 20, 2019 EP947: Anspruch 1—erteilt am Nov. 20, 2019 GMvp5 p. 1.
D6 Amended claim 1 EP947: Anspruch 1—geandert am Nov. 21, 2018 GMvp3 p. 1.
Eaton, S. et al.; Heat accumulation effects in femtosecond laser-written waveguides with variable repetition rate; Optics Express; Jun. 13, 2005; pp. 4708-4716; vol. 13, No. 12; Optical Society of America.
European Patent Application No. 16714696.8 Communication under Rule 71(3) EPC dated Oct. 9, 2020; 6 Pages; European Patent Office.
European Patent Application No. 16714696.8 Office Action dated Feb. 20, 2020; 4 Pages; European Patent Office.
European Patent Application No. 16714696.8 Office Action dated Sep. 21, 2018; 7 Pages; European Patent Office.
Faccio et al. "Kerr-induced spontaneous Bessel beam formation in the regime of strong two-photon absorption" Optics Express 16(11) 2008, pp. 8213-8218.
Gollier et al., U.S. Appl. No. 62/024,122, "Systems and Methods for Processing Transparent Materials Using Adjustable Laser Beam Focal Lines", filed Jul. 14, 2014., U.S. Appl. No. 62/024,122.
GT ASF Grown Sapphire Cover and Touch Screen Material; wvvw.gtat.com, 2012; pp. 1-2; GTAT Corporation.
International Search Report and Written Opinion of the International Searching Authority; PCT/US2016/023738; dated Jul. 4, 2016; 12 Pages; European Patent Office.
Perry, M. et al.; Ultrashort-Pulse Laser Machining; International Congress on Applications of Lasers and Electro-Optics; Orlando, Florida; Nov. 16-19, 1998; pp. 1-24.
Polesana (Polesana, P., Dubietis, A., Porras, A. Kucinskas, E. Faccio, D. Couairon, A. and DiTrapani, P.,, "Near-field dynamics of ultrashort pulsed Bessel beams in media with Kerr nonlinearity", Physical Review E 73, 056612 (2006)).
Product Data Sheet for Corning Eagle XG Slim Glass, Issued Aug. 2013; 2 Pages.
Product data sheet for Corning Eagle XR glass substrate, issued Jan. 2006 (Year: 2006).
Produktbeschreibung Pharos Laser vom Apr. 18, 2011, "Pharos_2011 Anlage E 1 a-1. pdf".
U.S. Appl. No. 62/208,282, filed Aug. 21, 2015.
Sukumaran, "Design, Fabrication, and Characterization of Ultrathin 3-D Glass Interposers with Through-Package-Vias at Same Pitch as TSVs in Silicon." IEEE Transactions on Components, Packaging and Manufacturing Technology, vol. 4, No. 5: 786-795, (2014.).
Sukumaran, "Through-Package-Via Formation and Metallization of Glass Interposers.", Electronic Components and Technology Conference: 557-563, (2010).
U.S. Appl. No. 62/137,443, "Laser Cutting and Processing of Display Glass Compositions", filed Mar. 24, 2015., U.S. Appl. No. 62/137,443.
Unichains, Engineering Manual: Innovative Belt & Chain solutions for every industry and application, available publically at least as of Jun. 1, 2016 as evidenced at the following hyperlink: https://web.archive.org/web/20160601OOOOOO/http://www.unichains.com/.
Chinese Patent Application No. 201680029955.7, Office Action dated Mar. 29, 2021; 5 pages (English Translation Only); Chinese Patent Office.
European Patent Application No. 16714696.8 Decision to grant a European patent dated Mar. 18, 2021; 2 Pages; European Patent Office.
European Patent Application No. 21155842.4 European search report dated May 21, 2021; 10 pages; European Patent Office.
GMvP NORM-TR, "Lasers and Laser-related Equipment—Part 3: Intrinsic and Geometrical Laser Beam Classification, Propagation and Details of Test Methods", Technical Report, ISO/TR 11146-3, 2004, 32 pages.
ICNIRP, Infrared Radiation, https://www.icnirp.org/en/frequencies/infrared/index.html#:~:text=Wavelength, accessed Apr. 7, 2021 (Year: 2014).
Japanese Patent Application No. 2017-549740, Office Action dated Oct. 7, 2020, 7 pages (3 pages of English Translation and 4 pages of Original Document); Japanese Patent Office.
Jonas Weiss, et al., "Optical Interconnects for Disaggregated Resources in Future Datacenters", ECOC 2014, Cannes-France, 3 pgs.
Tian e al., "Development status and Prospects of TFT-LCD Substrate Glass Chemical Composition", vol. 29, No. 6, 2010, pp. 1348-1362 (English Abstract Submitted).
Tsai et al. ,"Internal modification for cutting transparent glass using femtosecond Bessel beams", Optical Engineering, Soc. of Photo-optical Instrumentation Engineering, Bellingham, vol. 53, May 2014, p. 51503.
Tymon Barwicz, et al., "Assembly of Mechanically Compliant Interfaces between Optical Fibers and Nanophotonic Chips", Tymon Barwicz (IBM), et al., Electronic Components & Technology Conference, 2014,. 978-1799-2407-3, 2014 IEEE, pp. 179-185.

* cited by examiner

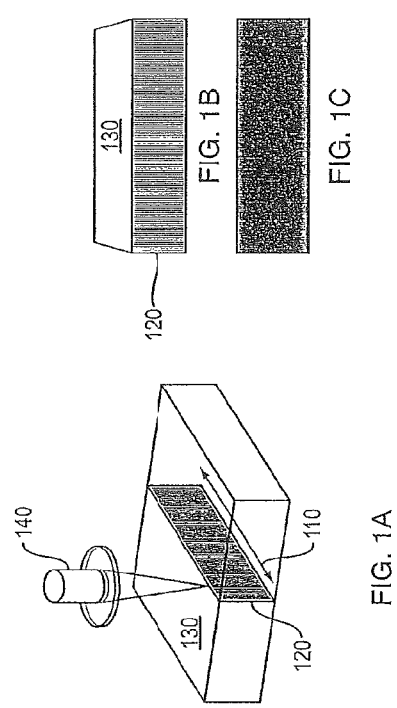

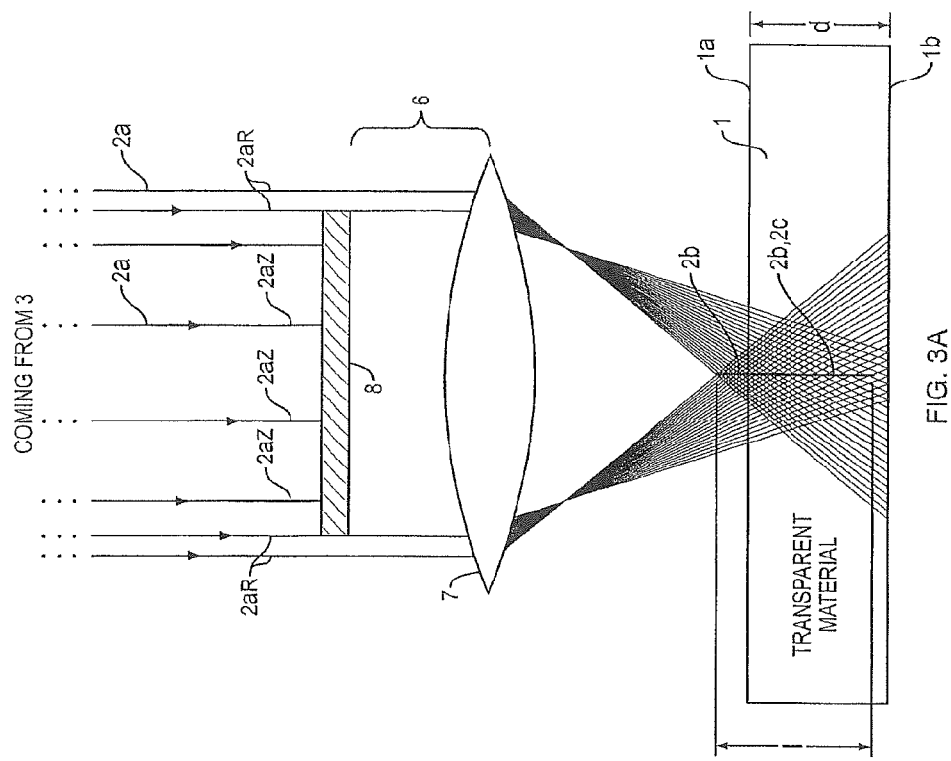

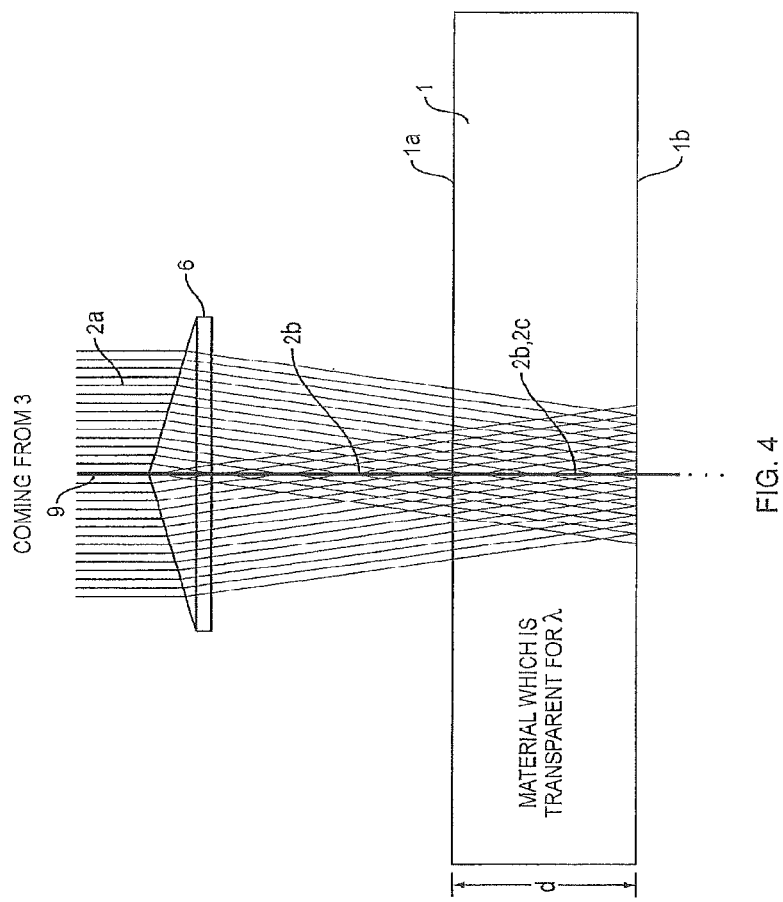

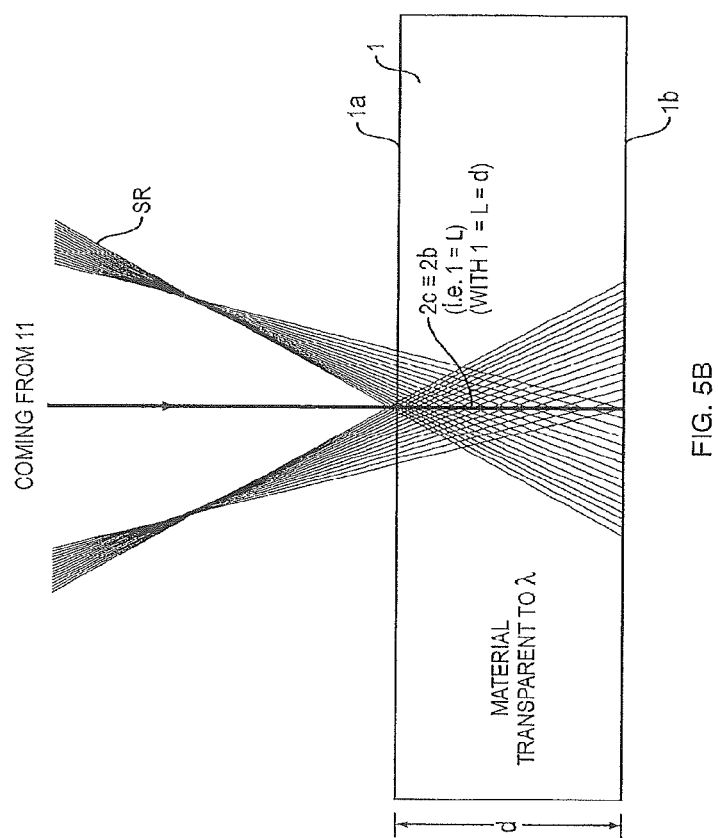

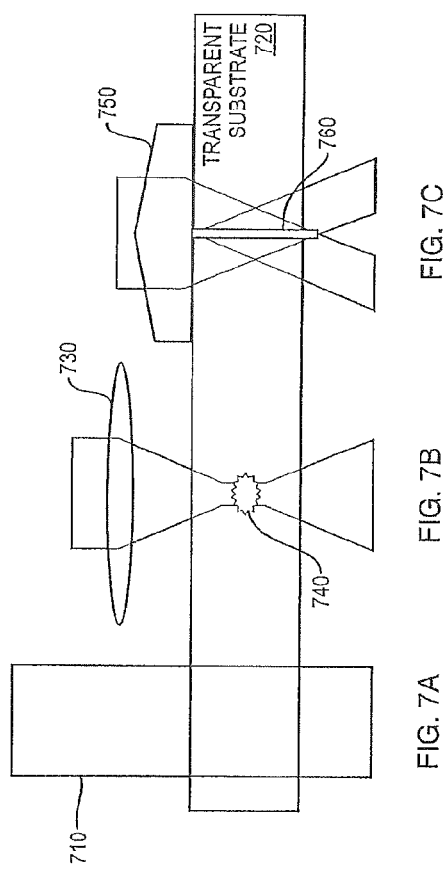

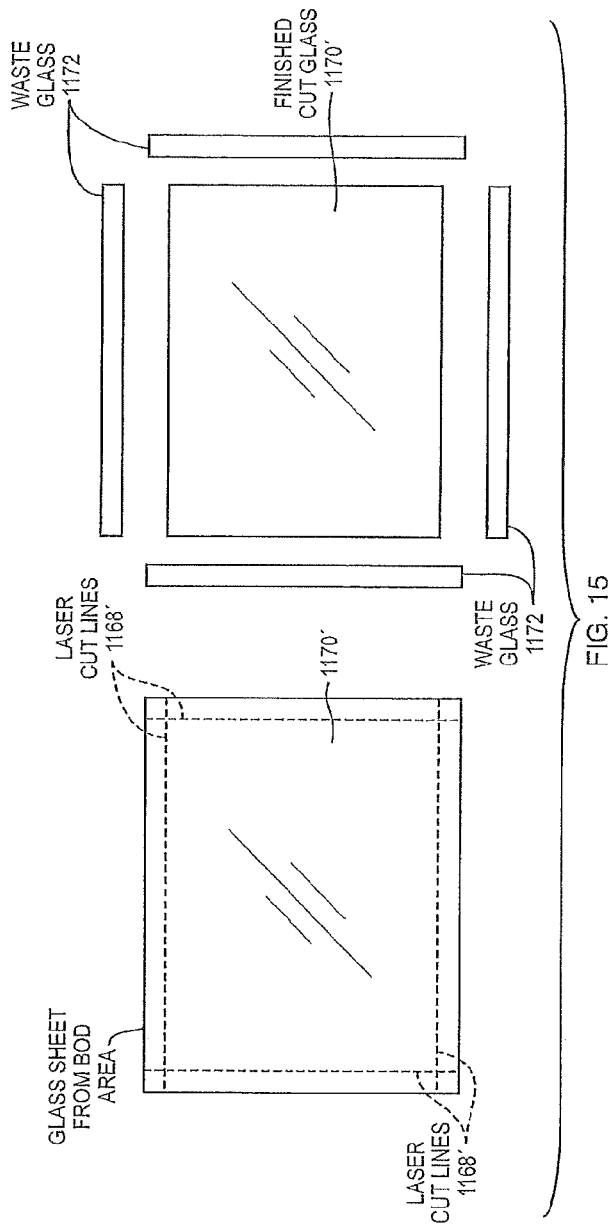

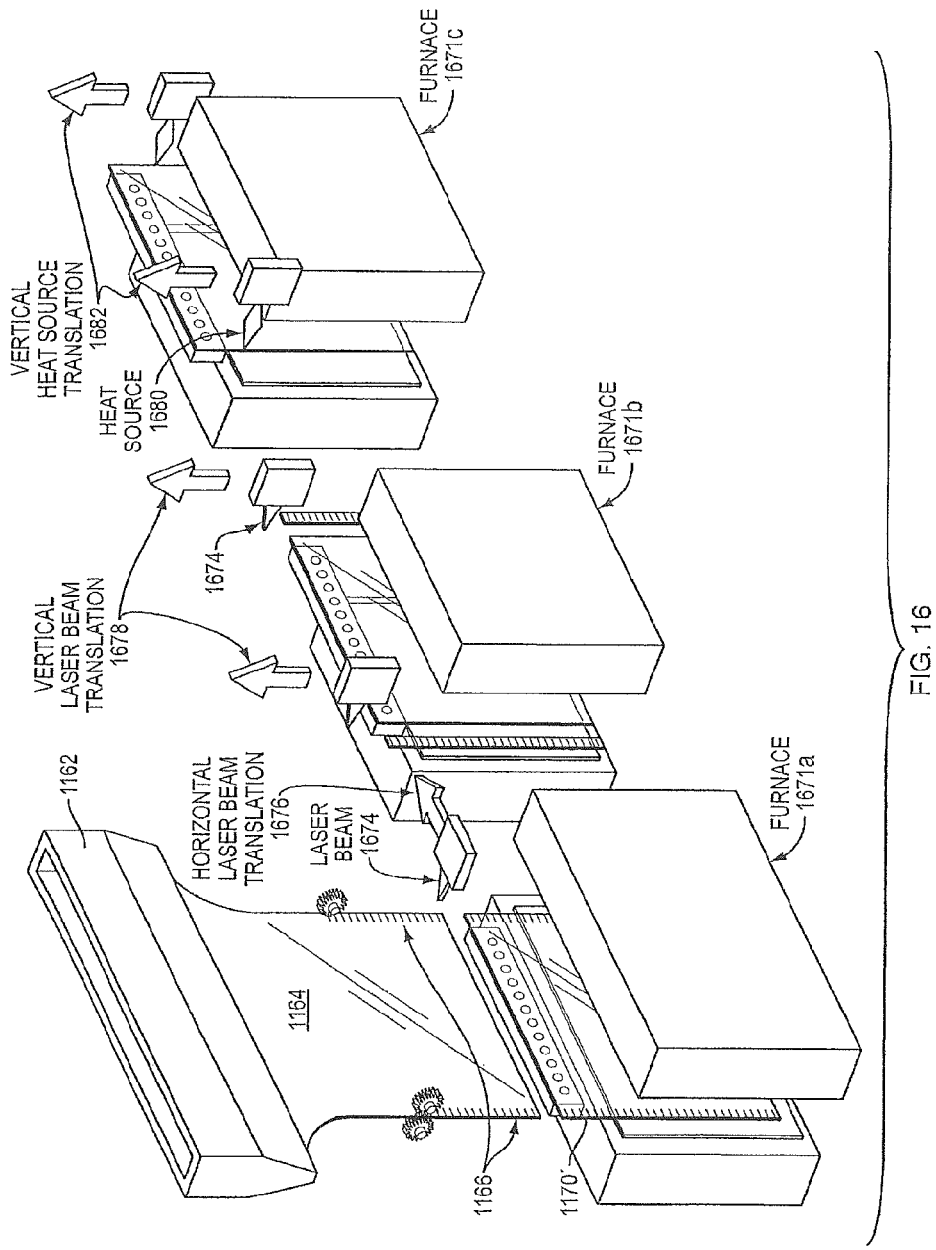

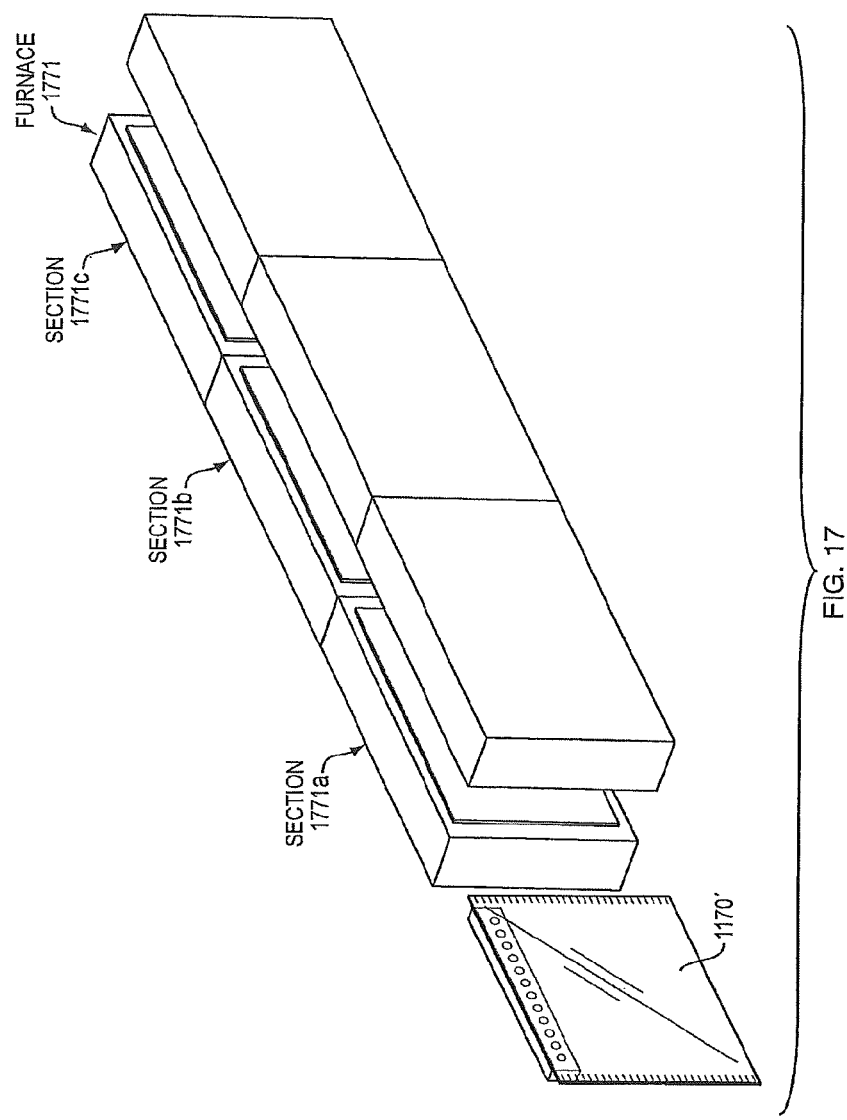

LASER CUTTING AND PROCESSING OF DISPLAY GLASS COMPOSITIONS

CROSS-REFERENCE TO RELATED APPLICATIONS

This application claims the benefit of priority under 35 U.S.C. § 365 of International Application No. PCT/US2016/23738, filed on Mar. 23, 2016, which claims the benefit of priority of U.S. Provisional Application Ser. No. 62/137,443 filed on Mar. 24, 2015, the content of which is relied upon and incorporated herein by reference in its entirety.

BACKGROUND

The area of laser processing of materials encompasses a wide variety of applications that involve cutting, drilling, milling, welding, melting, etc. and different types of materials. Among these applications, one that is of particular interest is cutting or separating different types of substrates, for example on a process to separate thin film transistor (TFT) or display glass compositions.

From process development and cost perspectives there are many opportunities for improvement in cutting and separation of glass substrates. It is of great interest to have a faster, cleaner, cheaper, more repeatable and more reliable method of glass separation than what is currently practiced in the market today.

SUMMARY

The present application describes a laser cutting technology for cutting and separating thin substrates of transparent materials, and more specifically cutting of display glass compositions mainly used for production of Thin Film Transistors (TFT) devices. The described laser process can be used to make straight cuts at up to >1 m/sec, to cut sharp radii outer corners (<1 mm), and to create arbitrary curved shapes including forming interior holes and slots. For example, exemplary embodiments can be used to form a circular glass memory disk having an interior hole in which a spindle can be inserted.

The present application also describes methods of cutting the glasses and then subsequently processing the parts with a variety of methods to raise both the edge strength and the edge impact strength of the cut glass part to levels much higher than can be achieved with the cutting process alone. The methods described herein can also cut stacks of these glasses in a single pass, improving process time and machine utilization.

In one embodiment, a method of laser processing an alkaline earth boro-aluminosilicate glass composite workpiece includes focusing a pulsed laser beam into a laser beam focal line oriented along the beam propagation direction. The laser beam focal line is also directed into the glass composite workpiece, the laser beam focal line generating an induced absorption within the material, and the induced absorption producing defect lines or a damage track along the laser beam focal line within the workpiece. The method also includes translating the workpiece and the laser beam relative to each other along a contour, and laser forming a plurality of defect lines along the contour within the workpiece, wherein a spacing (or periodicity) between adjacent defect lines is between 5 micron and 15 microns. The pulsed laser produces pulse bursts with 5-20 pulses per pulse burst and pulse burst energy of 300-600 micro Joules/pulse.

Laser forming the plurality of defect lines along the contour within the workpiece can facilitate separating the workpiece along a surface defined by the contour to form a separated surface. The induced absorption can produce an Ra surface roughness of the cut and separated edge of less than or equal to about 0.5 micron. The induced absorption can also produce particles on the separated surface with an average diameter of less than 3 microns.

According to some embodiments a glass article comprises alkaline earth boro-aluminosilicate glass composite including at least one edge having a plurality of defect lines extending at least 250 microns, the defect lines each having a diameter less than or equal to about 1 microns, separated by a distance of 5 micron and 15 microns. According to some embodiments the at least one edge has subsurface damage up to a depth less than or equal to about 100 microns and/or an Ra surface roughness of less than or equal to about 0.5 micron. In some embodiments this glass article has a thickness of 0.5 mm to 7 mm. The developed laser method can be tailored for manual or mechanical separation of the parts from the panel or full laser separation by thermal stressing the desired profile. The method involves the utilization of an ultra-short pulse laser and can be followed by a $CO_2$ laser to create thermal stress, sometimes coupled with high pressure air flow, for fully automated separation.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating the exemplary embodiments.

FIGS. 1A-1C are illustrations of a fault line (or perforated line) with equally spaced defect lines or damage tracks of modified glass.

FIG. 3A is an illustration of an optical assembly for laser processing according to one embodiment.

FIG. 4 is an illustration of a second embodiment of an optical assembly for laser processing.

FIGS. 5A and 5B are illustrations of a third embodiment of an optical assembly for laser processing.

FIGS. 7A-7C are illustrations of different laser intensity regimes for laser processing of materials. FIG. 7A illustrates an unfocused laser beam, FIG. 7B illustrates a condensed laser beam with a spherical lens, and FIG. 7C illustrates a condensed laser beam with an axicon or diffractive Fresnel lens.

FIG. 9B illustrates the damage track in a 0.5 mm thick piece of Eagle XG® glass (top view), and FIG. 9C illustrates the damage track in the same glass, bottom view.

FIG. 15 illustrates use laser-based cutting of glass away from the draw to remove trim or waste glass from the sheet.

FIG. 16 illustrates laser-based process of cutting on the draw using a multi-stage furnace hold the glass sheet at a temperature close to its annealing point.

FIG. 17 illustrates a multistage furnace configured to impart a prescribed temperature cooling profile to a glass sheet that is cut on the draw.

DETAILED DESCRIPTION

Figures 2A, 2B:
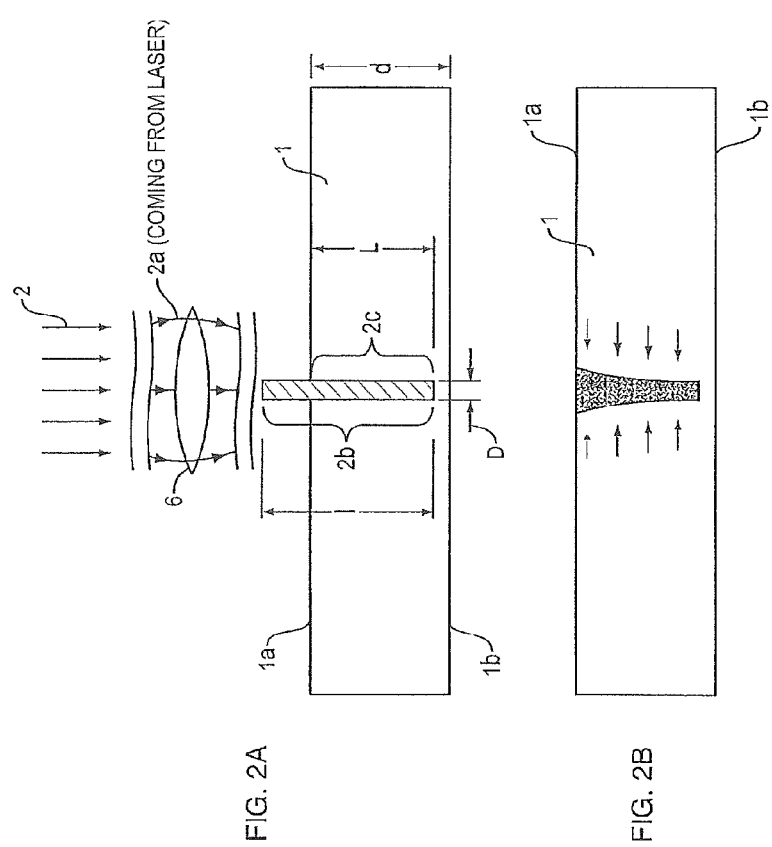
FIGS. 2A and 2B are illustrations of positioning of the laser beam focal line, i.e., the processing of a material transparent for the laser wavelength due to the induced absorption along the focal line.

A description of example embodiments follows.

The present application provides a process for precision cutting and separation of glass compositions, such as for example, alkaline earth boro-aluminosilicate glass compositions, for example display and/or TFT (thin film transistor) glass compositions to what would constitute the finished part out of a substrate of glass. Some examples of such glasses or glass compositions are Eagle XG®, Contego, Corning Lotus™, and Corning Lotus NXT™ available from Corning Incorporated of Corning, N.Y. The alkaline earth boro-aluminosilicate glass compositions can be formulated to be suitable to act as substrates for application of electronic devices such as thin film transistors. This means that the TFT glass compositions typically have coefficients of thermal expansion (CTE) similar to that of silicon (preferably not more than 5 ppm/C°, preferably less than 4 ppm/C°, for example approximately 3 ppm/C°, or 2.5-3.5 ppm/C°), and have low levels of alkali within the glass. Low levels of alkali (i.e., trace amounts 0 to 2%, preferably <1 wt %, for example <0.5 wt %) are preferred for the glasses that are used in TFT applications, because alkali dopants, under some conditions, can leach out of glass and contaminate silicon processes, and that is undesirable. The laser cutting process separates glass parts in a controllable fashion with negligible debris and minimum defects and low subsurface damage to the edges, preserving part strength. The laser method developed is well suited for materials that are transparent to the selected laser wavelength. This wavelength may be, for example, 1064, 532, 355 or 266 nanometers. The workpiece or TFT glass composition should preferably be substantially transparent to the selected laser wavelength (i.e., absorption less than about 10%, and preferably less than about 1% per mm of material depth). Demonstrations of the method have been made, for example by using Eagle XG® compositions in thicknesses ranging from 0.025 mm to 0.7 mm.

The process fundamental step described below is to create a vertical fault line that delineates the desired shape and establishes a path of least resistance for crack propagation and hence separation and detachment of the shape from its substrate matrix. The laser separation method can be tuned and configured to enable manual or mechanical separation, partial separation or total separation of glass shapes out of the original substrate.

In the first step the object to be processed is irradiated with an ultra-short pulsed (pulse width less than 100 psec) laser beam (at wavelengths at or below 1064 nm) that is condensed into a high aspect ratio line focus that penetrates through the thickness of the substrate. Within this volume of high energy density the material is modified via nonlinear effects. It is important to note that without this high optical intensity, nonlinear absorption is not triggered. Below this intensity threshold, the material is transparent to the laser radiation and remains in its original state. By scanning the laser over a desired line or path we create a narrow defect line or contour or path (a few microns wide) and define the perimeter or shape to be separated in the next step.

The laser source can create multi-photon absorption (MPA) in substantially transparent materials such as glass composite workpieces. MPA is the simultaneous absorption of two or more photons of identical or different frequencies in order to excite a molecule from one state (usually the ground state) to a higher energy electronic state (ionization). The energy difference between the involved lower and upper states of the molecule is equal to the sum of the energies of the two photons. MPA, also called induced absorption, can be a second-order or third-order process (or higher order), for example, that is several orders of magnitude weaker than linear absorption. It differs from linear absorption in that the strength of second-order induced absorption can be proportional to the square of the light intensity, for example, and thus it is a nonlinear optical process.

Once the line or contour with vertical defects or perforations is created, separation can occur via: 1) manual or mechanical stress on or around the perforated fault line; the stress or pressure should create tension that pulls both sides of the perforated fault line apart and break the areas that are still bonded together; 2) using a heat source, create a stress zone around the fault line to put the vertical defect or perforated fault line in tension, inducing partial or total separation In both cases, separation depends on several of the process parameters, such as laser scan speed, laser power, parameters of lenses, pulse width, repetition rate, etc.

This laser cutting process makes use of an ultra-short pulse laser in combination with optics that generates a focal line to fully perforate the body of a range of glass compositions. In some embodiments, the pulse duration of the individual pulses is in a range of between greater than about 1 picoseconds and less than about 100 picoseconds, such as greater than about 5 picoseconds and less than about 20 picoseconds, and the repetition rate of the individual pulses can be in a range of between about 1 kHz and 4 MHz, such as in a range of between about 10 kHz and 650 kHz.

In addition to a single pulse operation at the aforementioned individual pulse repetition rates, the pulses can be produced in bursts of two pulses, or more (such as, for example, 3 pulses, 4, pulses, 5 pulses, 10 pulses, 15 pulses, 20 pulses, or more) separated by a duration between the individual pulses within the burst that is in a range of between about 1 nsec and about 50 nsec, for example, 10 to 30 nsec, such as about 20 nsec, and the burst repetition frequency can be in a range of between about 1 kHz and about 200 kHz. (Bursting or producing pulse bursts is a type of laser operation where the emission of pulses is not in a uniform and steady stream but rather in tight clusters of pulses.) The pulse burst laser beam can have a wavelength selected such that the material is substantially transparent at this wavelength. The average laser power per burst measured at the material can be greater than 40 microJoules per mm thickness of material, for example between 40 microJoules/mm and 2500 microJoules/mm, or between 500 and 2250 microJoules/mm. For example, for 0.5-0.7 mm thick Corning Eagle XG® glass, one may use 300-600 µJ pulse bursts to cut and separate the glass, which corresponds to an exemplary range of 428 µJ/mm to 1200 µJ/mm (e.g., 300 µJ/0.7 mm for 0.7 mm Eagle XG®glass and 600 µJ/0.5 mm for a 0.5 mm Eagle XG®glass).

The glass is moved relative to the laser beam (or the laser beam is translated relative to the glass) to create perforated lines that trace out the shape of any desired parts. The laser creates hole-like defect zones (or damage tracks, or defect lines) that penetrate the full depth the glass, with internal openings of approximately 1 micron in diameter. In display or TFT type glasses these perforations, defect regions, damage tracks, or defect lines are generally spaced from one another not less than 5 microns apart and not greater than 20 microns apart, and preferably 5-15 microns apart. For example, 5-12 microns, 7-15 microns, or 7-12 microns for the TFT/display glasses.

As defined herein, the diameter or internal diameter of a defect line is the internal diameter of the open channel or air hole in the glass or workpiece. For example, in some embodiments described herein the internal diameter of the defect line is <500 nm, for example ≤400 nm, or ≤300 nm. Furthermore, the internal diameter of a defect line can be as large as the spot diameter of the laser beam focal line, for example. The laser beam focal line can have an average spot diameter in a range of between about 0.1 micron and about 10 microns, preferably between 0.1 and 5 microns, for example 1.5 to 3.5 microns. Once a workpiece or glass part is separated along a fault line or contour, the defect lines on the cut and separated surface can potentially still be viewed and can have a widths comparable to the internal diameters of the defect lines, for example. Thus, widths of defect lines on a cut surface of a glass article prepared by embodiment methods described herein can have widths between about 0.1 micron and about 5 microns, for example.

Beyond single sheets of glass, the process can also be used to cut stacks of glass, and can fully perforate glass stacks of up to a few mm total height with a single laser pass. The glass stacks additionally may have air gaps in various locations; the laser process will still, in a single pass, fully perforate both the upper and lower glass layers of such a stack.

Once the glass is perforated, if the glass has sufficient internal stress, cracks will propagate along the perforation lines and the glass sheet will separate into the desired parts. Since TFT glass compositions are glasses with low coefficient of thermal expansion (CTE <4 ppm/C°) and low internal stress (e.g., <10 MPa, for example <5 MPa to prevent distortion or birefringence when used as display), an additional mechanical separation force is generally applied to separate the glass parts, e.g., a subsequent pass of a $CO_2$ laser along or near the perforation line is used to create thermal stress which will separate the glass along the same pre-programmed perforation lines.

Finally, rounded or chamfered edge is a typical requirement for TFT display glass sheets due to needed high level of reliability during processing and transport. The as-cut edge created by this technology could provide needed high level of reliability. In addition, if additional edge shaping is required, the laser cutting methods described herein enable edge chamfering, which might additionally increase the level of edge reliability (ability to survive stress events and edge impact events). Finally, either rectangular, as-cut edge or a chamfered edge could be additionally fine polished or touch-polished to even further improve the edge strength, the edge impact strength or overall edge reliability. Cutting glass could be achieved either (a) on the fusion glass manufacturing line draw (i.e. on-line), for example at the bottom of the draw of such a manufacturing line, or (b) off-line—i.e., not on the draw, and may be followed by edge chamfering, or polishing.

The present application describes a laser method and apparatus for precision cutting and separation of arbitrary shapes out of transparent substrates, more specifically to cutting TFT glass compositions such as Eagle XG®, Corning Lotus™, Contego, and Corning Lotus NXT™, etc., in a controllable fashion, with negligible debris and minimum damage to part edges that preserves edge strength, edge impact strength and enables high level of glass edge reliability. The developed laser method relies on the material transparency to the laser wavelength in linear regime, or low laser intensity, which allows maintenance of a clean and pristine surface quality and on the reduced subsurface damage created by the area of high intensity around the laser focus. One of the key enablers of this process is the high aspect ratio of the defect or defect line created by the ultra-short pulsed laser. It allows creation of a fault line that extends from the top to the bottom surfaces of the material to be cut. In principle, this defect can be created by a single pulse and if necessary, additional pulses can be used to increase the extension of the affected area (depth and width). In some embodiments, the laser method can be used to form a circular glass memory disk having an interior hole in which a spindle can be inserted. As will be described later, a CO2 laser can be used to release the cut glass from this interior hole. It was unexpectedly discovered that the laser methods described herein can be used to create arbitrary shapes such as, but not limited to, circular shapes, etc., where the starting and ending points meet along the circumference of the circle but do not form a burr. As is known in the art, conventional laser separation methods for curvilinear shapes create a large amount of melted material at the beginning point of the laser separation technique and at the ending point (usually the same or substantially the same location as the beginning point) of the laser separation technique. This burr either adversely affects the qualities of the end product or must be subjected to additional grinding or polishing techniques to remove the burr. Exemplary laser methods according to this disclosure, however, were unexpectedly found not to result in such a burr.

The laser beam focal line can have a length in a range of between about 0.1 mm and about 10 mm, or between about 0.5 mm and about 5 mm, for example s about 1 mm, about 2 mm, about 3 mm, about 4 mm, about 5 mm, about 6 mm, about 7 mm, about 8 mm, or about 9 mm, or a length in a range of between about 0.1 mm and about 2 mm, or between 0.1 mm and about 1 mm, and an average spot diameter in a range of between about 0.1 micron and about 5 microns. The holes or defect lines each can have a diameter between 0.1 microns and 10 microns, for example 0.25 to 5 microns (e.g., 0.2-0.75 microns).

The generation of a line focus may be performed by sending a Gaussian laser beam into an axicon lens, in which case a beam profile known as a Gauss-Bessel beam is created. Such a beam diffracts much more slowly (e.g. may maintain single micron spot sizes for ranges of hundreds of microns or millimeters as opposed to few tens of microns or less) than a Gaussian beam. Hence the depth of focus or length of intense interaction with the material may be much larger than when using a Gaussian beam only. Other forms or slowly diffracting or non-diffracting beams may also be used, such as Airy beams.

As illustrated in FIGS. 1A-1C, the method to cut and separate transparent materials, and more specifically TFT glass compositions, is essentially based on creating a fault line 110 formed of a plurality of vertical defect lines 120 in the material or workpiece 130 to be processed with an ultra-short pulsed laser 140. The defect lines 120 extend, for example, through the thickness of the glass sheet, and are orthogonal to the major (flat) surfaces of the glass sheet. "Fault lines" are also referred to as "contours" herein. While fault lines or contours can be linear, like the fault line 110 illustrated in FIG. 1A, the fault lines or contours can also be nonlinear, having a curvature. Curved fault lines or contours can be produced by translating either the workpiece 130 or laser beam 140 with respect to the other in two dimensions instead of one dimension, for example. Depending on the material properties (absorption, CTE, stress, composition, etc.) and laser parameters chosen for processing the material 130, the creation of a fault line 110 alone can be enough to induce self-separation. In this case, no secondary separation processes, such as tension/bending forces or thermal stress created for example by a $CO_2$ laser, are necessary. As illustrated in FIG. 1A, a plurality of defect lines can define a contour. The separated edge or surface with the defect lines is defined by the contour. The induced absorption creating the defect lines can produce particles on the separated edge or surface with an average diameter of less than 3 microns, resulting in a very clean cutting process.

In some cases, the created fault line 110 is not enough to separate the material spontaneously, and a secondary step may be necessary. While the perforated glass part may be placed in an chamber such as an oven to create a bulk heating or cooling of the glass part, to create thermal stress to separate the parts along the defect line, such a process can be slow and may require large ovens or chambers to accommodate many arts or large pieces or perforated glass. If so desired, a second laser can be used to create thermal stress to separate it, for example. In the case of TFT or display glass compositions, separation can be achieved, after the creation of a fault line, by application of mechanical force or by using a thermal source (e.g., an infrared laser, for example a $CO_2$ laser) to create thermal stress and force separation of the material. Another option is to have the $CO_2$ laser only start the separation and then finish the separation manually. The optional $CO_2$ laser separation is achieved, for example, with a defocused continuous wave (cw) laser emitting at 10.6 microns and with power adjusted by controlling its duty cycle. Focus change (i.e., extent of defocusing up to and including focused spot size) is used to vary the induced thermal stress by varying the spot size. Defocused laser beams include those laser beams that produce a spot size larger than a minimum, diffraction-limited spot size on the order of the size of the laser wavelength. For example, $CO_2$ lasers with spot sizes of 1 to 20 mm, e.g., 1 to 12 mm, 3 to 8 mm can be utilised, for example a $CO_2$ 10.6 µm wavelength laser can form beams with these spot sizes on the perforated glass. Some examples of $CO_2$ laser spot diameters are: 2 mm, 5 mm, 7 mm, 10 mm, and 20 mm. Other lasers, whose emission wavelength is also absorbed by the glass, may also be used, such as lasers with wavelengths emitting in the 9-11 micron range, for example. In such cases $CO_2$ laser with power levels between 100 and 400 Watts may be used, and the beam may be scanned at speeds of 50-500 mm/sec along or adjacent to the defect lines, which creates sufficient thermal stress to induce separation. The exact power levels, spot sizes, and scanning speeds chosen within the specified ranges may depend on the material use, its thickness, coefficient of thermal expansion (CTE), elastic modulus, since all of these factors influence the amount of thermal stress imparted by a specific rate of energy deposition at a given spatial location. If the spot size is too small (i.e. <1 mm), or the $CO_2$ laser power is too high (>400 W), or the scanning speed is too slow (less than 10 mm/sec), the glass may be over heated, creating ablation, melting or thermally generated cracks in the glass, which are undesirable, as they will reduce the edge strength of the separated parts. Preferably the $CO_2$ laser beam scanning speed is >50 mm/sec, in order to induce efficient and reliable part separation. However, if the spot size created by the $CO_2$ laser is too large (>20 mm), or the laser power is too low (<10 W, or in some cases <30 W), or the scanning speed is too high (>500 mm/sec), insufficient heating occurs which results in too low a thermal stress to induce reliable part separation in the alkaline earth boro-aluminosilicate glass compositions (display and/or TFT glasses).

For example, in some embodiments, a $CO_2$ laser power of 200 Watts may be used, with a spot diameter at the glass surface of approximately 6 mm, and a scanning speed of 250 mm/sec to induce part separation for 0.7 mm thick Corning Eagle XG® glass that has been perforated with the above mentioned psec laser. For example, a thicker Corning Eagle XG® glass substrate may require more $CO_2$ laser thermal energy per unit time to separate than a thinner Eagle XG® substrate, or a glass with a lower CTE may require more $CO_2$ laser thermal energy to separate than a glass with a lower CTE. Separation along the perforated line will occur very quickly (less than 1 second) after $CO_2$ spot passes a given location, for example within 100 milliseconds, within 50 milliseconds, or within 25 milliseconds.

For some glasses the distance, or periodicity, between adjacent defect lines 120 along the direction of the fault lines 110 can be greater than 0.1 micron and less than or equal to about 20 microns. For example, in some glasses, the periodicity between adjacent defect lines 120 may be between 0.5 and 15 microns, or between 3 and 10 microns, or between 0.5 micron and 3.0 microns. For example, in some glasses the periodicity between adjacent defect lines 120 can be between 0.5 micron and 1.0 micron. However for alkaline earth boro-aluminosilicate glass compositions disclosed herein, especially those 0.5 mm thick of greater thickness, the periodicity between adjacent defect lines 120 should be preferably >5 microns, and even more preferably 5-15 microns, There are several methods to create the defect line. The optical method of forming the line focus can take multiple forms, using donut shaped laser beams and spherical lenses, axicon lenses, diffractive elements, or other methods to form the linear region of high intensity. The type of laser (picosecond, femtosecond, etc.) and wavelength (IR, green, UV, etc.) can also be varied, as long as sufficient optical intensities are reached to create breakdown of the substrate material in the region of focus to create breakdown of the substrate material or glass workpiece, through nonlinear optical effects. Preferably, the laser is a pulse burst laser which allows for control of the energy deposition with time by adjusting the number of pulses within a given burst.

In the present application, an ultra-short pulsed laser is used to create a high aspect ratio vertical defect line in a consistent, controllable and repeatable manner. The essence of this concept is to use optics to create a line focus of a high intensity laser beam within a transparent part. One version of this concept is to use an axicon lens element in an optical lens assembly to create a region of high aspect ratio, taper-free microchannels using ultra-short (picoseconds or femtosecond duration) Bessel beams. In other words, the axicon condenses the laser beam into a high intensity region of cylindrical shape and high aspect ratio (long length and small diameter). Due to the high intensity created with the condensed laser beam, nonlinear interaction of the electromagnetic field of the laser and the substrate material occurs and the laser energy is transferred to the substrate to effect formation of defects that become constituents of the fault line. However, it is important to realize that in the areas of the material where the laser energy intensity is not high (e.g., glass volume of substrate surrounding the central convergence line), the material is transparent to the laser and there is no mechanism for transferring energy from the laser to the material. As a result, nothing happens to the glass or workpiece when the laser intensity is below the nonlinear threshold.

Turning to FIGS. 2A and 2B, a method of laser processing a material includes focusing a pulsed laser beam 2 into a laser beam focal line 2b oriented along the beam propagation direction. As shown in FIG. 3A, laser 3 (not shown) emits laser beam 2, which has a portion 2a incident to the optical assembly 6. The optical assembly 6 turns the incident laser beam into an extensive laser beam focal line 2b on the output side over a defined expansion range along the beam direction (length l of the focal line). The planar substrate 1 is positioned in the beam path to at least partially overlap the laser beam focal line 2b of laser beam 2. The laser beam focal line is thus directed into the substrate. Reference 1a designates the surface of the planar substrate facing the optical assembly 6 or the laser, respectively, and reference 1b designates the reverse surface of substrate 1. The substrate or workpiece thickness (in this embodiment measured perpendicularly to the planes 1a and 1b, i.e., to the substrate plane) with the dimension labeled d. The substrate or workpiece can also be referred to as a material and can be a glass article that is substantially transparent to the wavelength of the laser beam 2, for example.

As FIG. 2A depicts, substrate 1 (or the glass composite workpiece) is aligned perpendicular to the longitudinal beam axis and thus behind the same focal line 2b produced by the optical assembly 6 (the substrate is perpendicular to the plane of the drawing). The focal line being oriented or aligned along the beam direction, the substrate is positioned relative to the focal line 2b in such a way that the focal line 2b starts before the surface 1a of the substrate and stops before the surface 1b of the substrate, i.e. still focal line 2b terminates within the substrate and does not extend beyond surface 1b. In the overlapping area of the laser beam focal line 2b with substrate 1, i.e. in the substrate material covered by focal line 2b, the extensive laser beam focal line 2b generates (assuming suitable laser intensity along the laser beam focal line 2b, which intensity is ensured by the focusing of laser beam 2 on a section of length l, i.e. a line focus of length l) an extensive section 2c (aligned along the longitudinal beam direction) along which an induced absorption is generated in the substrate material. The induced absorption produces defect line formation in the substrate material along section 2c. The defect line is a microscopic (e.g., >100 nm and <0.5 micron in diameter) elongated "hole" (also called a perforation or a defect line) in a substantially transparent material, substrate, or workpiece generated by using a single high energy burst of multiple laser pulses. Individual perforations can be created at rates of several hundred kilohertz (several hundred thousand perforations per second), for example. With relative motion between the source and the material, these perforations can be placed adjacent to one another (spatial separation varying from sub-micron to many microns as desired). This spatial separation (pitch) can be selected to facilitate separation of the material or workpiece. In some embodiments, the defect line is a "through hole", which is a hole or an open channel that extends from the top to the bottom of the substantially transparent material. The defect line formation is not only local, but over the entire length of the extensive section 2c of the induced absorption. The length of section 2c (which corresponds to the length of the overlapping of laser beam focal line 2b with substrate 1) is labeled with reference L. The average diameter or extent of the section of the induced absorption 2c (or the sections in the material of substrate 1 undergoing the defect line formation) is labeled with reference D. This average extent D basically corresponds to the average diameter 6 of the laser beam focal line 2b, that is, an average spot diameter in a range of between about 0.1 micron and about 5 microns.

As FIG. 2A shows, the substrate material (which is transparent to the wavelength λ of laser beam 2) is heated due to the induced absorption along the focal line 2b arising from the nonlinear effects associated with the high intensity of the laser beam within focal line 2b. FIG. 2B illustrates that the heated substrate material will eventually expand so that a corresponding induced tension leads to micro-crack formation, with the tension being the highest at surface 1a.

The selection of a laser source is predicated on the ability to create multi-photon absorption (MPA) in transparent materials. MPA is the simultaneous absorption of two or more photons of identical or different frequencies in order to excite a molecule from one state (usually the ground state) to a higher energy electronic state (ionization). The energy difference between the involved lower and upper states of the molecule can be equal to the sum of the energies of the two photons. MPA, also called induced absorption, can be can be a second-order or third-order process, or higher-order process, for example, that is several orders of magnitude weaker than linear absorption. MPA differs from linear absorption in that the strength of induced absorption can be proportional to the square or cube (or higher power law) of the light intensity, for example, instead of being proportional to the light intensity itself. Thus, MPA is a nonlinear optical process.

Representative optical assemblies 6, which can be applied to generate the focal line 2b, as well as a representative optical setup, in which these optical assemblies can be applied, are described below. All assemblies or setups are based on the description above so that identical references are used for identical components or features or those which are equal in their function. Therefore only the differences are described below.

To ensure high quality (regarding breaking strength, geometric precision, roughness and avoidance of re-machining requirements) of the surface of the separated part along which separation occurs, the individual focal lines positioned on the substrate surface along the line of separation should be generated using the optical assembly described below (hereinafter, the optical assembly is alternatively also referred to as laser optics). The roughness of the separated surface (or cut edge), results particularly from the spot size or the spot diameter of the focal line. A roughness of the separated (cut) surface which can be, for example, 0.25 to 1 microns, can be characterized, for example, by an Ra surface roughness statistic (roughness arithmetic average of absolute values of the heights of the sampled surface, which include the heights of bumps resulting from the spot diameter of the focal line). In order to achieve a small spot size of, for example, 0.5 micron to 2 microns in case of a given wavelength $\lambda$ of laser 3 (interaction with the material of substrate 1), certain requirements must usually be imposed on the numerical aperture of laser optics 6. These requirements are met by laser optics 6 described below.

In order to achieve the required numerical aperture, the optics must, on the one hand, dispose of the required opening for a given focal length, according to the known Abbe formulae (N.A.=n sin (theta), n: refractive index of the glass or composite workpiece to be processed, theta: half the aperture angle; and theta=arc tan (D/2f); D: aperture, f: focal length). On the other hand, the laser beam must illuminate the optics up to the required aperture, which is typically achieved by means of beam widening using widening telescopes between the laser and focusing optics.

The spot size should not vary too strongly for the purpose of a uniform interaction along the focal line. This can, for example, be ensured (see the embodiment below) by illuminating the focusing optics only in a small, circular area so that the beam opening and thus the percentage of the numerical aperture only vary slightly.

According to FIG. 3A (section perpendicular to the substrate plane at the level of the central beam in the laser beam bundle of laser radiation 2; here, too, laser beam 2 is perpendicularly incident to the substrate plane, i.e. incidence angle of the focal line is about 0° so that the focal line 2b or the extensive section of the induced absorption 2c is parallel to the substrate normal), the laser radiation 2a emitted by laser 3 is first directed onto a circular aperture 8 which is completely opaque to the laser radiation used. Aperture 8 is oriented perpendicular to the longitudinal beam axis and is centered on the central beam of the depicted beam bundle 2a. The diameter of aperture 8 is selected in such a way that the beam bundles near the center of beam bundle 2a or the central beam (here labeled with 2aZ) hit the aperture and are completely absorbed by it. Only the beams in the outer perimeter range of beam bundle 2a (marginal rays, here labeled with 2aR) are not absorbed due to the reduced aperture size compared to the beam diameter, but pass aperture 8 laterally and hit the marginal areas of the focusing optic elements of the optical assembly 6, which, in this embodiment, is designed as a spherically cut, bi-convex lens 7.

As illustrated in FIG. 3A, the laser beam focal line 2b is not only a single focal point for the laser beam, but rather a series of focal points for different rays in the laser beam. The series of focal points form an elongated focal line of a defined length, shown in FIG. 3A as the length l of the laser beam focal line 2b. Lens 7 is centered on the central beam and is designed as a non-corrected, bi-convex focusing lens in the form of a common, spherically cut lens. The spherical aberration of such a lens may be advantageous. As an alternative, aspheres or multi-lens systems deviating from ideally corrected systems, which do not form an ideal focal point but a distinct, elongated focal line of a defined length, can also be used (i.e., lenses or systems which do not have a single focal point). The zones of the lens thus focus along a focal line 2b, subject to the distance from the lens center. The diameter of aperture 8 across the beam direction is approximately 90% of the diameter of the beam bundle (defined by the distance required for the intensity of the beam to decrease to 1/e of the peak intensity) and approximately 75% of the diameter of the lens of the optical assembly 6. The focal line 2b of a non-aberration-corrected spherical lens 7 generated by blocking out the beam bundles in the center is thus used. FIG. 3A shows the section in one plane through the central beam, and the complete three-dimensional bundle can be seen when the depicted beams are rotated around the focal line 2b.

One potential disadvantage of this type of focal line is that the conditions (spot size, laser intensity) may vary along the focal line (and thus along the desired depth in the material) and therefore the desired type of interaction (no melting, induced absorption, thermal-plastic deformation up to crack formation) may possibly occur only in selected portions of the focal line. This means in turn that possibly only a part of the incident laser light is absorbed by the substrate material in the desired way. In this way, the efficiency of the process (required average laser power for the desired separation speed) may be impaired, and the laser light may also be transmitted into undesired regions (parts or layers adherent to the substrate or the substrate holding fixture) and interact with them in an undesirable way (e.g. heating, diffusion, absorption, unwanted modification).

Figures 1, 3B:
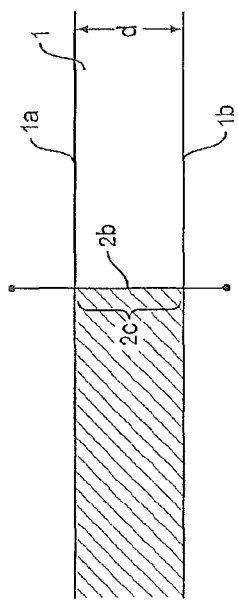
FIG. 3B-1 through 3B-4 are illustrations of various ways to process the substrate by differently positioning the laser beam focal line relative to the substrate.

FIG. 3B-1 through FIG. 3B-4 show (not only for the optical assembly in FIG. 3A, but basically also for any other applicable optical assembly 6) that the position of laser beam focal line 2b can be controlled by suitably positioning and/or aligning the optical assembly 6 relative to substrate 1 as well as by suitably selecting the parameters of the optical assembly 6. As FIG. 3B-1 illustrates, the length l of the focal line 2b can be adjusted in such a way that it exceeds the substrate thickness d (here by factor 2). If substrate 1 is placed (viewed in longitudinal beam direction) centrally to focal line 2b, an extensive section of induced absorption 2c is generated over the entire substrate thickness. The laser beam focal line 2b can have a length l in a range of between about 0.01 mm and about 100 mm or in a range of between about 0.1 mm and about 10 mm, for example. Various embodiments can be configured to have length l of about 0.1 mm, 0.2 mm, 0.3 mm, 0.4 mm, 0.5 mm to 5 mm, e.g., 0.5 mm, 0.7 mm, 1 mm, 2 mm, 3 mm, 4 mm, or 5 mm, for example.

Figures 2, 3B:
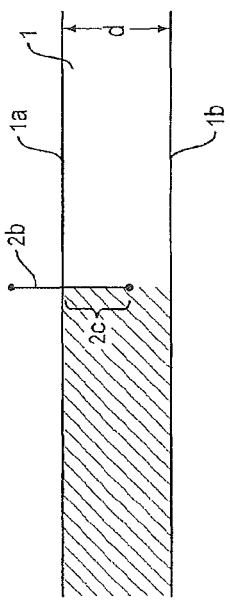
Figures 3, 3B:
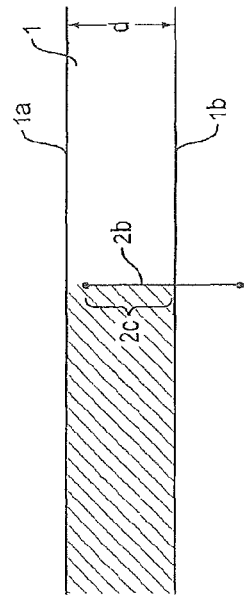
Figures 3, 3B, 4:
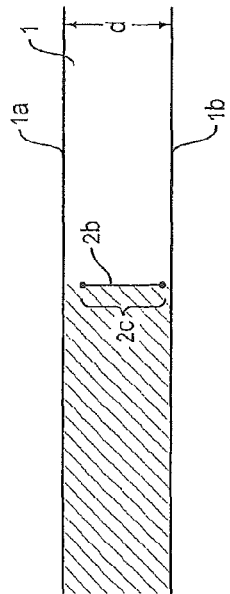

In the case shown in FIG. 3B-2, a focal line 2b of length l is generated which corresponds more or less to the substrate thickness d. Since substrate 1 is positioned relative to line 2b in such a way that line 2b starts at a point outside the substrate, the length L of the extensive section of induced absorption 2c (which extends here from the substrate surface to a defined substrate depth, but not to the reverse surface 1b) is smaller than the length l of focal line 2b. FIG. 3B-3 shows the case in which the substrate 1 (viewed along a direction perpendicular to the beam direction) is positioned above the starting point of focal line 2b so that, as in FIG. 3B-2, the length l of line 2b is greater than the length L of the section of induced absorption 2c in substrate 1. The focal line thus starts within the substrate and extends beyond the reverse surface 1b. FIG. 3B-4 shows the case in which the focal line length l is smaller than the substrate thickness d so that—in the case of a central positioning of the substrate relative to the focal line viewed in the direction of incidence—the focal line starts near the surface 1a within the substrate and ends near the surface 1b within the substrate (e.g. l=0.75·d).

It is particularly advantageous to position the focal line 2b in such a way that at least one of surfaces 1a, 1b is covered by the focal line, so that the section of induced absorption 2c starts at least on one surface of the substrate. In this way it is possible to achieve virtually ideal cuts while avoiding ablation, feathering and particulation at the surface.

FIG. 4 depicts another applicable optical assembly 6. The basic construction follows the one described in FIG. 3A so that only the differences are described below. The depicted optical assembly is based the use of optics with a non-spherical free surface in order to generate the focal line 2b, which is shaped in such a way that a focal line of defined length l is formed. For this purpose, aspheres can be used as optic elements of the optical assembly 6. In FIG. 4, for example, a so-called conical prism, also often referred to as axicon, is used. An axicon is a special, conically cut lens which forms a spot source on a line along the optical axis (or transforms a laser beam into a ring). The layout of such an axicon is generally known to one skilled in the art; the cone angle in the example is 10°. Other ranges of the axicon cone angle may also be utilized. The apex of the axicon labeled here with reference 9 is directed towards the incidence direction and centered on the beam center. Since the focal line 2b produced by the axicon 9 starts within its interior, substrate 1 (here aligned perpendicularly to the main beam axis) can be positioned in the beam path directly behind axicon 9. As FIG. 4 shows, it is also possible to shift substrate 1 along the beam direction due to the optical characteristics of the axicon while remaining within the range of focal line 2b. The section of the induced absorption 2c in the material of substrate 1 therefore extends over the entire substrate depth d.

However, the depicted layout is subject to the following restrictions: Since the region of focal line 2b formed by axicon 9 begins within axicon 9, a significant part of the laser energy is not focused into the section of induced absorption 2c of focal line 2b, which is located within the material, in the situation where there is a separation a between axicon 9 and the substrate or glass composite workpiece material. Furthermore, length l of focal line 2b is related to the beam diameter through the refractive indices and cone angles of axicon 9. This is why, in the case of relatively thin materials (several millimeters), the total focal line is much longer than the substrate or glass composite workpiece thickness, having the effect that much of the laser energy is not focused into the material.

Figure 5A:
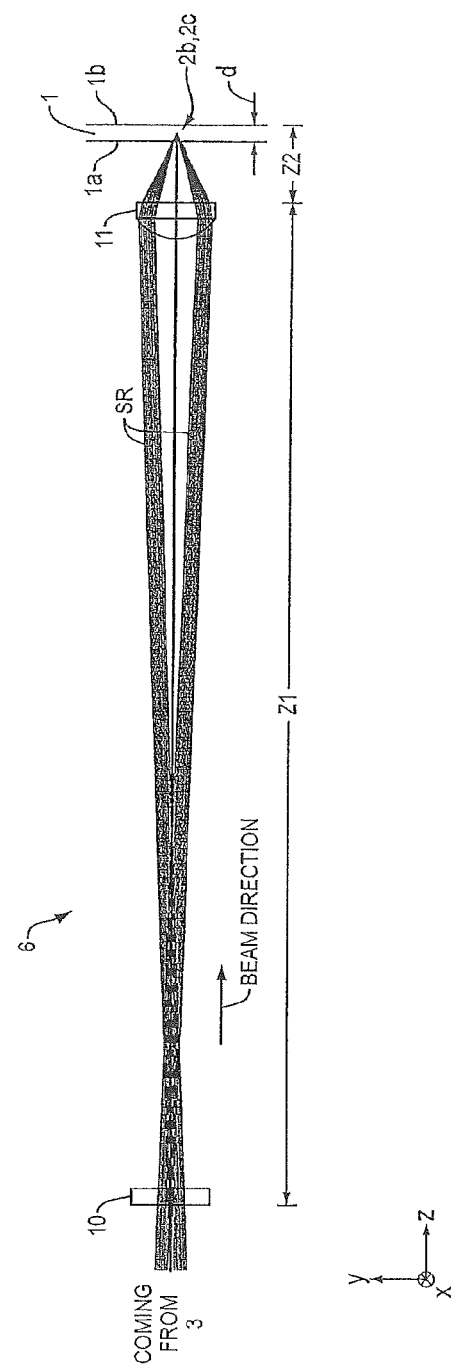

For this reason, it may be desirable to use an optical assembly 6 that includes both an axicon and a focusing lens. FIG. 5A depicts such an optical assembly 6 in which a first optical element with a non-spherical free surface designed to form an extensive laser beam focal line 2b is positioned in the beam path of laser 3. In the case shown in FIG. 5A, this first optical element is an axicon 10 with a cone angle of 5°, which is positioned perpendicularly to the beam direction and centered on laser beam 3. The apex of the axicon is oriented towards the beam direction. A second, focusing optical element, here the plano-convex lens 11 (the curvature of which is oriented towards the axicon), is positioned in the beam direction at a distance z1 from the axicon 10. The distance z1, in this case approximately 300 mm, is selected in such a way that the laser radiation formed by axicon 10 is circularly incident on the outer radial portion of lens 11. Lens 11 focuses the circular radiation on the output side at a distance z2, in this case approximately 20 mm from lens 11, on a focal line 2b of a defined length, in this case 1.5 mm. The effective focal length of lens 11 is 25 mm in this embodiment. The circular transformation of the laser beam by axicon 10 is labeled with the reference SR.

FIG. 5B depicts the formation of the focal line 2b or the induced absorption 2c in the material of substrate 1 according to FIG. 5A in detail. The optical characteristics of both elements 10, 11 as well as the positioning of them is selected in such a way that the length l of the focal line 2b in beam direction is exactly identical with the thickness d of substrate 1. Consequently, an exact positioning of substrate 1 along the beam direction is required in order to position the focal line 2b exactly between the two surfaces 1a and 1b of substrate 1, as shown in FIG. 5B.

It is therefore advantageous if the focal line is formed at a certain distance from the laser optics, and if the greater part of the laser radiation is focused up to a desired end of the focal line. As described, this can be achieved by illuminating a primarily focusing element 11 (lens) only circularly (annularly) over a particular outer radial region, which, on the one hand, serves to realize the required numerical aperture and thus the required spot size, and, on the other hand, however, the circle of diffusion diminishes in intensity after the required focal line 2b over a very short distance in the center of the spot, as a basically circular spot is formed. In this way, the defect line formation is stopped within a short distance in the required substrate depth. A combination of axicon 10 and focusing lens 11 meets this requirement. The axicon acts in two different ways: due to the axicon 10, a usually round laser spot is sent to the focusing lens 11 in the form of a ring, and the asphericity of axicon 10 has the effect that a focal line is formed beyond the focal plane of the lens instead of a focal point in the focal plane. The length l of focal line 2b can be adjusted via the beam diameter on the axicon. The numerical aperture along the focal line, on the other hand, can be adjusted via the distance z1 axicon-lens and via the cone angle of the axicon. In this way, the entire laser energy can be concentrated in the focal line.

If the defect line formation is intended to continue to the back side of the substrate, the circular (annular) illumination still has the advantage that (1) the laser power is used optimally in the sense that most of the laser light remains concentrated in the required length of the focal line and (2) it is possible to achieve a uniform spot size along the focal line—and thus a uniform separation of part from substrate along the focal line—due to the circularly illuminated zone in conjunction with the desired aberration set by means of the other optical functions.

Instead of the plano-convex lens depicted in FIG. 5A, it is also possible to use a focusing meniscus lens or another higher corrected focusing lens (asphere, multi-lens system).

In order to generate very short focal lines 2b using the combination of an axicon and a lens depicted in FIG. 5A, it would be necessary to select a very small beam diameter of the laser beam incident on the axicon. This has the practical disadvantage that the centering of the beam onto the apex of the axicon must be very precise and that the result is very sensitive to directional variations of the laser (beam drift stability). Furthermore, a tightly collimated laser beam is very divergent, i.e. due to the light deflection the beam bundle becomes blurred over short distances.

Figure 6:
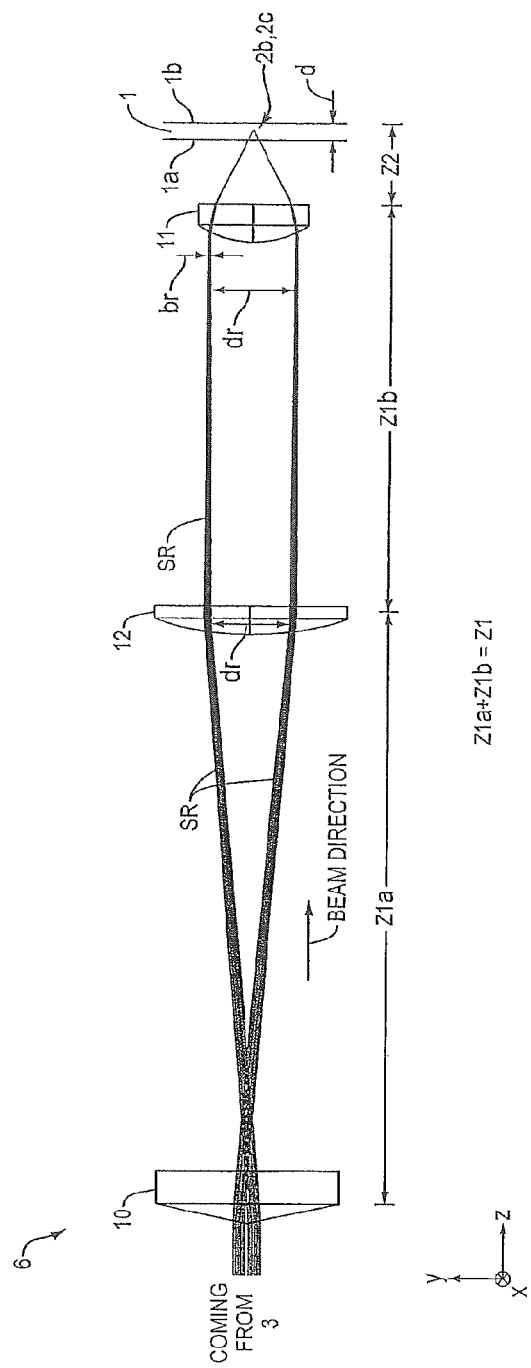
FIG. 6 is a schematic illustration of a fourth embodiment of an optical assembly for laser processing.

As shown in FIG. 6, both effects can be avoided by including another lens, a collimating lens 12, in the optical assembly 6. The additional positive lens 12 serves to adjust the circular illumination of focusing lens 11 very tightly. The focal length f of collimating lens 12 is selected in such a way that the desired circle diameter dr results from distance z1a from the axicon to the collimating lens 12, which is equal to f'. The desired width br of the ring can be adjusted via the distance z1b (collimating lens 12 to focusing lens 11). As a matter of pure geometry, the small width of the circular illumination leads to a short focal line. A minimum can be achieved at distance f.

The optical assembly 6 depicted in FIG. 6 is thus based on the one depicted in FIG. 5A so that only the differences are described below. The collimating lens 12, here also designed as a plano-convex lens (with its curvature towards the beam direction) is additionally placed centrally in the beam path between axicon 10 (with its apex towards the beam direction), on the one side, and the plano-convex lens 11, on the other side. The distance of collimating lens 12 from axicon 10 is referred to as z1a, the distance of focusing lens 11 from collimating lens 12 as z1b, and the distance of the focal line 2b from the focusing lens 11 as z2 (always viewed in beam direction). As shown in FIG. 6, the circular radiation SR formed by axicon 10, which is incident divergently and under the circle diameter dr on the collimating lens 12, is adjusted to the required circle width br along the distance z1b for an at least approximately constant circle diameter dr at the focusing lens 11. In the case shown, a very short focal line 2b is intended to be generated so that the circle width br of approximately 4 mm at lens 12 is reduced to approximately 0.5 mm at lens 11 due to the focusing properties of lens 12 (circle diameter dr is 22 mm in the example).

In the depicted example, it is possible to achieve a length of the focal line 1 of less than 0.5 mm using a typical laser beam diameter of 2 mm, a focusing lens 11 with a focal length f=25 mm, a collimating lens with a focal length f'=150 mm, and choosing distances Z1a=Z1b=140 mm and Z2=15 mm.

FIGS. 7A-7C illustrate the laser-matter interaction at different laser intensity regimes. In the first case, shown in FIG. 7A, the unfocused laser beam 710 goes through a transparent substrate 720 without introducing any modification to it. In this particular case, the nonlinear effect is not present because the laser energy density (or laser energy per unit area illuminated by the beam) is below the threshold necessary to induce nonlinear effects. The higher the energy density, the higher is the intensity of the electromagnetic field. Therefore, as shown in FIG. 7B when the laser beam is focused by spherical lens 730 to a smaller spot size, as shown in FIG. 7B, the illuminated area is reduced and the energy density increases, triggering the nonlinear effect that will modify the material to permit formation of a fault line only in the volume where that condition is satisfied. In this way, if the beam waist of the focused laser is positioned at the surface of the substrate, modification of the surface will occur. In contrast, if the beam waist of the focused laser is positioned below the surface of the substrate, nothing happens at the surface when the energy density is below the threshold of the nonlinear optical effect. But at the focus 740, positioned in the bulk of the substrate 720, the laser intensity is high enough to trigger multi-photon non-linear effects, thus inducing damage to the material. Finally, as shown in FIG. 7C in the case of an axicon, as shown in FIG. 7C, the diffraction pattern of an axicon lens 750, or alternatively a Fresnel axicon, creates interference that generates a Bessel-shaped intensity distribution (cylinder of high intensity 760) and only in that volume is the intensity high enough to create nonlinear absorption and modification to the material 720. The diameter of cylinder 760, in which Bessel-shaped intensity distribution is high enough to create nonlinear absorption and modification to the material, is also the spot diameter of the laser beam focal line, as referred to herein. Spot diameter D of a Bessel beam can be expressed as $D=(2.4048\lambda)/(2\pi B)$, where $\lambda$ is the laser beam wavelength and B is a function of the axicon angle.

Laser and Optical System.

For the purpose of cutting alkaline earth boro-aluminosilicate glass compositions, according to some exemplary embodiments, a picosecond pulsed laser (e.g., a 1064 nm, or 532 nm picosecond pulsed laser) which produces bursts of multiple pulses in combination with line-focus beam forming optics may be used to create lines of damage (defect lines) in the glass composition. (However, it is noted that other pulsed lasers may also be utilized.)

For example, a display/TFT glass composition with up to 0.7 mm thickness was positioned so that it was within the region of the focal line produced by the optics. With a focal line about 1 mm in length, a 1064 nm picosecond laser that produces output power of about 24 W or more at a burst repetition rate of 200 kHz (about 120 microJoules/burst or more) measured at the glass composition, the optical intensities in the focal line region are high enough to create non-linear absorption in the glass composition. The pulsed laser beam can have an average laser burst energy measured, at the material, greater than 40 microJoules per mm thickness of material. For some glasses, the average laser burst energy used can be as high as 2500 µJ per mm thickness of material, for example 40-2500 µJ/mm, with 400-1300 µJ/mm being preferable for display/TFT type glasses (and 550 to 1000 µJ/mm being even more) preferable because the energy density is strong enough to make a thorough damage track through the glass, while minimizing the extent of micro cracking orthogonal to the perforated line or cut edge. This "average pulse burst laser energy" per mm can also be referred to as an average, per-burst, linear energy density, or an average energy per laser pulse burst per mm thickness of material. A region of damaged, ablated, vaporized, or otherwise modified material within the glass composition was created that approximately followed the linear region of high optical intensity created by the laser beam focal line.

Note that typical operation of such a picosecond laser described herein creates a "burst" 500 of pulses 500A. (See, for example, FIGS. 8A and 8B). Each "burst" (also referred to herein as a "pulse burst" 500) contains multiple individual pulses 500A (such as at least 5 pulses, at least 7 pulses, at least 8 pulses, at least 9 pulses, at least 10 pulses, at least 15 pulses, at least 20 pulses, or more pulses) of very short duration. That is, a pulse burst is a "pocket" of pulses, and the bursts are separated from one another by a longer duration than the separation of individual adjacent pulses within each burst. Applicants discovered that for cutting or perforating display glass/TFT glass compositions the number of pulses per burst should be preferably 5-20. Pulses 500A have pulse duration $T_d$ of up to 100 psec (for example, 0.1 psec, 5 psec, 10 psec, 15 psec, 18 psec, 20 psec, 22 psec, 25 psec, 30 psec, 50 psec, 75 psec, or therebetween). The energy or intensity of each individual pulse 500A within the burst may not be equal to that of other pulses within the burst, and the intensity distribution of the multiple pulses within a burst 500 often follows an exponential decay in time governed by the laser design. Preferably, each pulse 500A within the burst 500 of the exemplary embodiments described herein is separated in time from the subsequent pulse in the burst by a duration $T_p$ from 1 nsec to 50 nsec (e.g. 10-50 nsec, or 10-30 nsec, with the time often governed by the laser cavity design). For a given laser, the time separation $T_p$ between adjacent pulses (pulse-to-pulse separation) within a burst 500 is relatively uniform (±10%). For example, in some embodiments, each pulse within a burst is separated in time from the subsequent pulse by approximately 20 nsec (50 MHz). For example, for a laser that produces pulse separation $T_p$ of about 20 nsec, the pulse to pulse separation $T_p$ within a burst is maintained within about ±10%, or about ±2 nsec. The time between each "burst" of pulses (i.e., time separation $T_b$ between bursts) will be much longer (e.g., 0.25≤$T_b$≤1000 microseconds, for example 1-10 microseconds, or 3-8 microseconds). In some of the exemplary embodiments of the laser described herein the time separation $T_b$ is around 5 microseconds for a laser with burst repetition rate or frequency of about 200 kHz. The laser burst repetition rate is relates to the time $T_b$ between the first pulse in a burst to the first pulse in the subsequent burst (laser burst repetition rate=1/$T_b$). In some embodiments, the laser burst repetition frequency may be in a range of between about 1 kHz and about 4 MHz. More preferably, the laser burst repetition rates can be, for example, in a range of between about 10 kHz and 650 kHz. The time $T_b$ between the first pulse in each burst to the first pulse in the subsequent burst may be 0.25 microsecond (4 MHz burst repetition rate) to 1000 microseconds (1 kHz burst repetition rate), for example 0.5 microseconds (2 MHz burst repetition rate) to 40 microseconds (25 kHz burst repetition rate), or 2 microseconds (500 kHz burst repetition rate) to 20 microseconds (50 kHz burst repetition rate). The exact timings, pulse durations, and burst repetition rates can vary depending on the laser design, but short pulses ($T_d$<20 psec and preferably $T_d$=15 psec) of high intensity have been shown to work particularly well.

Figures 8A, 8B:
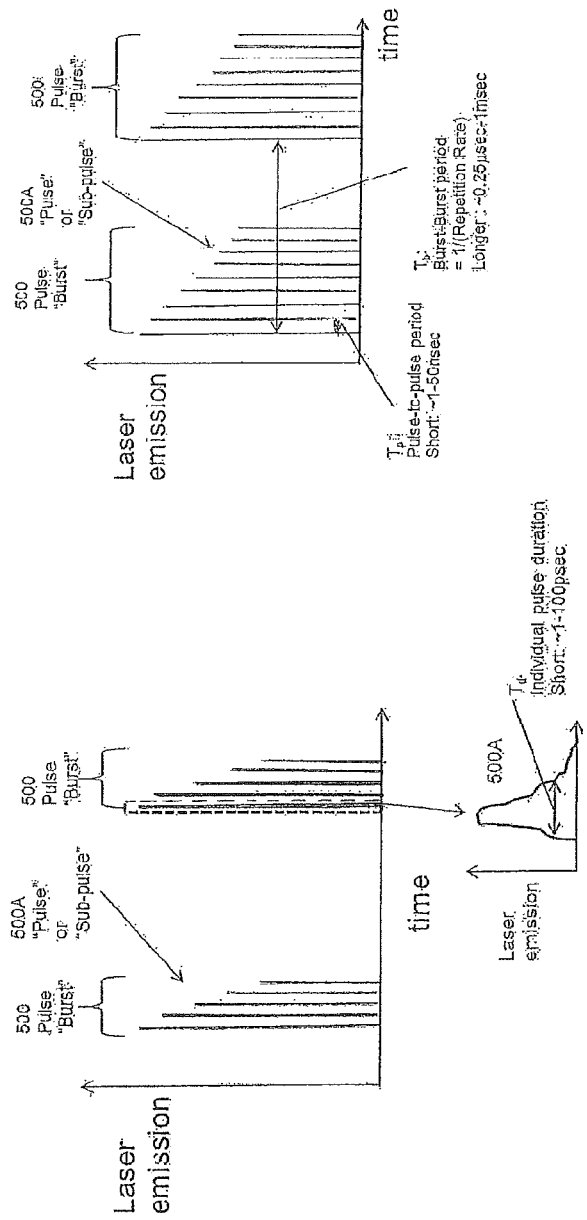
FIG. 8A illustrates schematically the relative intensity of laser pulses within an exemplary pulse burst vs. time, with each exemplary pulse burst having 7 pulses.
FIG. 8B illustrates schematically relative intensity of laser pulses vs. time within an exemplary pulse burst, with each exemplary pulse burst containing 9 pulses.

The energy required to modify the material can be described in terms of the burst energy—the energy contained within a burst (each burst 500 contains a series of pulses 500A), or in terms of the energy contained within a single laser pulse (many of which may comprise a burst). The energy per burst can be from 25-750 μJ, and for many non display/non TFT glass compositions 50-500 μJ, or 50-250 μJ. In some non display, non TFT glasses the energy per burst is 100-250 μJ. However, for display or TFT glass compositions the energy per burst should be higher—for example 300 to 500 μJ or 400 to 600 μJ, depending on the specific display/TFT glass composition. The energy of an individual pulse within the pulse burst will be less, and the exact individual laser pulse energy will depend on the number of pulses 500A within the pulse burst 500 and the rate of decay (e.g., exponential decay rate) of the laser pulses with time as shown in FIGS. 8A and 8B. For example, for a constant energy/burst, if a pulse burst contains 10 individual laser pulses 500A, then each individual laser pulse 500A will contain less energy than if the same pulse burst 500 had only 2 individual laser pulses.

The use of a laser capable of generating such pulse bursts is advantageous for cutting or modifying transparent materials, for example glass. In contrast with the use of single pulses spaced apart in time by the repetition rate of the single-pulsed laser, the use of a pulse burst sequence that spreads the laser energy over a rapid sequence of pulses within the burst 500 allows access to larger timescales of high intensity interaction with the material than is possible with single-pulse lasers. While a single-pulse can be expanded in time, as this is done the intensity within the pulse must drop as roughly one over the pulse width. Hence if a 10 psec single pulse is expanded to a 10 nsec pulse, the intensity drop by roughly three orders of magnitude. Such a reduction can reduce the optical intensity to the point where non-linear absorption is no longer significant, and light material interaction is no longer strong enough to allow for cutting. In contrast, with a pulse burst laser, the intensity during each pulse 500A within the burst 500 can remain very high—for example three 10 psec pulses 500A spaced apart in time by approximately 10 nsec still allows the intensity within each pulse to be approximately three times higher than that of a single 10 psec pulse, while the laser is allowed to interact with the material over a timescale that is now three orders of magnitude larger. Also for example, for example ten 10 psec pulses 500A spaced apart in time by approximately 10 nsec still allows the intensity within each pulse to be approximately ten times higher than that of a single 10 psec pulse, while the laser is allowed to interact with the material over a timescale that is now orders of magnitude larger. This adjustment of multiple pulses 500A within a burst thus allows manipulation of time-scale of the laser-material interaction in ways that can facilitate greater or lesser light interaction with a pre-existing plasma plume, greater or lesser light-material interaction with atoms and molecules that have been pre-excited by an initial or previous laser pulse, and greater or lesser heating effects within the material that can promote the controlled growth of microcracks. The required amount of burst energy to modify the material will depend on the substrate material composition and the length of the line focus used to interact with the substrate. The longer the interaction region, the more the energy is spread out, and higher burst energy will be required. The exact timings, pulse durations, and burst repetition rates can vary depending on the laser design, but short pulses (<15 psec, or ≤10 psec) of high intensity have been shown to work well with this technique. A defect line or a hole is formed in the material when a single burst of pulses strikes essentially the same location on the glass. That is, multiple laser pulses within a single burst correspond to a single defect line or a hole location in the glass. Of course, since the glass is translated (for example by a constantly moving stage) (or the beam is moved relative to the glass, the individual pulses within the burst cannot be at exactly the same spatial location on the glass. However, they are well within 1 μm of one another—i.e., they strike the glass at essentially the same location. For example, they may strike the glass at a spacing, sp, from one another where 0<sp≤500 nm. For example, when a glass location is hit with a burst of 20 pulses the individual pulses within the burst strike the glass within 250 nm of each other. Thus, in some embodiments 1 nm<sp<250 nm. In some embodiments 1 nm<sp<100 nm.

Hole or Damage Track Formation:

If the glass substrate has sufficient stress (e.g., with ion exchanged glass), then the part will spontaneously crack and separate along the path of perforated damage traced out by the laser process. However, if there is not a lot of stress inherent to the substrate, as is the case of TFT or display glasses (for example, Corning Eagle XG® or Lotus, Corning Lotus NXT™ or Contego compositions), then the picosecond laser will simply form damage tracks in the workpiece. These damage tracks generally take the form of holes with interior dimensions of about 0.1-1.5 microns, or 0.2 microns to 2 microns (for example, in some embodiments, 0.2 to 0.7 microns, or 0.3 to 0.6 microns). Preferably the holes are very small (single microns or less) in dimension (i.e., in width or diameter).

Figure 9A:
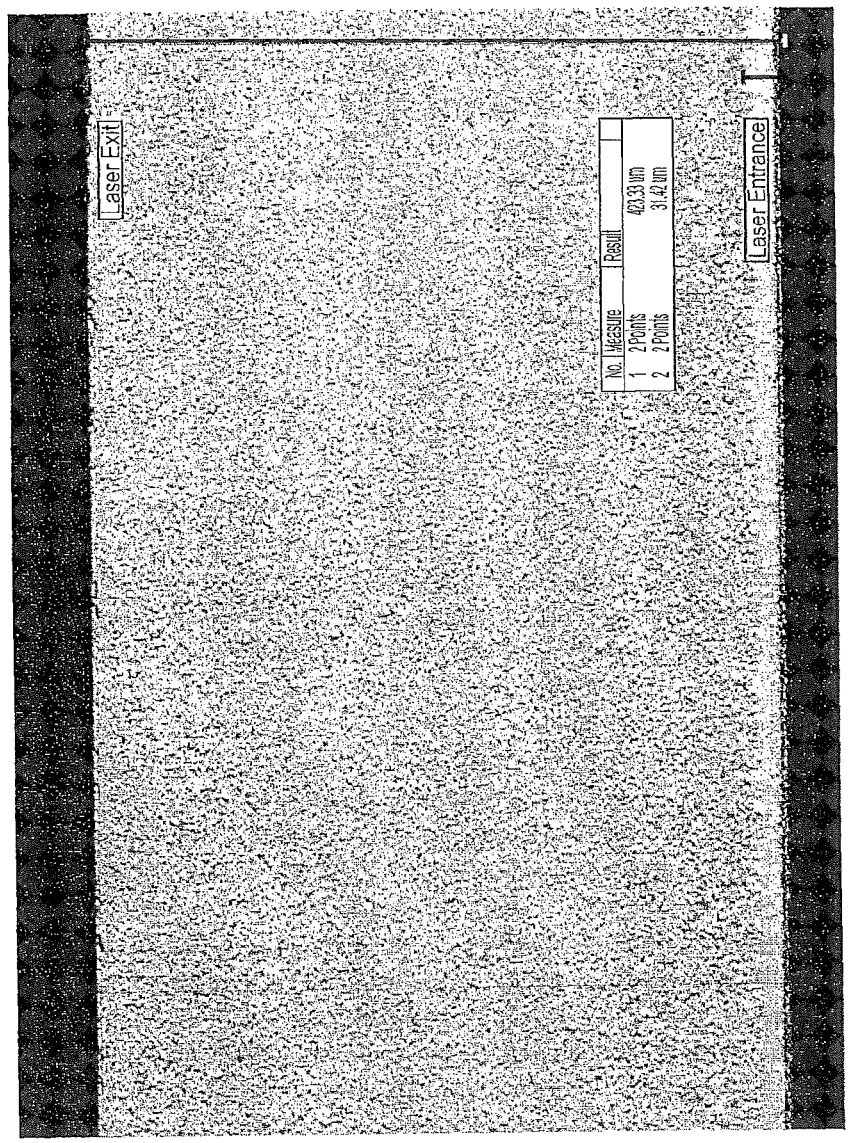
FIG. 9A is an edge image of a straight cut strip of 0.6 mm thick Eagle XG® glass.

The holes or defect lines can perforate the entire thickness of the material, and may or may not be a continuous opening throughout the depth of the material. FIG. 9A shows an example of such tracks or defect lines perforating the entire thickness of a workpiece of 600 micron thick Eagle XG® substrate. The perforations or damage tracks are observed through the side of a cleaved edge. The tracks through the material are not necessarily through-holes. There are often regions of glass that plug the holes, but they are generally small in size, on the order of microns, for example.

It is also possible to perforate stacked sheets of glass. In this case, the focal line length needs to be longer than the stack height.

The lateral spacing (pitch) between the holes or defect lines is determined by the pulse rate of the laser as the substrate is translated underneath the focused laser beam. Only a single picosecond laser pulse burst is usually necessary to form an entire hole, but multiple bursts may be used if desired. To form holes at different pitches, the laser can be triggered to fire at longer or shorter intervals. For cutting operations, the laser triggering generally is synchronized with the stage driven motion of the workpiece beneath the beam, so laser pulse bursts are triggered at a fixed spacing, such as for example every 1 micron, or every 5 microns, or every 7-15 microns. Distance, or periodicity, between adjacent perforations or defect lines along the direction of the fault line can be greater than 0.1 micron and less than or equal to about 20 microns for some glass embodiments, for example. For example, for some glasses, the spacing or periodicity between adjacent perforations or defect lines is can be as low as 0.5 microns, or between 0.5 micron and 3.0 microns. For example, in some embodiments the periodicity can be between 0.5 micron and 1.0 micron. For display or TFT type glasses it is typically 5-15 microns.

The exact spacing between adjacent perforations or defect lines is determined by the material properties that facilitate crack propagation from perforated hole to perforated hole, given the stress level in the substrate. However, in contrast to cutting a substrate, it is also possible to use the same method to only perforate the material. In the methods described herein, the holes or defect lines (or damage tracks, or perforations) can be separated by larger spacings (e.g., a 5 micron pitch, or 7 micron pitch, or greater).

The laser power and lens focal length (which determines the focal line length and hence power density) are particularly important parameters to ensure full penetration of the glass and low micro-cracking.

In general, the higher the available laser power, the faster the material can be cut with the above process. Processes disclosed herein can cut glass at a cutting speed of 0.25 m/sec, or faster. A cut speed (or cutting speed) is the rate the laser beam moves relative to the surface of the transparent material (e.g., glass) while creating multiple holes or modified regions.) High cut speeds, such as, for example 400 mm/sec, 500 mm/sec, 750 mm/sec, 1 m/sec, 1.2 m/sec, 1.5 m/sec, or 2 m/sec, or even 3.4 m/sec to 4 m/sec are often desired in order to minimize capital investment for manufacturing, and to optimize equipment utilization rate. The laser power is equal to the burst energy multiplied by the burst repetition frequency (rate) of the laser. In general, to cut glass materials at high cutting speeds, the damage tracks are typically spaced apart by 1-25 microns, in some embodiments the spacing between the damage tracks (i.e., the pitch) is preferably 3 microns or larger—for example 3-12 microns, or for example 5-10 microns. For display or TFT glasses the damage tracks should be separated by greater than 5 microns e.g., 5-15 microns. For some glass compositions of display or TFT glasses the damage tracks are separated by 7-15 microns, or 7-12 microns, or 9-15 microns).

For example, in some non display glasses, to achieve a linear cutting speed of 300 mm/sec, 3 micron hole pitch corresponds to a pulse burst laser with at least 100 kHz burst repetition rate. For a 600 mm/sec cutting speed, a 3 micron pitch corresponds to a burst-pulsed laser with at least 200 kHz burst repetition rate. A pulse burst laser that produces at least 40 µJ/burst at 200 kHz, and cuts at a 600 mm/s cutting speed needs to have laser power of at least 8 Watts. Higher cut speeds typically require even higher laser powers. An increased burst pulse repetition rate can also result in speed and laser power.

For example, in a case of display/TFT glasses, a 100 kHz laser with 5 micron pitch would cut at a maximum of 500 mm/s; when a 7 micron pitch is utilised at a maximum speed of 700 mm/s; with 10 micron pitch at a maximum speed of 1000 mm/s; with 12 micron pitch, at a maximum speed of 1200 mm/s; and with a 15 micron pitch at a maximum speed of 1500 mm/s. For the same laser repetition rates, a 300 µJ/burst requires 30 W average power, for 400 µJ/burst requires a 40 W average power, a 500 µJ/burst requires a 50 W average power, and a 600 µJ/burst requires a 60 W average power.

Thus, preferably the laser power of the pulse burst ps laser preferably at least 10 W or higher. The optimal pitch between damage tracks and the exact burst energy is material dependent, and can be determined empirically. However, it should be noted that raising the laser pulse energy or making the damage tracks at a closer pitch are not conditions that always make the substrate material separate better or with improved edge quality. Too dense a pitch (for example <0.1 micron, in some exemplary embodiments <1 µm, or in some embodiments <2 µm) between damage tracks can sometimes inhibit the formation of nearby subsequent damage tracks, and often can inhibit the separation of the material around the perforated contour, and may also result in increased unwanted micro cracking within the glass. Too long a pitch (>50 µm, and in some glasses >25 µm or even >20 µm) may result in "uncontrolled microcracking"—i.e., where instead of propagating from hole to hole the microcracks propagate along a different path, and cause the glass to crack in a different (undesirable) direction. This may ultimately lower the strength of the separated glass part, since the residual microcracks will acts as flaws which weaken the glass. Too high a burst energy (e.g., >2500 µJ/burst, and in some embodiments >600 µJ/burst) used to form each damage track can cause "healing" or re-melting of already formed microcracks of adjacent damage tracks, which will inhibit separation of the glass. Accordingly, it is preferred that burst energy be <2500 µJ/burst, for example, ≤600 µJ/burst. Also, using a burst energy that is too high can cause formation of microcracks that are extremely large and create flaws which reduce the edge strength of the parts after separation. Too low a burst energy (<40 µJ/burst) may result in no appreciable damage track formed within the glass, and hence very high separation strength or complete inability to separate along the perforated contour.

For example, for cutting 0.7 mm thick non-ion exchanged Corning code 2319 or code 2320 Gorilla glass, we observed that pitches of 3-5 microns work well, with pulse burst energies of about 150-250 µJ/burst, and burst pulse numbers t (number of pulses per burst) preferably below 5 (e.g., 3 or 4).

However, we discovered that much higher (5 to 10 times higher) volumetric pulse energy density (µj/µm$^3$) is required for perforating or cutting alkaline earth boro-aluminosilicate glasses with low or no alkali (i.e., display or TFT glasses) as compared to that for glasses such as Corning Gorilla® which have high amounts of alkali. To laser machine so as to produce damage tracks in these low or no alkali containing glasses, a high number of pulses along with higher pulse energy are needed in each laser pulse burst. For example, in some embodiments the picosecond laser is operated at 100 KHz which allows high energy pulses and larger number of pulses. This is preferably achieved by perforating or cutting such low or no alkali alkaline earth boro-aluminosilicate glasses by utilizing pulse burst lasers with at least 5 and more preferably with at least 7 or more pulses per burst, and even more preferably at least 8 pulses per burst and providing volumetric energy densities within the alkaline earth boro-aluminosilicate glasses (with low or no alkali) of about 0.050 µJ/µm$^3$ or higher, e.g., at least 0.1 µJ/µm$^3$, for example 0.1-0.5 µJ/µm$^3$.

For perforating or cutting alkaline earth boro-aluminosilicate glasses with low or no alkali (i.e. display or TFT glasses), it is even more preferable that the laser produces pulse bursts with at least 9 pulses per burst, to enable easy glass separation along a predetermine contour, low or no incidence of glass cracking in direction other than along the predetermined contour, and having edges with low surface roughness. For example, in some embodiments the pulsed laser has laser power of 10 W-150 W (e.g., 10-100 W) and produces pulse bursts with at least 5, and preferably at least 9 pulses per burst (e.g., 10-20 pulses per burst). In some embodiments the pulsed laser has the power of 25 W-65 W (e.g., or 25-60 W) and produces pulse bursts with at least 10-20 pulses per burst, and periodicity or distance between the adjacent defect lines produced by the laser bursts is 5-10 microns or 5 to 15 microns. In some embodiments the pulsed laser has laser power of 10 W-100 W, produces pulse bursts with at least 9 pulses per burst, and the workpiece and the laser beam are translated relative to one another at a rate of at least 0.25 m/sec. In some embodiments the workpiece and/or the laser beam are translated relative to one another at a rate of at least 0.3 m/sec, or at least 0.35 m/sec, or at least 0.4 m/sec.

At 1 msec cut speeds, the cutting of Eagle XG® glass (available from Corning Incorporated, of Corning, N.Y.) typically requires utilization of laser powers of 15-84 Watts, with 30-45 Watts often being sufficient. At 2.7 m/s the cutting of Eagle XG® (500 µm thickness) glass was demonstrated using a 65 Watts burst pulse laser with about 220 µJ/burst with a 8.8 µm pitch. The glass was then mechanically separated.

In general, across a variety of glass compositions and other transparent materials, applicants discovered that laser powers between 10 and 100 W are preferred to achieve cutting speeds from 0.2-1 msec, with laser powers of 25-60 Watts being sufficient (and optimum) for many glasses. In case of TFT/display type glasses, for cutting speeds of 0.4 m to 5 msec, laser powers should preferably be 10 W-150 W, with burst energy of 300-600 µJ/burst, 5-20 pulses per burst (depending on the material that is cut), and hole separation (or pitch between defect lines) 5-15 µm, and for some glass compositions 7-12 µm. The use of picosecond pulse burst lasers would be preferable for these cutting speeds because they generate high power and the required number of pulses per burst. Thus, according to some exemplary embodiments, the pulsed laser produces 10-100 W of power, for example 25 W to 60 Watts, and produces pulse bursts at least 5-20 pulses per burst and the distance between the defect lines is 5-15 microns; and the laser beam and/or workpiece are translated relative to one another at a rate of at least 0.25 msec, in some embodiments at least 0.4 msec, for example 0.5 msec to 5 msec, or faster.

Figure 9B:
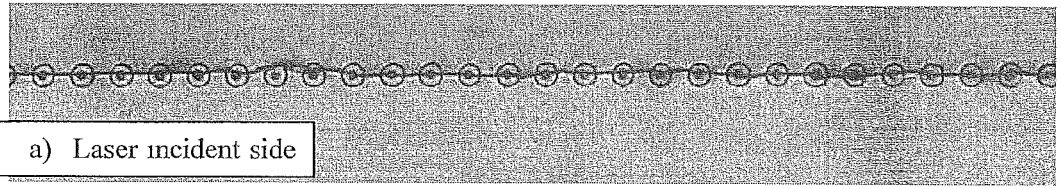
FIGS. 9B and 9C illustrate damage track created in low or no alkali alkaline earth boro-aluminosilicate glass. More specifically.
Figure 9C:
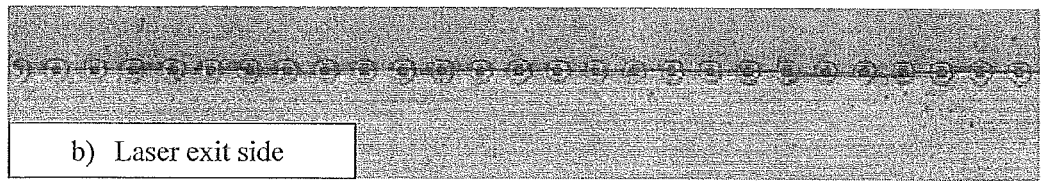
Figure 9D:
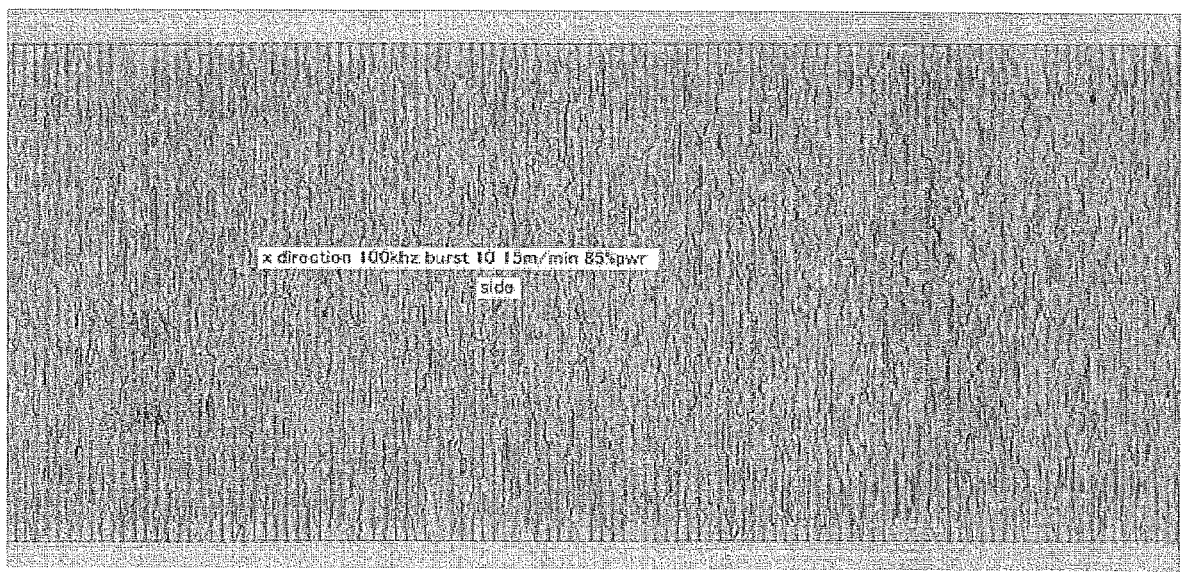
FIG. 9D is an edge image of the cut strip of 0.5 mm thick Eagle XG® glass shown in FIGS. 9B and 9C.

More specifically, in order to create the damage track for display or TFT glasses such as, for example Eagle XG or Contego glasses, as it is shown in FIGS. 9B-9C, the right synergy of burst energy, number of pulses per burst, and the pitch of the defects should to be used. The ranges that are used in other type glasses do not work for display or TFT glasses, or result in unsatisfactory (slow) cutting speeds. More specifically, FIG. 9B shows (the top surface view, laser incident side) perforation produced by the ultrashort laser pulse in the 0.5 mm Eagle XG glass available from Corning Incorporated. This figure illustrates perforation in the middle of the heat affected that induces the crack that connects the holes for easy separation. FIG. 9C is the image of the bottom surface of the same substrate, and shows the same characteristics as the top surface. For exemplary embodiments of FIGS. 9B and 9C the total energy in a the laser burst was 450 µJ. This energy is distributed in between the multiples pulses in the burst. The first two pulses are energetic enough (have enough power) to generate plasma along the damage track starting at the surface of the glass and the subsequent pulses interact with the plasma to lengthen the damage track through the bulk but also create the heat affected zone around the perforation. FIG. 9D is an edge (side) image of the cut strip of 0.5 mm thick Eagle XG® glass shown in FIGS. 9B and 9C, fully separated after a $CO_2$ beam treatment.

The heat affected zones around the focal area and the cracks connecting the defects form over time, as the energy from successive pulses accumulates in and around the focal volume, producing structural changes. The train of laser pulses constitutes a point source of heat at the focal spot within the bulk of the glass. The high number of pulses translates to a higher temperature around the focus producing larger heat affected zone. As this heated zone cools, a residual stress is induced in form of a tensile stress at the surface of the glass. That stress in turn interacts with the damage zone from the next burst that promotes the fracture that connects the perforations. We discovered a range of conditions to make the laser cutting process work for display/TFT glasses, and to lower the force required to separate the glass along the damage track. This force is also referred to as break resistance (or break force), and is the amount of force necessary to manually separate the glass; it can be measured via 4 point bend test, and has units of MPa. A break resistance below 20 MPa, and preferably below 15 MPa enables separation of the display or TFT glass with $CO_2$ beam at speeds greater than 250 mm/s. If break resistance is larger, then $CO_2$ separation speed proportionately slows. This target break resistance for the display or TFT glass is obtained by operating within the following specified ranges for the following 3 parameters, and then optimizing for specific display or TFT glass compositions within these specified ranges.

1. Pulse burst energy: For the purposes of cutting or separating the display or TFT glass, applicants discovered that pulse burst energy should be is between 300 µJ and 600 µJ per burst. Working outside this range will result in successful separation of other glasses, but not display (or TFT) glasses. For some display type glass types the ideal range is 300 µJ to 500 µJ, for other display type glass it is 400 µJ to 600 µJ. The pulse burst energy of 400 µJ to 500 µJ seems to work well for all display type glasses. Energy density within the line focus should be optimized for specific display or TFT glasses, for example, for both Eagle XG and Contego glasses the ideal range for the pulse burst energy is between 300 and 500 µJ and the line focus is between 1.0 and 1.4 mm (the line focus length is determined by the optical configuration).

Figure 9E:
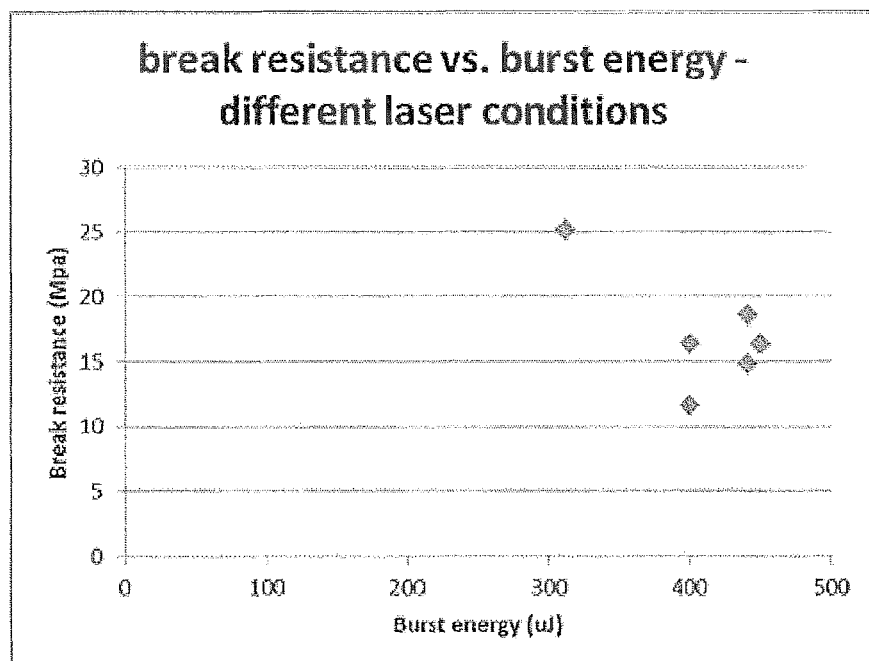
FIG. 9E illustrates break strength vs. burst energy for display glasses for different energy levels per burst.

Applicants discovered that the energy density is too low (below 300) then the perforations and heat damage do not form as desired and the fracture between holes will not readily materialize, leading to increased break resistance (also referred to herein as a break strength) in display glass. If the energy density is too high (>600 µJ, and for many display glasses >500 µJ) the heat damage is larger, causing the crack connecting the perforation to stray and not form along the desired path, and the break resistance (break strength) of the display (or TFT) glass will dramatically increase. FIG. 9E illustrates break strength vs. burst energy for display glasses for different energy levels per burst. This figure shows that the break strength (break resistance) increases dramatically when pulse burst energy approaches 300 µJ. It also illustrates that this display glass has lower break resistance when the pulse burst energy is about 400 µJ.

2. Pulses per burst: Applicant's also discovered that the having 5-22 (e.g., 5-20) number of pulses per burst is also important for low or ideal break resistance of display and/or TFT glasses. For some display glasses the number of pulses per burst is 5-15, for other display glasses it is 9-20 or 10-20 per burst. Working outside this specified range separates many glasses (e.g., Gorilla glass), but does not result in good or efficient separation of typical display or TFT glasses. For both Contego and Eagle XG glasses a large number of pulses per burst are needed. For example, to successfully perforate and/or cut the Eagle XG glass the number of pulses per burst is 7 to 20, preferably 9-20 and even more preferably 10-20. The range is even smaller for Contego glass; to successfully perforate and/or cut the Contego glass the number of pulses per burst is between 15 and 20. As a comparison, 2 to 4 pulses per burst are enough to perforate and separate strengthened and un-strengthened Gorilla glass, but for these two display glasses (Contego and Eagle XG) 4 pulses isn't enough to create the required damage track and the heat affected zone. To enable efficient cutting of display glasses (with minimum amount of sub surface damage and/or undesirable crack propagation), this required number of pulses per burst described herein should be utilized (based on the TFT/display glass compositions 5, or 7, or 10 or 15 pulses/burst) with the burst energy of 300 µJ to 600 µJ and preferably 400-500 µJ.

3. Pitch or Distance Between the Perforations.

Figure 9F:
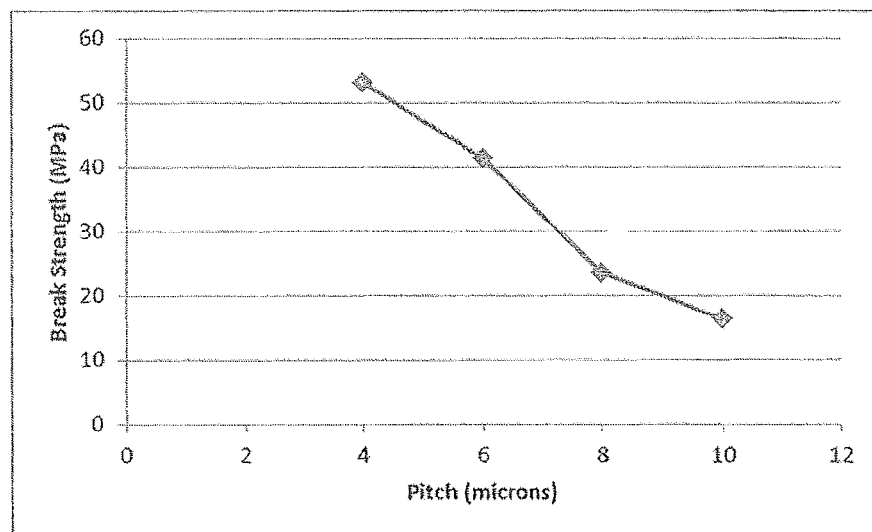
FIG. 9F break strength vs. perforation pitch for one embodiment of the display glass

Pitch or distance between the perforations is another parameter of importance. For display or TFT type glasses pitch or distance between the perforations should be preferably 5-15 microns. For example, for Eagle XG the ideal pitch for the lowest break resistance is between 5 and 15 microns. The break resistance increases rapidly when the pitch is outside of this range. For Contego type glass the ideal pitch is between 7 and 11 microns. The break resistance (break strength) for Contego type glass increases outside of this range, making the glass harder to cut or separate. Laser processing of Eagle XG type glass with pitches of less than 5 microns causes the cracks to stray from the fault line and form multiple interconnecting cracks resulting in higher glass break resistance. For example, FIG. 9F illustrates the rapid break strength increase for an embodiment of a display glass, as pitch changes from 10 microns to about 4 microns. More specifically the break strength increased rapidly (the glass became harder to separate) and was least 3 times greater when the perforation pitch was 4 microns vs. 10 microns). For perforation pitches >15 microns in the Contego type glass, the cracks do not connect from hole to hole. It is noted, that for display or TFT glasses, as described before above, choosing the pitch within the stated range (5-15 microns) should be to be done while simultaneously satisfying the requirements for both the energy density and the number of pulses within the pulse burst.

Thus, according to some embodiments a method of laser processing a display or TFT glass workpiece (also referred to herein as an alkaline earth boro-aluminosilicate glass composite workpiece), comprises:

focusing a pulsed laser beam into a laser beam focal line oriented along the beam propagation direction and directed into the alkaline earth boro-aluminosilicate glass composite workpiece, the laser beam focal line generating an induced absorption within the material, and the induced absorption producing a defect line along the laser beam focal line within the workpiece; and translating the alkaline earth boro-aluminosilicate glass composite workpiece and the laser beam relative to each other along a contour, thereby laser forming a plurality of defect lines along the contour within the workpiece, wherein a periodicity between adjacent defect lines is between 5 micron and 15 microns, the burst energy is between 300-500 micro Joules, and the number of pulses per burst is between 9 and 20, and preferably between 10-20.

According to some embodiments the periodicity between the adjacent defect lines is between 5 micron and 15 microns, the burst energy is between 300-500 micro Joules, and the number of pulses per burst is between 9-20. According to other embodiments the periodicity between the adjacent defect lines is between 7 micron and 12 microns, the burst energy is between 400-600 micro Joules, and the number of pulses per burst is between 5-15.

Table 1, below, shows the exemplary conditions of the pulsed laser used to successfully perforate and create the cracks between holes in Eagle XG and Contego glasses. The second step in the process is the use a $CO_2$ laser as a heat source to scan along the perforations created by the pulsed laser beam to fully separate the glass.

TABLE 1 exemplary laser parameters used in the embodiments of the method to successfully separate display/TFT glasses.

| | Laser Parameters | Eagle EXG glass | Contego glass |
|---|---|---|---|
| Pulsed laser | pitch | 10 µm | 10 µm |
| | energy/burst | 450 µJ | 450 µJ |
| | perforation speed | 300 mm/s | 250 mm/s |
| | # of pulses per burst | 10 | 15 |
| $CO_2$ Laser | Average Power | 240 W | 200 W |
| | Spot Size | 6 mm | 7 mm |
| | Range for Scan Speed | 100-300 mm/s | 100-250 mm/s |

Cutting and Separating Low-Alkali or Non-Alkali Glasses.

Figure 8C:
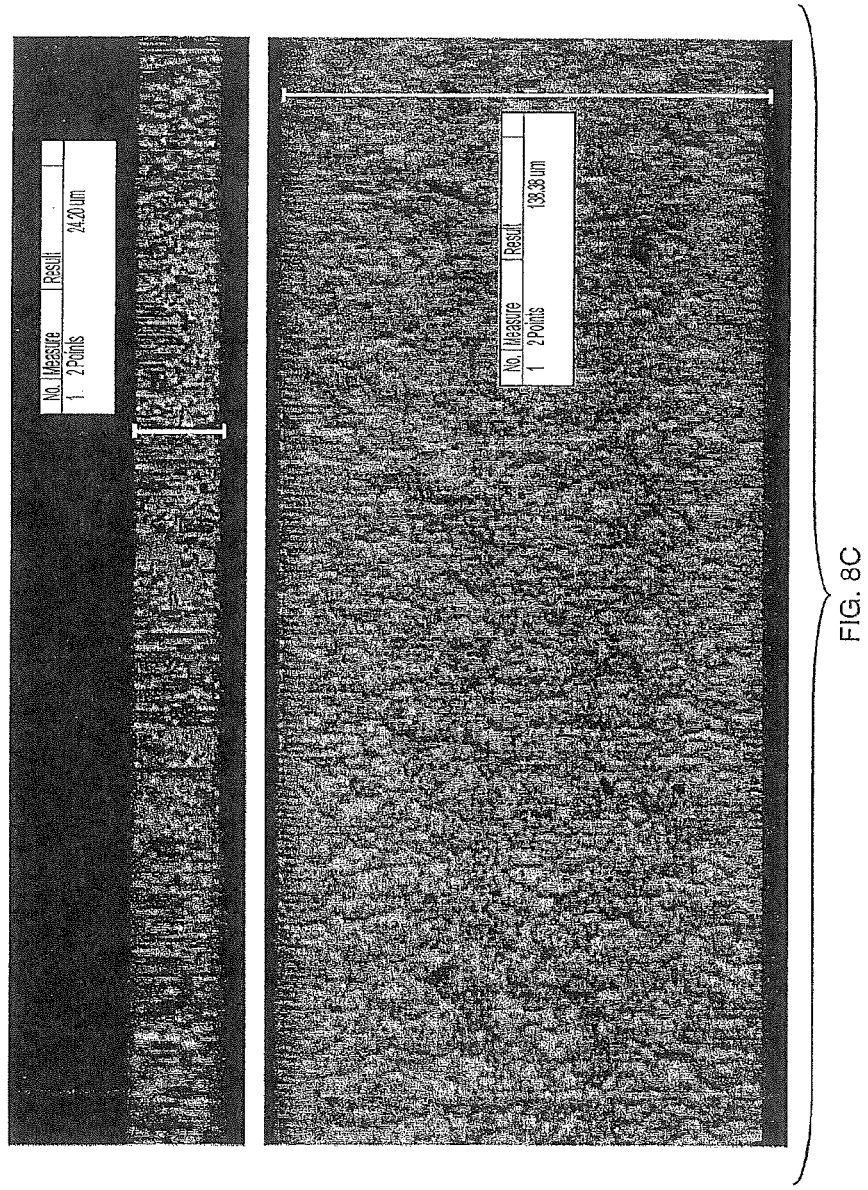
FIG. 8C illustrates cut edge images of a straight cut strips of 0.024 mm and 0.134 mm thick, thin film transistor (TFT) glass.

As shown in FIGS. 8C and 9A, different conditions were found that enable the separation of glasses, for example Eagle XG®, with either linear cuts or more complex shapes, for a wide range of substrate thicknesses. The images in FIG. 8C show the cut edges of a 0.024 mm thick piece of Eagle XG® glass (top image), and of a 0.134 mm thick piece of Eagle XG® glass (bottom image). Eagle XG® is a glass composition designed for use as a thin film transistor (TFT) substrate, and hence has an appropriate coefficient of thermal expansion (CTE) of about 3 parts per million per degree C. which allows it to approximately match the coefficient of thermal expansion of silicon. This laser process can also be used to cut and separate similar TFT glass compositions, i.e., those with similar CTEs to Eagle XG® (for example, CTE of 2 ppm/° C. to 5 ppm/° C.), as well as other glasses of other compositions and CTEs.

Some exemplary compositions are alkali-free glasses that possess high annealing points and high Young's moduli, allowing the glasses to possess excellent dimensional stability (i.e., low compaction) during the manufacture of TFTs, reducing variability during the TFT process. Glass with high annealing points can help prevent panel distortion due to compaction/shrinkage during thermal processing subsequent to manufacturing of the glass. Additionally, some embodiments of the present disclosure have high etch rates, allowing for the economical thinning of the backplane, as well as unusually high liquidus viscosities, thus reducing or eliminating the likelihood of devitrification on the relatively cold forming mandrel. As a result of specific details of their composition, exemplary glasses melt to good quality with very low levels of gaseous inclusions, and with minimal erosion to precious metals, refractories, and tin oxide electrode materials.

In one embodiment, the substantially alkali-free glasses can have high annealing points. In some embodiments, the annealing point is greater than about 785° C., 790° C., 795° C. or 800° C. Without being bound by any particular theory of operation, it is believed that such high annealing points result in low rates of relaxation—and hence comparatively small amounts of compaction—for exemplary glasses to be used as backplane substrate in a low-temperature polysilicon process.

In another embodiment, the temperature of exemplary glasses at a viscosity of about 35,000 poise (T35k) is less than or equal to about 1340° C., 1335° C., 1330° C., 1325° C., 1320° C., 1315° C., 1310° C., 1300° C. or 1290° C. In specific embodiments, the glass has a viscosity of about 35,000 poise (T35k) less than about 1310° C. In other embodiments, the temperature of exemplary glasses at a viscosity of about 35,000 poise (T35k) is less than about 1340° C., 1335° C., 1330° C., 1325° C., 1320° C., 1315° C., 1310° C., 1300° C. or 1290° C. In various embodiments, the glass article has a T35k in the range of about 1275° C. to about 1340° C., or in the range of about 1280° C. to about 1315° C.

The liquidus temperature of a glass (Tliq) is the temperature above which no crystalline phases can coexist in equilibrium with the glass. In various embodiments, a glass articles has a Tliq in the range of about 1180° C. to about 1290° C., or in the range of about 1190° C. to about 1280° C. In another embodiment, the viscosity corresponding to the liquidus temperature of the glass is greater than or equal to about 150,000 poise. In some embodiments, the viscosity corresponding to the liquidus temperature of the glass is greater than or equal to about 175,000 poise, 200,000 poise, 225,000 poise or 250,000 poise.

In another embodiment, an exemplary glass can provide T35k−Tliq>0.25T35k−225oC. This ensures minimum tendency to devitrify on the forming mandrel of the fusion process.

In one or more embodiments, the substantially alkali-free glass comprises in mole percent on an oxide basis: SiO2 60-80; Al2O3 5-20; B2O3 0-10; MgO 0-20; CaO 0-20; SrO 0-20; BaO 0-20; ZnO 0-20; where Al2O3, MgO, CaO, SrO, BaO represent the mole percents of the respective oxide components.

In some embodiments, the substantially alkali-free glass comprises in mole percent on an oxide basis: SiO2 65-75; Al2O3 10-15; B2O3 0-3.5; MgO 0-7.5; CaO 4-10; SrO 0-5; BaO 1-5; ZnO 0-5; wherein 1.0≤(MgO+CaO+SrO+BaO)/Al2O3<2 and 0<MgO/(MgO+Ca+SrO+BaO)<0.5.

In certain embodiments, the substantially alkali-free glass comprises in mole percent on an oxide basis: SiO2 67-72; Al2O3 11-14; B2O3 0-3; MgO 3-6; CaO 4-8; SrO 0-2; BaO 2-5; ZnO 0-1; wherein 1.0≤(MgO+CaO+SrO+BaO)/Al2O3<1.6 and 0.20<MgO/(MgO+Ca+SrO+BaO)<0.40.

In other embodiments, the glass comprises an annealing temperature greater than or equal to about 785° C.; a Young's modulus greater than or equal to about 81 GPa; a T200P less than or equal to about 1750° C.; a T35kP less than or equal to about 1340° C.; and an average surface roughness as measured by atomic force microscopy of less than 0.5 nm. This glass can include a density less than or equal to about 2.7 g/cc and the specific modulus is less than about 34. In other embodiments, the specific modulus is between 30 and 34. In further embodiments, (MgO+CaO+SrO+BaO)/Al2O3 is in the range of about 1.0 and 1.6. In some embodiments, the T200P is less than or equal to about 1700° C. In some embodiments, the T35kP less than or equal to about 1310° C. This glass may also comprise in mole percent on an oxide basis: SiO2 60-80, Al2O3 5-20, B2O3 0-10, MgO 0-20, CaO 0-20, SrO 0-20, BaO 0-20, and ZnO 0-20.

In some embodiments, the glass comprises (MgO+CaO+SrO+BaO)/Al2O3 is in the range of about 1.0 and 1.6, T(ann)>785° C., density<2.7 g/cc, T(200P)<1750° C., T(35kP)<1340° C., Young's modulus>81 GPa. This glass may also comprise in mole percent on an oxide basis: SiO2 60-80, Al2O3 5-20, B2O3 0-10, MgO 0-20, CaO 0-20, SrO 0-20, BaO 0-20, and ZnO 0-20.

In other embodiments, the glass comprises (MgO+CaO+SrO+BaO)/Al2O3 is in the range of about 1.0 and 1.6, T(ann)>785° C., density<2.7 g/cc, T(200P)<1750° C., T(35kP)>1270° C., Young's modulus>81 GPa. This glass may also comprise in mole percent on an oxide basis: SiO2 60-80, Al2O3 5-20, B2O3 0-10, MgO 0-20, CaO 0-20, SrO 0-20, BaO 0-20, and ZnO 0-20.

The first method is to use a picosecond (pulse burst) laser to create defect lines or holes and forming a fault line of multiple damage tracks according to the desired shape, followed by the mechanical separation. After formation of the defect lines or holes, mechanical separation of glass can be accomplished manually by using breaking pliers, bending the part by hand or with a dedicated tool, or any method that creates sufficient tension that initiates and propagates the separation along the perforated fault line.

Another method utilizes a picosecond (pulse burst) laser to create defect lines or holes and forming a fault line of multiple holes (or multiple damage tracks) following the desired shape. This step is then followed by the step of thermal separation, preferably by $CO_2$ laser, where the $CO_2$ beam is scanned along the fault line of damage tracks. In some embodiments, the laser method can be used to form a circular glass memory disk having an interior hole in which a spindle can be inserted during operation of the memory disk. The CO2 laser can be used to release the cut glass from this interior hole. It was unexpectedly discovered that the laser methods described herein can be used to create arbitrary shapes such as, but not limited to, circular shapes, etc., where the starting and ending points meet along the circumference of the circle but do not form a burr. As is known in the art, conventional laser separation methods for curvilinear shapes create a large amount of melted material at the beginning point of the laser separation technique and at the ending point (usually the same or substantially the same location as the beginning point) of the laser separation technique. This burr either adversely affects the qualities of the end product or must be subjected to additional grinding or polishing techniques to remove the burr. Exemplary laser methods according to this disclosure, however, were unexpectedly found not to result in such a burr.

Figure 9G:
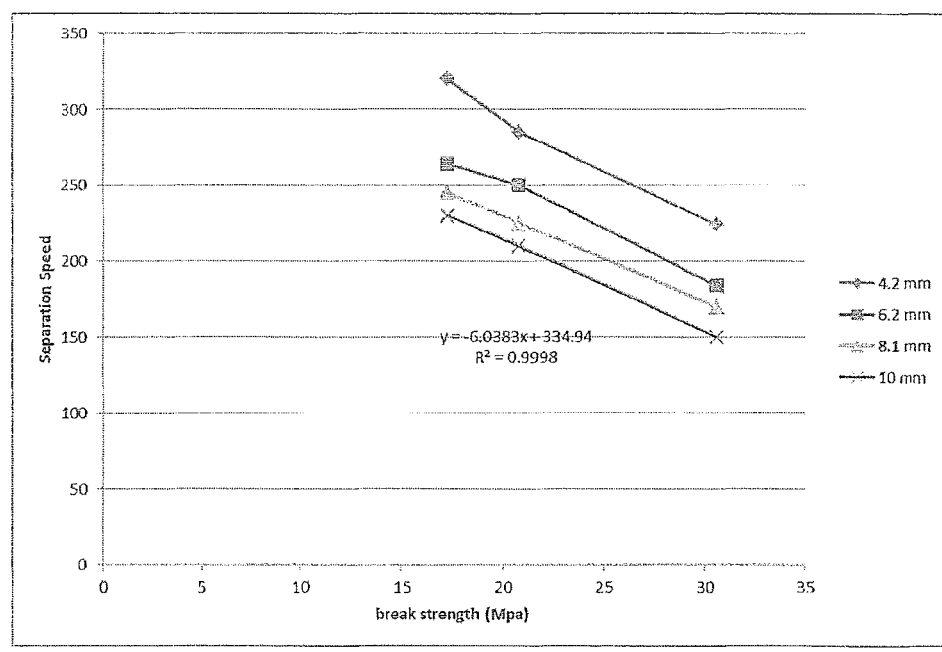
FIG. 9G illustrates the increase of speed as a function of $CO_2$ beam diameter according to one embodiment described herein.

The $CO_2$ laser beam is a controlled heat source that rapidly increases the temperature of the targeted glass surface. This rapid heating builds compressive stress in the glass surface layer. Since the heated glass surface is relatively small compared to the overall surface area of glass substrate, it cools rapidly and this temperature gradient induces a tensile stress high enough to propagate the existing crack through the glass and along the cut direction (i.e., along the perforations), resulting in full glass separation. This full glass separation technique can be used along the perimeter or circumference of the cut piece, e.g., memory disk or the like, or along the interior circumference/perimeter of the interior hole or other geometrical shape, or both. FIG. 9G shows the increase of speed as a function of $CO_2$ beam diameter. More specifically, this figure illustrates break strength as a function of separation speed (cutting speed) for four exemplary embodiments of $CO_2$ beam diameters (Gaussian beam profiles). This figure also illustrates that with increased break strength the separation or cutting speed decreases (i.e., separation speed increases as the amount of force required to separate glass decreases). This figure also illustrates that for Gaussian types of laser beams, the speed of the separation of the glass increase as the $CO_2$ beam diameter becomes smaller. Note that if the diameter of the $CO_2$ beam becomes too small, then the glass will be heat damaged. This controlled heating can be accomplished using multiple $CO_2$ beam shapes and beam intensity distributions. In Table 1 embodiments the laser intensity distribution is Gaussian, with a circular spot 6 mm diameter for Eagle XG glass and 7 mm for Contego glass. For this beam shape (circular) and intensity distribution (Gaussian), for the embodiments of Table 1, the glass separation speed (cutting speed) is optimized at 300 mm/s for Eagle XG®, and 250 mm/s for Contego. In some embodiments the power of $CO_2$ laser is 100-400 W.

Similar values for separation speed achieved with the circular $CO_2$ laser beam can be also obtained using differently shaped laser beams. For example, a "top hat" laser beam a uniform intensity distribution may be utilized as a $CO_2$ laser heat source—(i.e., rectangular instead of Gaussian shaped laser beam intensity profile). Because the peak intensity of a top hat laser beam is half of the peak intensity of the Gaussian laser beam, the laser beam diameter can be further reduced without overheating of glass. Reduction of laser beam diameter increases the separation speed. Additionally, the top hat profile increases the thermal gradient and therefore the thermal stress induced in the glass without overheating the glass. This also allows for increases in the separation speed. The "top hat" beam $CO_2$ laser profile can be achieved using one of the following techniques: diffractive laser beam shapers, aspherical lenses, or using a square or round aperture (at the expense of laser power). The top hat $CO_2$ beam profiles achieve glass separation speeds of >300 mm/s for Eagle XG® glass, and greater than and 250 mm/s for Contego glass. The power of $CO_2$ laser is, for example, 100 W-400 W (for example 200-400 W).

In another approach we used a galvanometer in conjunction with the $CO_2$ laser to separate the laser perforated—(i.e., rectangular (instead of Gaussian) shaped laser beam profile) Eagle XG® and Contego glasses. In these embodiments, the $CO_2$ laser beam was rastered perpendicularly to the damage track while moving along the perforation line. A laser beam with a beam diameter of 2 mm was used in the experiment. The magnitude of perpendicular rastering (i.e., across the fault line) was 4 mm. A cut speed increase of about 20% was observed relative to the cut (separation) speed achieved with the use of a 6 mm diameter Gaussian $CO_2$ laser beam. The power of $CO_2$ laser is, for example, 100 W-400 W (for example 200-400 W).

Faster separations speeds can be accomplished using an elliptical laser heating source, for example with a $CO_2$ laser having the beam spot with its major axis along the cut direction with axis length of 20 mm and it's minor axis set at 6 mm. For example, separation speeds of 500 mm/s were obtained with an elliptical beam 6 mm×8 mm, aligned along the damage track with $CO_2$ laser having power of 226 W.

The diameter or internal diameter of a defect line before separation is the internal diameter of the open channel or air hole in the glass material or workpiece. Once the workpiece is separated, defect lines can still be visible, as shown in FIG. 8C, for example. Widths of the individual defect lines visible on the separated workpiece can be measured using a microscope, for example, and the widths can be comparable to the internal diameters of the defect line before separation. For example, if the defect line diameter is between 0.1 micron and 5 microns, then the corresponding widths of the individual defect lines on the surface separated after the cut can be in the range of between about 0.1 micron and 5 microns.

Figure 10:
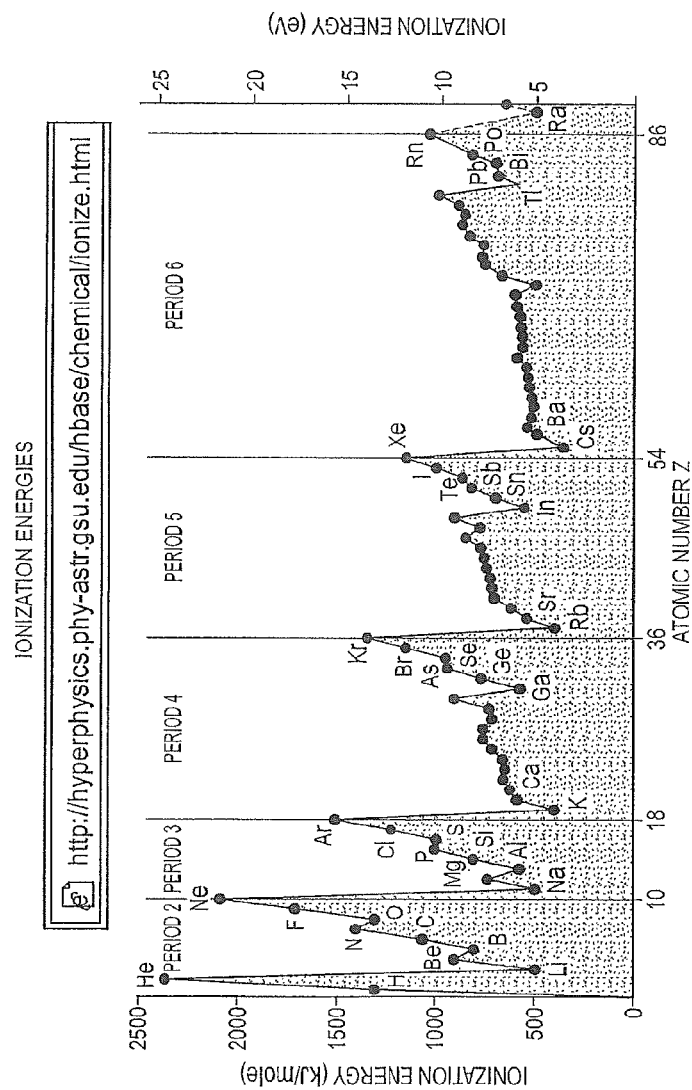
FIG. 10 illustrates Atomic Ionization Energies.

Eagle XG® glass and similar compositions from a family of low or non-alkali glasses present challenges for laser induced separation approaches due to their strong molecular and atomic bonds requiring high pulses energies to "break". FIG. 10 shows atomic ionization energies. The reduction of Na, Ca, K & similar elements as compared to what is commonly used in typical alkali glass compositions (such as Corning Gorilla® glass) removes low ionization elements leaving proportionally more elements that require multiphoton absorption to ionize (when exposed to laser wavelengths in the transparent regime). This embodiment(s) provides a means of uniformly irradiating a small cylindrical volume of material with sufficient laser energy to disassociate atomic and molecular bonds resulting in low debris and low subsurface damage.

Difference between display glass compositions and Gorilla glass compositions:

Eagle XG® and Other Display Glasses:
i. CTE is lower, about 3 ppm/° C.
ii. Alkali free (or only trace amounts)
iii. Low thermal diffusivity Corning Gorilla® and Other Ion-Exchangeable Glasses:
i. CTE is generally about 7-9 ppm/° C.
ii. Has high amounts of alkalis like sodium in composition (allowing it to be ion exchanged)
iii. Higher thermal diffusivity.

Low thermal expansion and low thermal diffusivity of TFT glass compositions create difficult thermal management issues when such glasses are being cut exclusively) with lasers operating in the non-transparent regime (ex. $CO_2$ at 10.6 microns), due to the need to produce and manage stresses for thermal crack propagation. For example, TFT glass is not transparent to 10.6 micron wavelength, and the energy of such laser is absorbed by the high layer of the glass (not far down in the glass interior). However, we discovered the creation of a perforation line(s) simplifies the thermal management issues by reducing the amount of laser energy required to start, propagate and direct cracks, and the use of the IR lasers such as the $CO_2$ at 10.6 micron laser to heat the glass, after glass is perforated with picosecond pulse laser advantageously results in fast, efficient and controlled crack propagation between the defect lines, and thus fast and efficient cutting of alkaline earth boro-aluminosilicate glasses.

There are compositional differences in types of display glasses that result in the need for additional fine tuning of laser parameters of these glasses. For example, to Eagle XG® (also referred herein as EXG) has a wider range of values for power, pitch and number of pulses than does a high native damage resistance glass (e.g., Contego). Both glasses possess a low CTE in the range of 3-4 ppm/° C. The compositions of the two glasses are listed below in TABLE 2.

TABLE 2

| mol % | 7607(Contego) | EXG |
|---|---|---|
| $SiO_2$ | 67.02 | 67.2 |
| $Al_2O_3$ | 6.29 | 10.97 |
| $B_2O_3$ | 19.82 | 10.21 |
| MgO | 0.51 | 2.28 |
| CaO | 4.89 | 8.74 |
| SrO | 0.51 | 0.52 |
| BaO | 0.01 | 0 |
| $SnO_2$ | 0.05 | .06 |
| $ZrO_2$ | 0.02 | .01 |
| $Fe_2O_3$ | 0.01 | .01 |
| $Na_2O$ | 0.87 | 0 |
| Total | 100.00 | 100.00 |

The methods described herein thus provide an effective means of cutting non-alkali glasses in arbitrary shapes in plates or sheets as well as in a continuous fashion (as required by a continuous fusion glass manufacturing process—called "On-the-Draw"). Picosecond laser perforation of small (e.g., Corning Willow® glass) thicknesses (about 100-200 microns, or 100-150 microns) have been demonstrated, for example, at speeds of 200-300 mm/sec with pulse spacing of 1 micron to 20 microns (and greater speeds are possible).

Cutting Glass On-the-Draw

Mechanical scoring & breaking is the traditional glass cutting approach for a continuous fusion glass manufacturing process. Although fast, achieving 1 m/s for straight cuts, this process is highly limited when it comes to cutting contour glass shapes as it becomes extremely challenging for such applications due to slow speed, glass edge chipping, high roughness of the cut edge, etc. These applications require multiple grinding and polishing steps in order to reduce subsurface damage (SSD), as well as washing steps, which not only add cost to the process due to higher capital requirements and higher costs due to low yields, but are also simply not capable of meeting the technical requirements.

Carbon dioxide ($CO_2$) laser score and break approach has been tried for cutting display glass compositions. This technique relies on mechanical crack initiation followed by a $CO_2$ thermally induced laser crack propagation. Most often, a $CO_2$ laser radiation at the wavelength of 10.6 microns is used as a precision heat source followed by a coolant jet to create the thermal shock and propagate the crack along the straight line. The difficulties in this approach lie in controlling the directions and propagation speed of such cracks, especially around contours. Although straight cutting by either a mechanical or a $CO_2$ laser score and break techniques might work well for some applications, highly precise, clean and flexible (i.e., not just cutting along straight lines) glass cutting solutions needed.

One example of the difficulties of both mechanical and $CO_2$ based scoring is the liquid crystal display (LCD) glass fusion draw process. In the LCD fusion draw process, a continuous ribbon of thin flat glass is formed, emanating from a high draw tower. This thin glass is most often formed between 0.050 mm and 2 mm thick and between 24 inches and 150 inches wide (60.96 cm and 381 cm wide). This ribbon of glass is scored by a mechanical scoring wheel similar to scoring or cutting glass windows. This scored glass is then mechanically bent and broken from the ribbon to establish a sheet that is, for example, 24 inches to 150 inches wide (about 61 cm to 381 cm wide) by 24 inches to 150 inches tall (i.e., about 61 cm to 381 cm tall) at the bottom of the draw tower. Since the sheet of glass is mechanically gripped and pulled by rollers on its outermost ends, such a sheet will have very rough and thick sections on the right and left sides of the sheet, with these sections being termed "beads" or "edge beads". Mechanical scoring can only be performed in the quality area of the glass sheet, and not in the thicker beaded section of the glass sheet. A robot will grip the sheet of glass, bend it, and break the scored sheet from the ribbon of glass. This breaking action causes a high amplitude vibration up the ribbon into the draw tower which causes forming flatness variations in the final sheet. It also can cause "rubicons" or significant disruptions of the continuous sheet forming process, since the vibration can run a micro-crack up the draw. Mechanically scoring and breaking of glass can also produce glass chips that are very small and light and can be carried through the air to deposit on nearby surfaces, with these glass chips sometimes being 10-200 microns in size and 3-20 microns thick. These glass chips produced by mechanical scoring float up the draw tower and attach to the surface of the sheet. Some of these particles, called "clam-shell" glass chips, have very flat faces which allows them to adhere tightly to other glass surfaces, and also attach permanently to the ribbon glass surface. Such adhered glass chips produced by mechanical scoring result in a rejected section of the glass sheet since such contamination is very difficult to wash off and will disrupt coatings and patterning on the glass needed for LCD and TFT applications.

After being drawn, this glass sheet is then moved from the ribbon area to a secondary cut area, where the glass sheet is often placed on another machine called a vertical bead scoring machine, and the beaded section of the glass or non-quality area is then mechanically scored, and then the bead section is mechanically broken off of the parent sheet. Again, tiny clam-shell glass chips can fly off the sheet onto the defect area, resulting in a rejected section of glass.

All the sheets are then packed in some cases into crates and shipped to a finishing location. Again, clam shell glass chips can migrate from the edge of the glass to the surface and result in rejected sections of glass. This crate of glass in unloaded and placed in a finishing line, where the sheet is mechanically or $CO_2$ scored and mechanically broken into a slightly smaller sheet of glass. This off-line scoring process is much more precise than the on-draw score process. Again, more clam-shell glass chips fly onto the glass surface, resulting in rejected sections of these glass sheets.

Such a sheet is next moved to edge grinders that rough and fine grind the thin glass sheets to a final length and width, and also can be used to generate a desired edge profile or bevel. Then, the sheet is moved to another grinder that will grind the four corners. Next, the sheet moves to an inline washer that cleans the surface of most loose particles except the clam shell particles.

In contrast to the traditional mechanical score and break methods, the laser glass cutting technology disclosed herein is advantageously able to cuts glasses such as thin glass extremely accurately, extremely fast, along predetermined contours, and without creating large or significant number of glass chips. Also, the glass can be perforated at extremely high speeds (for example, 1-2 meters/sec). In test cases, no chips have been observed on the edge of the glass. The laser process can perforate and separate small glass articles like a cell phone size (70 mm×150 mm) shape out of a larger sheet of glass. This perforating and separating process of thin glass leaves behind an edge with surface roughness (Ra) less than 400 nm and sub-surface micro-cracks of <60 microns. This edge quality is close to the quality of a ground sheet of glass. Given this capability, hot glass can be laser cut at the fusion draw process that makes thin glass sheets. Thus, the embodiments of technology described herein advantageously offer yield improvement, reduced or non-existent particulate generation, and cost improvement by allowing the glass to be cut to final shapes on the draw line (or shortly after on a finishing line, if so desired).

Figure 11:
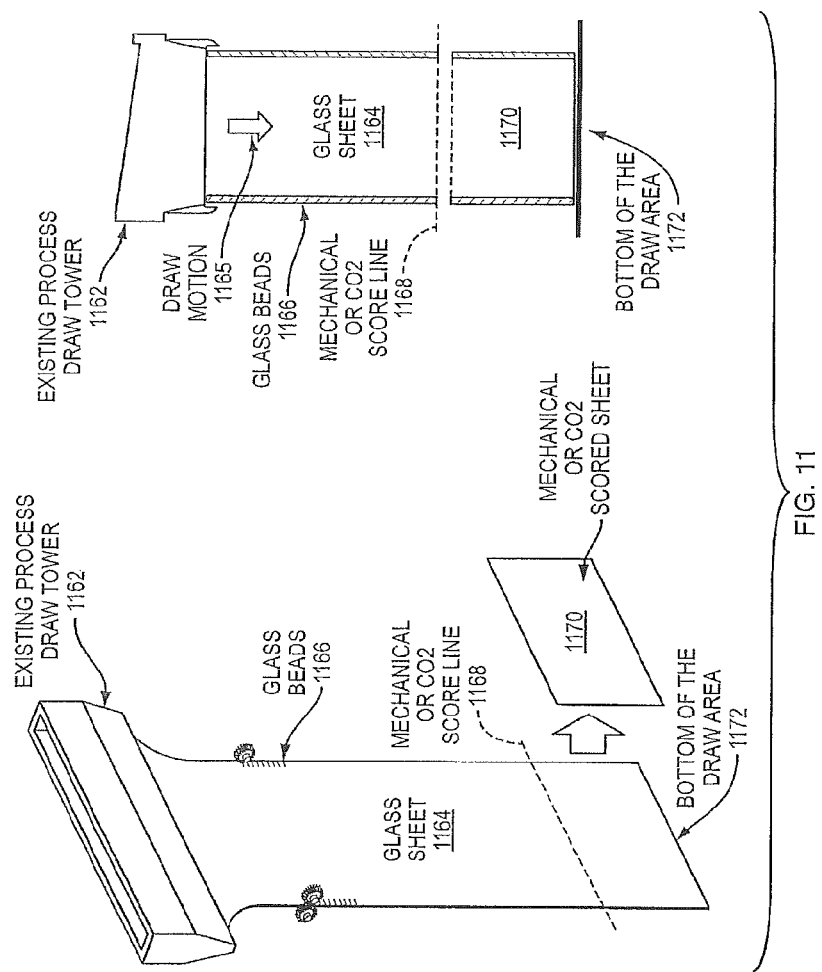
FIG. 11 illustrates an existing glass cutting approach for a continuous fusion glass manufacturing process using mechanical or $CO_2$ laser scoring.

FIG. 11 illustrates an existing glass cutting approach for a continuous fusion glass manufacturing process. In the existing process, a glass sheet 1164 flows down from a draw tower 1162. Darker shading of the glass sheet 1164 indicates higher temperature. When a sheet of glass is formed, for example on a fusion draw machine, the hot and soft glass sheet is pulled by a grasping mechanism such as rollers that form imprints on the two outer edges of the glass sheet. The imprinted edges are called "beads", and these edges extend the entire length of the glass sheet. Since these beaded areas are often distorted and non-flat compared to the central section of the glass sheet, removal of the beads (or beaded area) is done before the glass is utilized in making final devices. As illustrated by draw motion 1165, the glass sheet is drawn down using roller wheels that create glass beads 1166 along the edge of the glass sheet 1164. A mechanical or $CO_2$ laser score is applied along a score line 1168, facilitating breaking of a scored sheet 1170 from the glass sheet 1164.

The methods described herein offer a glass cutting solution for display glass compositions for both online and off-line glass cutting needs. Online, these methods can be applied for both cutting and bead removal of the glass sheet as it comes from the draw, particularly at the area known as the Bottom of the Draw (BOD), where glass starts cooling down from its forming temperature. When a sheet of glass is formed, for example on a fusion draw machine, the hot and soft glass sheet is pulled by a grasping mechanism such as rollers that form imprints on the two outer edges of the glass sheet. The imprinted edges are called "beads", and these edges extend the entire length of the glass sheet. Since these beaded areas are often distorted and non-flat compared to the central section of the glass sheet, removal of the beads (or beaded area) is done before the glass is utilized in making final devices. The methods described herein provide a glass cutting solution that can result in a full-body (full-thickness) perforation through the whole thickness of the glass sheet. A series of full-thickness perforations can form a fault line that, upon sheet separation along the fault line, can form a very precise and controllable cut in the glass sheet.

Figure 12:
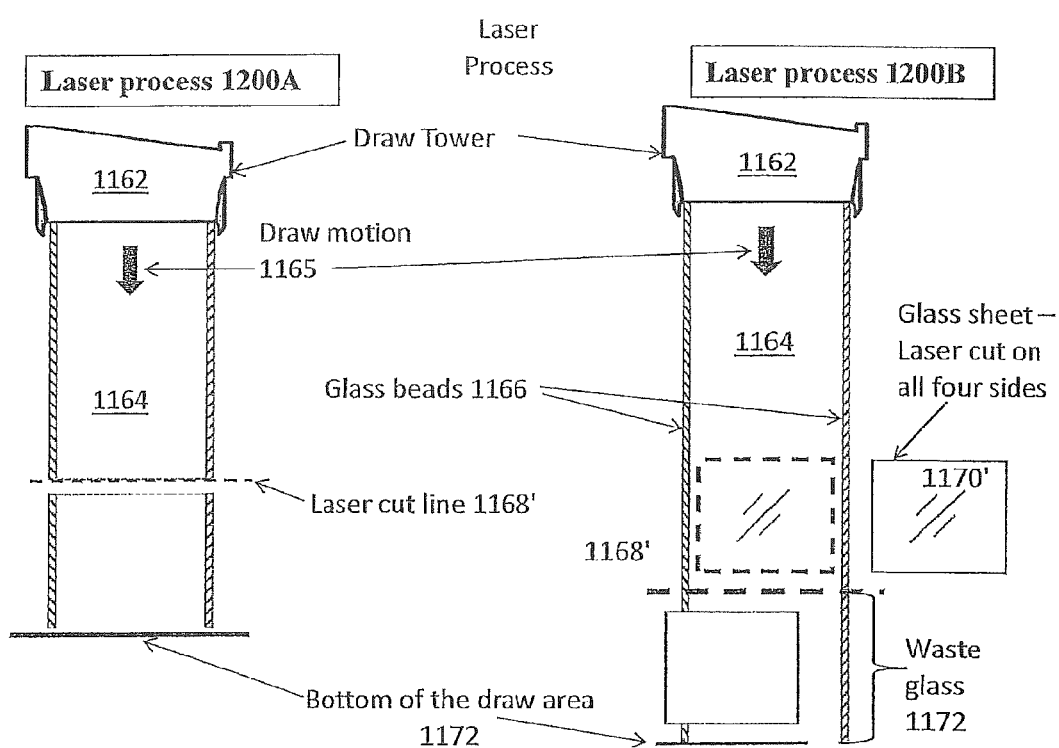
FIG. 12A illustrates a method of laser-based cutting of glass on the glass draw, in which glass plates or sheets are separated from the draw using a horizontal laser cut.
FIG. 12B illustrates a method of laser-based cutting of glass on the glass draw, in which a laser is used to cut through the areas of the glass sheet and remove a quality section of glass from the draw.

FIGS. 12A-12B illustrate two methods of laser glass cutting on the draw according to methods described herein, utilizing laser optical systems such as those described herein in conjunction with FIGS. 2-6. According to a laser cutting process 1200A, a laser cut line 1168' consisting of a series of defect lines is applied to the glass sheet 1164 formed by the draw tower 1162. In the process 1200A, the laser (not shown) is configured to cut through the entire thickness of the glass sheet 1164. The laser cut line 1168' extends across the entire width of the newly formed glass sheet 1164 on the draw, including cutting the beads 1166 without vibrating the glass ribbon or creating any glass chips or particles.

FIG. 12B illustrates an alternative method 1200B of laser glass cutting on the draw, in which a laser is used to cut through the quality areas of the glass sheet and remove a large rectangular sheet 1170' of glass. Waste glass 1172 is removed from the glass sheet at the bottom 1172 of the draw area. It should be recognized that in other embodiments, the removed glass sheet 1170' need not be rectangular. The glass sheet 1170' can be square or circular or have any other shape required.

Figure 13:
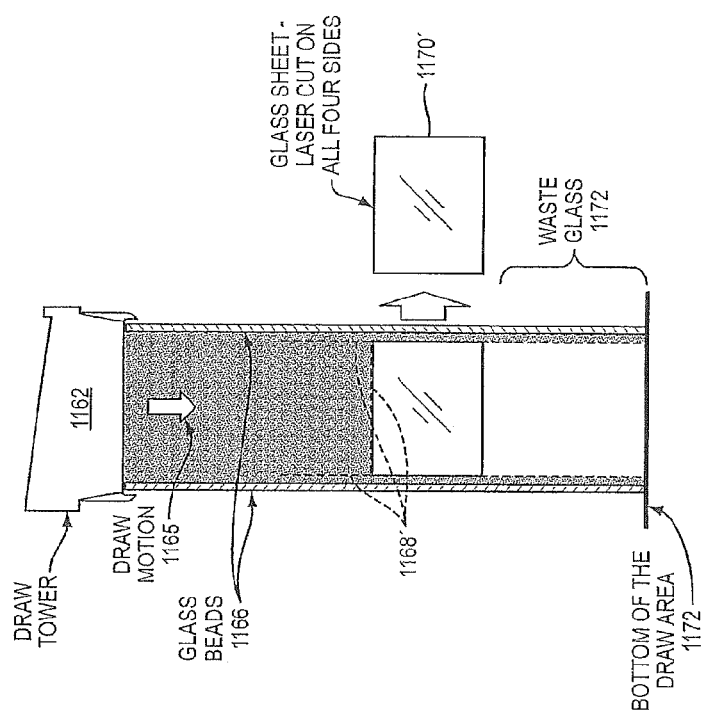
FIG. 13 illustrates laser-based cutting of glass on the draw by cutting beads high in the draw and horizontally cutting the sheet lower in the draw.

FIG. 13 illustrates yet another alternative method of laser glass cutting on the draw. In FIG. 13, vertical laser cut lines 1168' are applied adjacent to the glass beads 1166 relatively higher up in the draw path. Then, relatively lower in the draw path, horizontal laser cut lines 1168' are applied to cut and remove the glass sheet 1170' from the draw.

Figure 14:
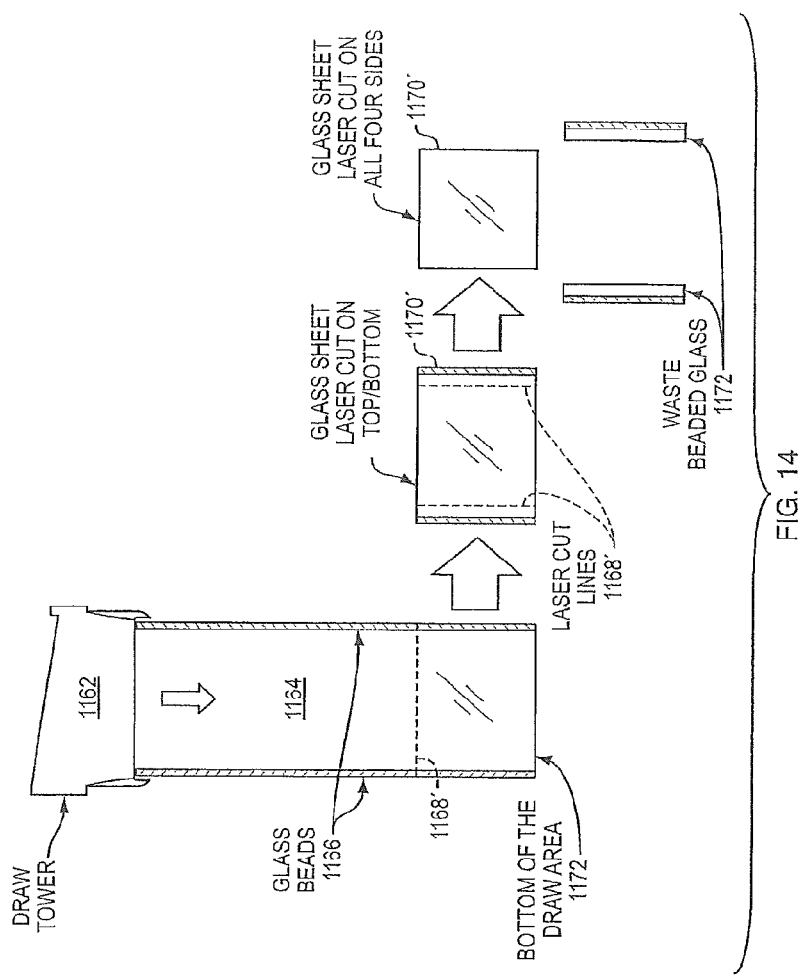
FIG. 14 illustrates laser-based cutting of glass on the draw by cutting horizontally to remove the glass from the draw, followed by separate vertical cuts to remove glass edge beads.

FIG. 14 illustrates a further alternative method of laser glass cutting on the draw. In FIG. 14, horizontal laser cut lines 1168' is applied on the draw, across the entire width of the glass sheet 1164, to remove the laser cut sheet 1170' from the draw. Following this, vertical laser cut lines 1168 are applied to the cut sheet 1170' to remove the beads from the cut sheet at the bottom of the draw.

FIG. 15 illustrates use of the laser methods described herein to remove trim or waste glass 1172 from the sheet 1170' away from the draw. In a finishing area, both horizontal and vertical laser cut lines 1168' are applied to remove the horizontal and vertical pieces of waste glass 1172 from the laser cut glass sheet 1170'.

The laser glass processing technology disclosed herein can cut thin glass extremely accurately, extremely fast and without creating glass chips. The laser-based technology can perforate glass with extremely small holes (<1 micron in diameter, e.g.) and short pitch spacing (1 micron, e.g.). Also, the methods disclosed herein can be used to perforate glass at extremely high speeds (e.g., 1-2 meters/sec). No chips have been seen on the edge of the glass. Small glass articles such as those for cell phones (e.g., 70 mm×150 mm) can be perforated and removed out of a larger sheet of glass. This perforating and separating process of thin glass leaves behind an edge with a roughness less than 400 nm Ra and sub-surface micro-checks or micro-cracks at <60 microns. This edge quality is close to the quality of a ground sheet of glass. Given these capabilities, a laser-based process can be used to cut hot glass at the fusion draw process that makes thin glass sheets.

Glass stresses may also be of particular concern for some applications, particularly for applications with glass sheets or laminated glass sheets that have high stresses. Cutting of sheets under such circumstances with traditional methods presents significant difficulties. For example, significant amounts of stress are induced during the drawing of LCD glass sheets during the fusion draw process. The stress at the sheet and bead interface is even larger during glass cooling because of the differential thickness between sheet and bead and the different associated cooling rates. The stress level can be significantly larger for the case of fusion drawn laminated sheets (>300 MPa), where the viscosity and CTE differences between adjacent sheet layers result in very high outer layer compressive stress. This high compressive stress layer property can significantly improve the glass strength of the laminated glass sheet. However, cutting of the glass sheet by traditional methods can be difficult in sheets with high stress levels.

As is understood in the art, LCD glass sheets made with the fusion draw process have high stresses that are induced as the glass is cooled from above its softening point to much below its strain point. The stress is also significantly higher at the glass bead interface due to differences in thicknesses and thermal mass. The stresses are much higher (>300 MPa) for the case of laminated glass sheets, where the mismatch in CTE and viscosity of glass layers can induce high compressive stresses needed for strengthened glass applications. These high levels of stress make it very difficult to cut the glass sheets at temperatures that are much below the strain point of the glass (<300° C.).

Methods and different embodiments are disclosed to cut the sheets and separate beads from the sheet using the laser technology which entails single shot penetration through the thickness of the glass sheet. Methods disclosed herein allow for laser-based cutting of the sheet at the draw and separation of beads to improve the manufacturing efficiency of fusion draw process. Furthermore, in some embodiments, single layer sheets and laminated sheets can be cut at high temperatures (close to the annealing point of the glass), making the induced stress much smaller. The ability to cut sheets at high temperature and then post-process the sheet through prescribed temperature profiles can also accommodate sheets with lower glass compaction, lower residual stresses, the possibility to eliminate the cost of separate finishing steps, the ability to process glasses of higher strain point, and increased production throughput due to the glass staying at the annealing temperature longer.

FIG. 16 illustrates an example process using a multi-stage furnace 1671 designed to hold the glass sheet portion 1170' (to be cut) at a temperature close to its annealing point. At the lower part of the draw, the glass sheet 1170' (to be cut) is introduced into a furnace 1671a held around the annealing temperature of the glass. The lower stress level at the elevated temperatures near the annealing point aid in cutting of the sheet. The sheet 1164 is first cut horizontally by a laser beam 1674 at the draw that undergoes horizontal laser beam translation 1676 to produce a plurality of defect lines in the glass.

The glass sheet 1170' is then translated to furnace 1671b, also held at the annealing temperature of the glass. The glass beads 1166 are separated using the laser beams 1674, which are configured to undergo vertical translation 1674 to laser score the glass sheet 1170' adjacent to the beads 1166. The horizontal and vertical cutting steps can include applying tensile or bending stresses along the laser-damaged contours to separate the glass from the draw and to separate the glass beads from the cut glass sheet 1170' if necessary. The stresses can be applied using robots, for example.

Following removal of the glass beads, the cut glass sheet 1170' is translated to a third furnace 1671c, where heat sources 1680 undergo vertical translation 1682 to deliver heat to the cut edges of the glass plate 1170'. The heat is applied to smooth and round the cut vertical edges, and while not shown in FIG. 16, heat can also be applied to the horizontal cut edges of the plate 1170' for smoothing and rounding. The heat source can include a gas flame, $CO_2$ laser, etc.

The glass sheet 1164 can be a laminated sheet, where the sheet is comprised of multiple layers, each having different material properties such as CTE, etc. Such a laminated sheet can be formed by using a double-isopipe draw tower in which each isopipe is used for providing glass for a different layer of the laminate. The difference in CTE between glass layers of the laminate results in a significant amount of stress being introduced as the glass sheet cools from above the softening point to much below the strain point. For example, compressive stress of greater than 400 MPa can be induced on the surface of the laminate sheet surface by having CTE difference between the inner and surface layers larger than $60 \times 10^{-7}$/C, with the ratio of the thickness of the inner layer to the total laminate thickness ranging between 0.8 and 1 (as described, for example, in U.S. Patent Application Number 2011/0318555, the entirety of which is incorporated herein by reference).

In cases in which the glass sheet 1164 is a laminate, the furnaces 1671a and 1671b can be configured to hold the laminate at a temperature that is between the annealing temperatures of two layers of the laminate. For applications where high surface compressive stresses are required (laminated glasses for high strength applications), providing time at the annealing temperature will reduce the stress magnitude, facilitating cutting using the laser beams 1674. In these cases, high stresses can still be achieved in a finished glass sheet by quenching the glass during the post-cutting cooling.

FIG. 17 illustrates a process in which the sheet 1170' is cooled to temperatures much below the strain point of the glass by physically traversing the sheet through a multistage furnace 1771 having progressively cooler stages 1771a, 1771b, and 1771c. The series of furnaces apply a prescribed temperature profile to minimize residual stresses, post-formed compaction, improve glass sheet attributes, and tailor glass properties. It should be understood that a similar controlled cooling profile is achieved in other embodiments by using a single-stage furnace with a time-varying temperature profile.

In other embodiments, laser perforations are made with the glass in the draw, with a certain separation between defect lines, at a temperature above the annealing point of the glass. This has no significant impact on glass strength at this draw location. However, this can result in the glass sheet spontaneously separating or separating with only weak external perturbations when CTE stress is developed (e.g., for laminated glass) at downstream locations on the draw. Spontaneous separation, or separation with weak external perturbations, can be useful for removal of glass beads and for glass collection.

The ability to cut sheets at high temperature and then post-process the sheet through prescribed temperature profile can also allow for sheets with lower glass compaction and lower residual stresses. Such ability can also eliminate the cost of separate finishing steps, allow processing of glasses with higher strain points, and increase production throughput due to the glass staying at the annealing temperature longer.

The glass separation along a full-thickness cut is controlled by the pitch between two defect lines. The ability to control the pitch is also important since it determines the cutting speed, which is also affected by laser pulse frequency or burst repetition rate, the number of pulses within a burst mode and the available average energy per pulse and/or per burst.

Where a micro-crack around the hole of the penetrated defect line is oriented toward the next nearest hole, this helps the glass cutting in a sense that the crack propagation from one hole to the next nearest one in the direction of the cut is additionally enhanced by micro-cracks along the line of the cut.

A continuous fusion glass manufacturing process and display applications, such as Thin Film Transistors (TFT), require cutting a glass to a certain shape, dimensions and with a certain edge finish. For example, it is an industry standard to finish the display glass sheet with a bullnose edge before sending it to a customer. This is preferred due to reliability reasons, as a glass edge without such finish often breaks during transport. The methods described herein enable cutting and finishing display glass sheets with an edge profile, chamfer, which also provides high reliability during transport, but does not require costly mechanical grinding and polishing processes. At most, such an edge may require only a fine touch polish to achieve high reliability industry standards.

Finally, the methods described herein are capable of completely separating/cutting TFT glass compositions of various thicknesses from 0.025 mm or thinner to several mm thick glass sheets, or stack of glass sheets produced by the fusion process. A workpiece such a TFT glass composition can have a thickness in a range of between about 0.01 mm and 7 mm, for example (e.g., 0.5 mm to 7 mm, or 0.5 mm to 5 mm). Laser beam focal lines generated by the apparatus described in FIGS. 2-6, for example, can have lengths in a range covering the range of thicknesses of workpieces to form defect lines extending through the entire workpiece thicknesses as necessary.

The present application provides the following benefits that may translate to enhanced laser processing capabilities and cost savings and thus lower cost manufacturing. In the current embodiment, the cutting process offers:

Full separation of parts being cut with reduced laser power: The disclosed embodiments are capable of completely separating/cutting TFT glass compositions of various thicknesses from 0.025 mm or thinner to several mm thick glass sheets or stack of glass sheets such as produced by the fusion process.

Reduced subsurface defects: Due to the ultra-short pulse interaction between laser and material, there is little thermal interaction and thus a minimal heat affected zone that can result in undesirable stress and micro-cracking. In addition, the optics that condenses or focuses the laser beam into the glass creates defect lines that are typically 2-5 microns in diameter on the surface of the part. After separation, the subsurface defects are less than 100 microns, for example <75 microns, <50 microns, <30 microns, or even 20 microns or lower. This has great impact on the edge strength of the part, as strength is governed by the number of defects, and their statistical distribution in terms of size and depth. The higher these numbers are, the weaker the edges of the part will be. The process enabled by the embodiments disclosed hereby provided subsurface damage of as-cut edge of 20 microns or lower.

Subsurface damage, or the small microcracks and material modification caused by any cutting process and which are oriented roughly perpendicular to a cut surface, is a concern for the edge strength of glass or other brittle materials. The depth of subsurface damage can be measured by using a confocal microscope to look at the cut surface, the microscope having an optical resolution of a few nm. Surface reflections are ignored, while cracks are sought out down in the material, the cracks showing up as bright lines. The microscope is then focused into the material until there are no more "sparks"—i.e., no more scattering features observed, collecting images at regular intervals. The images are then manually processed by looking for cracks and tracing them through the depth of the glass to get a maximum depth (typically measured in microns) of subsurface damage. There are typically many thousands of microcracks, so typically only the largest microcracks are measured. This process is typically repeated on about 5 locations of a cut edge. Although the microcracks are roughly perpendicular to the cut surface, any cracks that are directly perpendicular to the cut surface may not be detected by this method.

Process cleanliness: The methods described herein permit separation and/or cutting TFT glass compositions such as Eagle XG®, Corning Lotus™, Corning Lotus NXT™ and others in a clean and controlled fashion. It is very challenging to use conventional ablative or thermal laser processes because they tend to trigger heat affected zones that induce micro-cracks and fragmentation of the substrate into several smaller pieces. The characteristics of the laser pulses and the induced interactions with the material of the disclosed method avoid all of these issues because they occur in a very short time scale and the transparency of the substrate material to the laser radiation minimizes induced thermal effects. Since the defect line is created within the substrate, the presence of debris and particulate matter during the cutting step is virtually eliminated. If there are any particulates resulting from the created defect line, they are well contained until the part is separated. Particles on surfaces cut and separated by the laser-based methods described herein can have an average diameter less than about 3 microns.

Cutting Complex Profiles and Shapes in Different Sizes

The present laser processing method allows for cutting/separation of glass, sapphire, and other substrates and glass workpieces following many forms and shapes, which is a limitation in other competing technologies. Tight radii may be cut (e.g., <2 mm) in TFT glass compositions, allowing curved edges, allowing curved edges, and also allowing creation of small holes and slots (such as required for speakers/microphone in a cell phone application) e.g., less than about 5 mm with the present method. Also, since the defect lines strongly control the location of any crack propagation, this method gives great control to the spatial location of a cut, and allows for cutting and separation of structures and features as small as a few hundred microns.

Elimination of Process Steps

The process to fabricate glass plates from the incoming glass panel to the final size and shape involves several steps that encompass cutting the panel, cutting to size, finishing and edge shaping, thinning the parts down to their target thickness, and polishing TFT glass compositions. Elimination of any of these steps will improve manufacturing cost in terms of process time and capital expense. The presented methods may reduce the number of steps by, for example:

Reduced debris and edge defects generation—potential elimination of washing and drying stations.

Cutting the sample directly to its final size, shape and thickness—eliminating need for finishing lines.

Cutting glass directly on the draw—eliminating the need for finishing lines.

The relevant teachings of all patents, published applications and references cited herein are incorporated by reference in their entirety.

While exemplary embodiments have been disclosed herein, it will be understood by those skilled in the art that various changes in form and details may be made therein without departing from the scope of the invention encompassed by the appended claims.

What is claimed is:

1. A method of laser processing a glass workpiece, the method comprising:
focusing a pulsed laser beam into a laser beam focal line oriented along the beam propagation direction and directed into the glass workpiece, the laser beam focal line generating an induced absorption within the glass workpiece, and the induced absorption producing a defect line along the laser beam focal line within the workpiece,
wherein the laser beam focal line is formed via an optical arrangement having a first focusing optical element with spherical aberration configured to generate the laser beam focal line, wherein the first focusing optical element is an axicon, a second focusing optical element spaced apart from the first focusing optical element, wherein the second focusing element is a collimating lens, and a third focusing optical element spaced apart from the second focusing optical element, wherein the third focusing optical element is a plano-convex lens,
wherein the glass workpiece comprises in mole percent on an oxide basis: $SiO_2$ 67-72; $Al_2O_3$ 11-14; $B_2O_3$ 0-3; MgO 3-6; CaO 4-8; SrO 0-2; BaO 2-5; ZnO 0-1, and 0 mol percent $K_2O$;
translating the glass workpiece and the laser beam relative to each other along a first contour, thereby laser forming a plurality of defect lines along the first contour within the workpiece,
wherein a spacing between adjacent defect lines is between 5 micron and 15 microns, wherein the pulsed laser produces pulse bursts with 5-20 pulses per pulse burst, with pulse burst energy of 300-600 micro Joules per pulse burst, and wherein the average laser burst energy per thickness of material is 400-1300 µJ/mm; and
separating the workpiece along or near the first contour, wherein separating the workpiece along the first contour comprises directing an elliptical carbon dioxide ($CO_2$) laser beam into the workpiece along or near the first contour, wherein a beam spot of the elliptical carbon dioxide ($CO_2$) laser beam having a major axis along a cut direction with axis length of 20 mm and a minor axis set at 6 mm, and wherein the $CO_2$ laser power is 100-400 W.

2. The method of claim 1, wherein the workpiece comprises a stack of plural display glass composite substrates.

3. The method of claim 2, wherein at least two of the plural display glass composite substrates are separated by an air gap.

4. The method of claim 1, wherein the pulses have a duration in a range of between greater than about 1 picosecond and less than about 100 picoseconds.

5. The method of claim 1, wherein the bursts have a repetition rate is in a range of between about 10 kHz and about 650 kHz.

6. The method of claim 1, wherein: (i) the laser beam focal line has an average spot diameter in a range of between about 0.1 micron and about 10 microns; and/or (ii) the induced absorption produces subsurface damage up to a depth less than or equal to about 100 microns within the workpiece.

7. The method of claim 1, further comprising laser forming the plurality of defect lines along the first contour within the workpiece, the laser beam forming the plurality of said defect lines effecting separation of the workpiece along a surface defined by first contour to form a separated surface, and the separated surface: (i) having an Ra surface roughness of less than or equal to about 0.5 micron; or (ii) having surface particles having an average diameter of less than 3 microns.

8. The method of claim 1, wherein the workpiece has a thickness in a range of between about 0.01 mm and about 7 mm.

9. A method of laser processing an alkaline earth boro-aluminosilicate glass composite workpiece, the method comprising:
focusing a pulsed laser beam into a laser beam focal line oriented along the beam propagation direction and directed into the alkaline earth boro-aluminosilicate glass composite workpiece, the laser beam focal line generating an induced absorption within the glass workpiece, and the induced absorption producing a defect line along the laser beam focal line within the workpiece;
translating the alkaline earth boro-aluminosilicate glass composite workpiece and the laser beam relative to each other along a first contour, thereby laser forming a plurality of defect lines along the first contour within the workpiece,
wherein a spacing between adjacent defect lines is between 5 micron and 15 microns, wherein the pulsed laser produces pulse bursts with 5-20 pulses per pulse burst, with pulse burst energy of 300-600 micro Joules per pulse burst, and wherein the average laser burst energy per thickness of material is 400-1300 µJ/mm; and
separating the workpiece along or near the first contour, wherein separating the workpiece along the first contour comprises directing an elliptical carbon dioxide ($CO_2$) laser beam into the workpiece along or near the first contour, wherein a beam spot of the elliptical carbon dioxide ($CO_2$) laser beam having a major axis along a cut direction with axis length of 20 mm and a minor axis set at 6 mm, and wherein the $CO_2$ laser power is 100-400 W.

10. The method according to claim 9, wherein the pulsed laser produces pulse bursts with 9-20 pulses per pulse burst and the pulse burst energy is 300-500 micro Joules per pulse burst.

11. The method according to claim 9, wherein the spacing between adjacent defect lines is between 7 micron and 12 microns, wherein the pulsed laser produces pulse bursts with 5-15 pulses per pulse burst and the pulse burst energy is 400-600 micro Joules per pulse burst.

12. The method of claim 9, wherein the pulsed laser has laser power of 10 W-150 W.

13. The method of claim 9, wherein the pulsed laser has laser power of 10 W-100 W and the workpiece and the laser beam is translated relative to one another at a rate of at least 0.25 m/sec.

14. The method of claim 9, wherein (i) the pulsed laser has laser power of 10 W-100 W; and (ii) the workpiece and the laser beam is translated relative to one another at a rate of at least 0.4 m/sec.

* * * * *